(12) United States Patent
Jenkins

(10) Patent No.: US 7,213,030 B1
(45) Date of Patent: May 1, 2007

(54) WEB-ENABLED TRANSACTION AND COLLABORATIVE MANAGEMENT SYSTEM

(76) Inventor: Steven R. Jenkins, 9302 Timberhollow Cir., Dallas, TX (US) 75231

( * ) Notice: Subject to any disclaimer, the term of this patent is extended or adjusted under 35 U.S.C. 154(b) by 0 days.

(21) Appl. No.: 09/419,327

(22) Filed: Oct. 15, 1999

Related U.S. Application Data

(60) Provisional application No. 60/104,527, filed on Oct. 16, 1998.

(51) Int. Cl.
*G06F 7/00* (2006.01)
(52) U.S. Cl. .......................... 707/104.1; 707/9; 707/10
(58) Field of Classification Search ............... 707/1–6, 707/7–10, 100–104.1, 200–205, 500, 501.1, 707/511–517, 530; 705/57–59, 51, 52; 709/217–219, 709/200–205, 223–225; 715/500, 501.1, 715/511–517, 530
See application file for complete search history.

(56) References Cited

U.S. PATENT DOCUMENTS

| | | | | |
|---|---|---|---|---|
| 4,800,590 | A * | 1/1989 | Vaughan .................... 235/382 |
| 5,115,504 | A | 5/1992 | Belove et al. ............... 395/600 |
| 5,317,686 | A | 5/1994 | Salas et al. .................. 395/157 |
| 5,321,609 | A * | 6/1994 | Yianilos et al. ................ 707/1 |
| 5,416,900 | A | 5/1995 | Blanchard et al. .......... 395/155 |
| 5,475,836 | A | 12/1995 | Harris et al. ................ 395/600 |
| 5,546,525 | A | 8/1996 | Wolf et al. .................. 395/159 |
| 5,550,965 | A * | 8/1996 | Gabbe et al. ................ 345/723 |
| 5,784,619 | A * | 7/1998 | Evans et al. ................ 395/682 |
| 5,826,252 | A * | 10/1998 | Wolters et al. .................. 705/1 |
| 5,864,848 | A * | 1/1999 | Horvitz et al. .............. 707/102 |
| 5,873,095 | A * | 2/1999 | Gore .......................... 345/781 |
| 5,877,758 | A * | 3/1999 | Seybold ...................... 345/764 |
| 5,918,014 | A * | 6/1999 | Robinson ..................... 706/12 |
| 5,920,404 | A * | 7/1999 | Weiser ........................ 358/434 |
| 5,930,512 | A * | 7/1999 | Boden et al. ................ 717/102 |
| 6,044,138 | A * | 3/2000 | Graham et al. ........ 379/114.03 |
| 6,067,549 | A * | 5/2000 | Smalley et al. .......... 707/104.1 |
| 6,072,493 | A * | 6/2000 | Driskell et al. ............. 345/804 |
| 6,094,649 | A * | 7/2000 | Bowen et al. .................. 707/3 |
| 6,108,754 | A * | 8/2000 | Lindholm ............... 707/103 R |
| 6,151,624 | A * | 11/2000 | Teare et al. ..................... 707/5 |
| 6,161,149 | A * | 12/2000 | Achacoso et al. .......... 709/203 |
| 6,182,080 | B1 * | 1/2001 | Clements .................... 707/100 |
| 6,192,407 | B1 * | 2/2001 | Smith et al. ................ 709/200 |
| 6,195,652 | B1 * | 2/2001 | Fish .......................... 707/102 |
| 6,199,106 | B1 * | 3/2001 | Shaw et al. ................. 709/203 |
| 6,253,234 | B1 * | 6/2001 | Hunt et al. .................... 707/10 |
| 6,262,720 | B1 * | 7/2001 | Jeffrey et al. ............... 707/500 |

(Continued)

*Primary Examiner*—Greta Robinson
*Assistant Examiner*—Harold E. Dodds, Jr.
(74) *Attorney, Agent, or Firm*—Haynes and Boone, LLP

(57) ABSTRACT

A method and apparatus for a Web-enabled transaction and collaborative management application are described. In one embodiment, the application is centered around a user-friendly home navigation page designed to facilitate convenience for the user in accessing information or entering and tracking data. All information is sorted by project or matter name. A client user may view information one matter at a time, all matters at once, or any user-specified number of matters. Access is restricted to authorized users with password access rights. The application enables the tracking of information that is beneficial to all levels of the user's organization, that is substantive and relevant to different levels of the user's staff, and that aids the client in making informed decisions regarding its current transactions and documents relating thereto.

18 Claims, 68 Drawing Sheets

U.S. PATENT DOCUMENTS 6,266,695 B1 * 7/2001 Huang et al. ............... 709/223
6,295,540 B1 * 9/2001 Sanschagrin et al. .......... 379/9

6,317,025 B1 * 11/2001 Leon et al. ................ 340/5.21

* cited by examiner

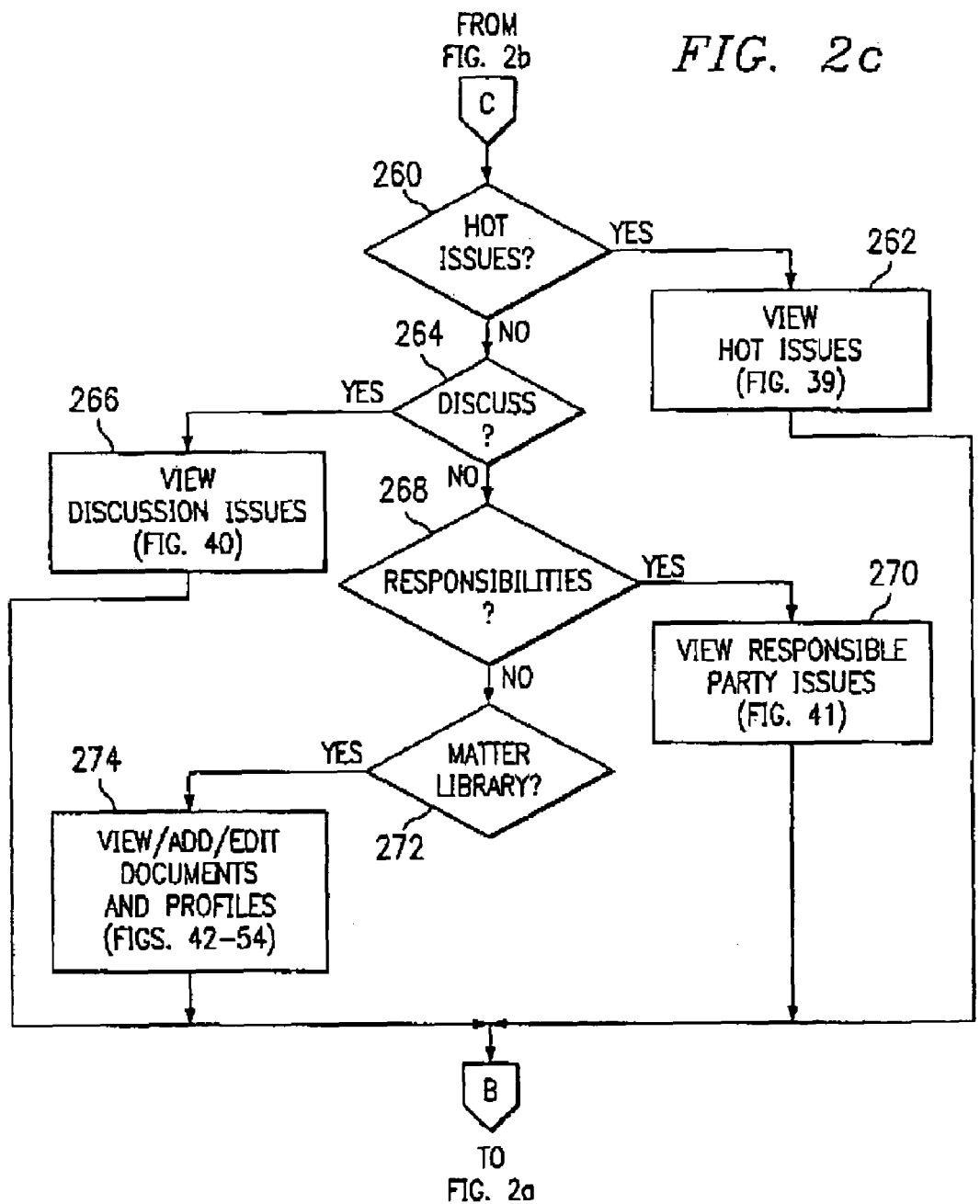

new client information

| Field | Value |
|---|---|
| Client Name | ABC Corp |
| Attention | Adam Beck |
| Address1 | 901 Main Street |
| Address2 | Suite 3100 |
| City | Dallas |
| State | Texas |
| Zip Code | 75202 |
| Country | USA |
| Phone1 | 214.555.5555 |
| Phone2 | 214.555.5556 |
| Fax | 214.555.5557 |
| E-mail | becka@abccorp.com |
| Web Site | abccorp.com |
| Word Processing | WordPerfect 8.0 |

500    502 — [Submit]  [Reset]

*Fig. 5*

Fig. 10 new client information

Client Name: ABC Corp

| | Responsibility Party | Discussion Party | Approval Party | Working Group List | |
|---|---|---|---|---|---|
| Cathy Murray<br>Haynes and Boone, LLP | ☑ | ☑ | ☑ | ☑ | Add  1302 |
| Clint Lofman<br>Archon Group, L.P. | ☐ | ☐ | ☐ | ☐ | Add |
| Sherri Miller<br>Archon Group, L.P. | ☐ | ☐ | ☐ | ☐ | Add |
| William Mundinger<br>Archon Group, L.P. | ☐ | ☐ | ☐ | ☐ | Add |
| timo timo<br>timo | ☐ | ☐ | ☐ | ☐ | |

*Fig. 13*

| | |
|---|---|
| First Name | Adam |
| MI | E. |
| Title | President |
| Company Name | ABC Corp |
| Address 1 | 901 Main Street |
| Address 2 | Suite 3100 |
| City | Dallas |
| State | Texas |
| Country | USA |
| Zip Code | 75202 |
| Phone Number 1 | 214.555.5555 |
| Phone Number 2 | 214.555.5556 |
| E-mail | becka@abccorp.com |
| Assistants Name | Sally Johns |
| Assistants Phone 1 | 214.555.5559 |
| Word Processor | WordPerfect 8.0 |
| Access Level | 5 |
| Phone Number 3 | 214.555.5558 |

1500

1502 — Create User   Reset

Fig. 15

Fig. 17 new matter information

Matter Name
Matter City
Matter State
Client Contact
Law Firm
Counsel Contact
Matter Type — Subsidiary Incorporation — 1702
Comments — 1704
Deactivate Checklists — 1705

1706 — Submit

1700 new user information 2800

| Last Name | First Name | Company Name | Edit Login/General Info | Assign Roles/Permissions | Delete User |
|---|---|---|---|---|---|
| beta | beta | beta.inc | Login/General Info | Assign Roles/Permissions//Update Permissions | Delete User |
| Barger | Ron | Archon Group, L.P. | Login/General Info | Assign Roles/Permissions//Update Permissions | Delete User |
| Burden | Buddy | Archon Group, L.P. | Login/General Info | Assign Roles/Permissions//Update Permissions | Delete User |
| Neblett | Tabb | Archon Group, L.P. | Login/General Info | Assign Roles/Permissions//Update Permissions | Delete User |
| Borshinger | Michael | Innovative Integration | Login/General Info | Assign Roles/Permissions//Update Permissions | Delete User |
| Beck | Adam | ABC Corp | Login/General Info | Assign Roles/Permissions//Update Permissions | Delete User |

Fig. 28 new user information

Add User to Matters: Alpha Corp.,

2920

Client Status
- ☑ All
- ☐ View
- ☐ Add
- ☐ Edit
- ☐ Delete

Client Notes
- ☑ All
- ☐ View
- ☐ Add
- ☐ Edit
- ☐ Delete

Counsel Notes
- ☑ View

Other Notes
- ☑ View

Critical Dates
- ☑ All
- ☐ View
- ☐ Add
- ☐ Edit
- ☐ Delete

Reports
- ☑ All
- ☐ View
- ☐ Add
- ☐ Edit
- ☐ Delete

Checklists
- ☑ All
- ☐ View
- ☐ Add
- ☐ Edit
- ☐ Delete

2922 — [Submit] [Reset]

HAYNES AND BOONE, LLP
Attorneys

*client connect*

4800

Post New Version | Edit Profile | Delete | Return 4802   4804   4806   4808

Document Profile...

| | |
|---|---|
| Application | |
| Document Number | 272 |
| Document Name | Document Name |
| Author | HB-Murray |
| Last Edited By | HB-Murray |
| Document Type | Documents |
| Originally Posted | 5/25/99 4:01:40 PM |
| Last Posted | 5/25/99 4:01:40 PM |
| Client | ABC Corp |
| Project | Alpha Corp |
| Reference | C:\MyFiles\ccdemo1.pdf |

Document Versions...

| ID | Author | Last Posted | Comments | Actions |
|---|---|---|---|---|
| 272.1 | HB-Murray | 5/25/99 4:01:40 PM | Original Version | View — 4810<br>4812 — Download<br>4814 — Edit Version Profile<br>4816 — Delete Version |

Document History...

| ID | Author | Activity Date | Activity Type |
|---|---|---|---|
| 272.1 | HB-Murray | 5/25/99 4:01:40 PM | Create |

*Fig. 48*

HAYNES AND BOONE, LLP
Attorneys
client connect

Document Profile...

| Application | |
|---|---|
| Document Number | 216 |
| Document Name | Office Lease Agreement, with Acme Corporation as Tenant |
| Author | HB-Jenkins |
| Last Edited By | HB-Jenkins |
| Document Type | Drafts |
| Originally Posted | 4/25/99 2:28:01 PM |
| Last Posted | 4/25/99 2:30:20 PM |
| Client | Archon Group, L.P. – Demo |
| Project | Echo Hills Shopping Center |
| Reference | C:\Download\00102-01.pdf |

Post New Version | Return

Document Versions...

| ID | Author | Last Posted | Comments | Actions |
|---|---|---|---|---|
| 216.1 | HB-Jenkins | 4/25/99 2:28:01 PM | Latest Draft, dated October 5, 1999, redlined to show changes by H&B from original draft, highlighted and annotated by Jenkins | View Download |
| 216.2 | HB-Jenkins | 4/25/99 2:30:20 PM | Tenant Comments, received October 12, 1999, including handwritten annotations by Tenants counsel with highlighting and comments by H&B | View Download |

Document History...

| ID | Author | Activity Date | Activity Type |
|---|---|---|---|
| 216.1 | HB-Jenkins | 4/25/99 2:28:01 PM | Create |
| 216.1 | HB-Jenkins | 4/25/99 2:29:19 PM | Edit Version Profile |

Fig. 54

WEB-ENABLED TRANSACTION AND COLLABORATIVE MANAGEMENT SYSTEM

CROSS-REFERENCE TO RELATED APPLICATION

This application claims the benefit of U.S. Provisional Patent Application Ser. No. 60/104,527, filed on Oct. 16, 1998, and hereby incorporated by reference in its entirety.

BACKGROUND

The disclosures herein relate generally to communications software applications and more particularly to a Web-enabled transaction and collaborative management system.

The needs of a company for effective channels of communication among its own employees as well as between those employees and its service providers have never been greater. For example, the current volume and velocity of transactions and matters have strained traditional ways of working and communicating between law firms or other outside service providers and their clients. Many clients have expressed an interest in harnessing the power of technology, in general, and the Worldwide Web (the "Web"), in particular, to create a competitive edge that enables them to better manage their transactional and matter processes.

Recent advances in technology, particularly the growth in the acceptability of the Web, have created the possibility of applying technology to develop more innovative and efficient ways of working and communicating between clients and their outside service providers (e.g., law firms, accounting firms, advertising agencies); however, most applications available today fall far short of meeting the clients' needs and expectations.

Other currently available information management applications are targeted primarily to a company's in-house service providers and their staff—to the exclusion of the business people. In addition, applications are largely passive, with the company's employees merely viewing information entered by an outside law firm. The reports generated by such applications are also fairly limited in scope, including, for example, cost and expense-centered reports.

Therefore, what is needed is a system for providing more effective channels of communication between a client and its employees and the client's outside service providers.

SUMMARY

One embodiment, accordingly, provides a method and apparatus for a Web-enabled transaction and collaborative management application in the form of a software application. Considering the legal service provider example, in one embodiment, the application operates according to the following functions:

1. the information tracked is beneficial to all levels of a client's organization, including the CEO, senior managers, business people, support staff, and general counsel, where applicable;
2. the information tracked is substantive and relevant to different levels of the client's staff, and aids the client in making informed decisions regarding its current transactions and documents relating thereto;
3. the application functions consistent with the way the client works and thinks;
4. the application is flexible and adaptable to the client's specific types of transactions and matters;
5. the information is available 24 hours a day, seven days a week from any location in the world and connectivity is simple yet dependable;
6. the application is user-friendly and needs minimal training time;
7. the application is useable by clients and their outside counsel without requiring them to retool their own hardware and software; and
8. the application is versatile enough to permit clients that have multiple outside service providers to link all outside service providers together so that the client has the benefit of flowing transaction and matter information to and from such outside service providers in a uniform way.

The application of the present invention is designed to meet any or all of the above functions. Accordingly, in one embodiment, the application is the first Web-enabled, fully interactive transaction and collaborative management application designed from the client's perspective.

In this embodiment, the application is centered around a user-friendly home navigation page designed to facilitate convenience for the client user in accessing information or entering data. All information is sorted by project or matter name. The number of matters is virtually unlimited. A client user may view information one project at a time, all matters at one, or any user-specified number of projects. Access is restricted to authorized users with password access rights.

The following features are also important in embodiments of the application:

1. information and data, whenever possible, flow or are directed to specific individuals within the client's organization or the outside service provider's firm to facilitate the greatest awareness of relevant information with the least amount of user effort;
2. in order to avoid "information overload," information and data entered using the invention is continually filtered, without specific action required by the client user, so that the client user is viewing currently relevant information unless the client user desires to see unfiltered information; and
3. client and counsel users are able to respond to any item of information or question in a quick, convenient fashion without the need to access or use another application.

A technical advantage achieved with the invention is that it is beneficial to all levels of clients' staff, including CEO, senior managers, business people, support staff, and general counsel, providing each with the information they need to be aware of.

Another technical advantage achieved with the invention is that it provides interactive tracking and management of substantive business and legal information to facilitate decision-making by the client.

Another technical advantage achieved with the invention is that it is accessible 24 hours a day by authorized client and counsel users from his or her office or home computer or from any other computer via Internet connection.

Yet another technical advantage achieved with the invention is that it connects the client and its outside service providers in a private virtual office.

Yet another technical advantage achieved with the invention is that it is password protected with extensive security features.

Still another technical advantage achieved with the invention is that it is suitable for clients with either a large number of transactions or single complex matters.

BRIEF DESCRIPTION OF THE DRAWINGS

FIGS. 2a–2c illustrate a more detailed flowchart of the operation of the application of the present invention.

FIG. 4 illustrates a "Wizard Main Menu" screen of the application of FIG. 1 or 1a.

FIG. 5 illustrates a "New Client Information" screen of the application of FIG. 1 or 1a.

FIG. 6 illustrates a "Practice Area/Client Work Group Designation" screen of the application of FIG. 1 or 1a.

FIG. 7 illustrates a "New Matter Designation" screen of the application of FIG. 1 or 1a.

FIG. 8 illustrates a "Select Components" screen of the application of FIG. 1 or 1a.

FIG. 9 illustrates a "Name Categories for Components" screen of the application of FIG. 1 or 1a.

FIG. 10 illustrates a "Name Columns for Checklists" screen of the application of FIG. 1 or 1a.

FIG. 11 illustrates a "Name Checklists" screen of the application of FIGS. 1 or 1a.

FIG. 12 illustrates a "User Search" screen of the application of FIG. 1 or 1a.

FIG. 13 illustrates an "Add User to User Groups" screen of the application of FIG. 1 or 1a.

FIG. 14 illustrates a "Role Designation" screen of the application of FIGS. 1 or 1a.

FIG. 15 illustrates a "New User Information" screen of the application of FIG. 1 or 1a.

FIG. 16 illustrates an "Add New Matter" screen of the application of FIG. 1 or 1a.

FIG. 17 illustrates a "New Matter Information" screen of the application of FIG. 1 or 1a.

FIG. 18 illustrates a "Modify Client Level Information" screen of the application of FIG. 1 or 1a.

FIG. 19 illustrates a "Change Roles" screen of the application of FIG. 1 or 1a.

FIG. 20 illustrates an "Edit User Group" screen of the application of FIG. 1 or 1a.

FIG. 21 illustrates a "Change Component Settings" screen of the application of FIG. 1 or 1a.

FIG. 22 illustrates a "Component Selections" screen of the application of FIG. 1 or 1a.

FIG. 22a illustrates a "Modify Component/Items Categories" screen of the application of FIG. 1 or 1a.

FIG. 22b illustrates a "Change Checklists" screen of the application of FIG. 1 or 1a.

FIG. 22c illustrates a "Change Checklist Settings" screen of the application of FIG. 1 or 1a.

FIG. 23 illustrates a "Modify Checklist Items/Categories" screen of the application of FIG. 1 or 1a.

FIG. 24 illustrates an "Add User Group" screen of the application of FIG. 1 or 1a.

FIG. 25 illustrates a "User Search" screen of the application of FIG. 1 or 1a.

FIG. 26 illustrates a "Search Results" screen of the application of FIG. 1 or 1a.

FIG. 27 illustrates a "Modify User Information" screen of the application of FIG. 1 or 1a.

FIG. 28 illustrates a "Search Results" screen of the application of FIG. 1 or 1a.

FIG. 29 illustrates an "Add User to Matters" screen of the application of FIG. 1 or 1a.

FIG. 29a illustrates a "Specify User Access Levels" screen of the application of FIG. 1 or 1a.

FIG. 30 illustrates a "Delete Client" screen of the application of FIG. 1 or 1a.

FIG. 33 illustrates a "Counsel Notes" screen of the application of FIG. 1 or 1a.

FIG. 33c illustrates the "Client Notes" screen of FIG. 33 after an item has been added as illustrated in FIG. 33b.

FIG. 33d illustrate a "Counsel Notes E-mail" screen of the application of FIG. 1 or 1a.

FIG. 42a illustrates a flowchart of the operation of a Matter Library function of the application of FIG. 1 or 1a.

FIG. 48 illustrates a "Document Profile" screen of the application of FIG. 1 or 2.

FIG. 54 illustrates the Document Profile screen of FIG. 48 when the user that is logged on is not the author of the subject document.

DESCRIPTION OF A PREFERRED EMBODIMENT

Figures 1, 1A:
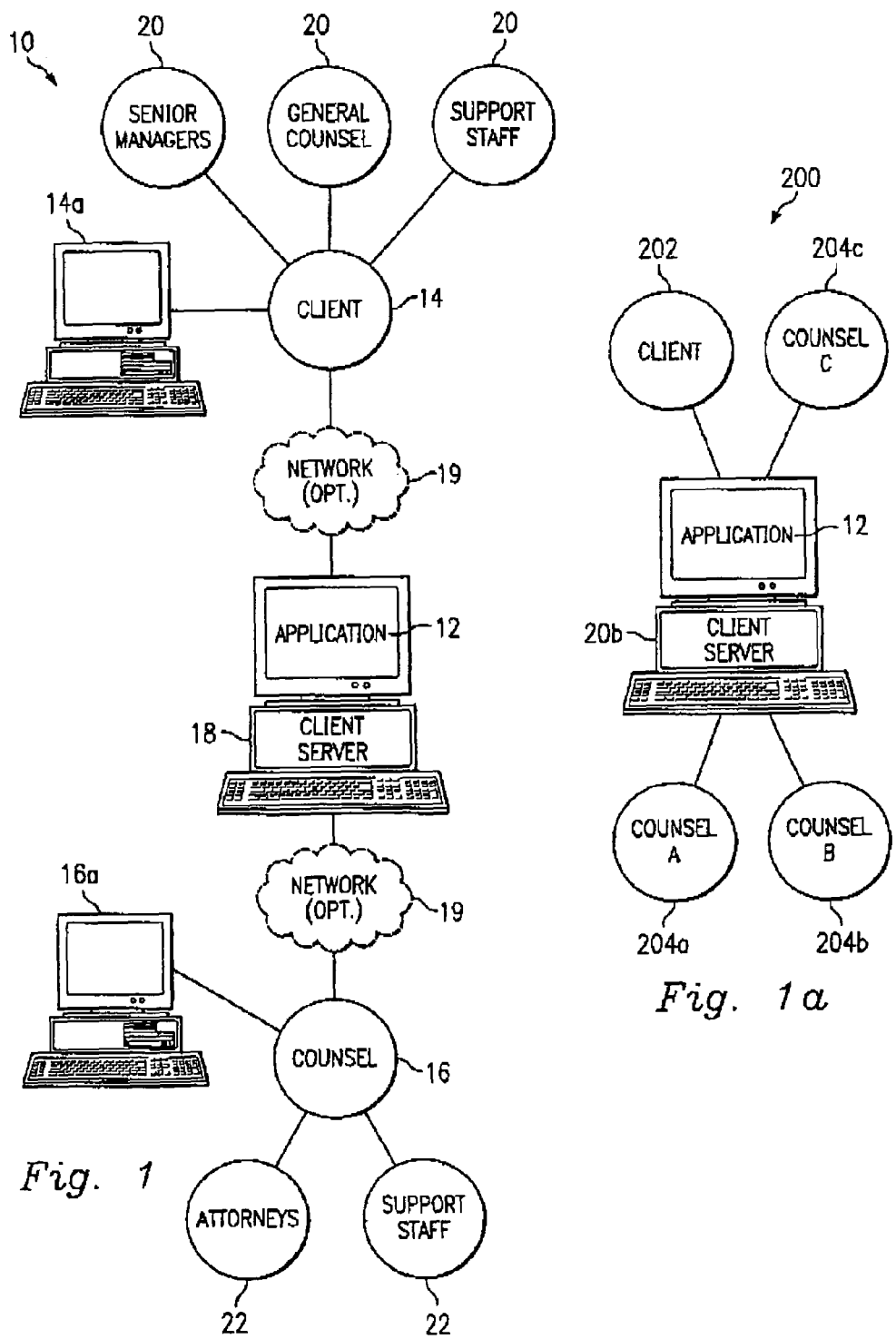
FIG. 1 illustrates one network environment for implementing the application of the present invention.
FIG. 1a illustrates an alternative network environment for implementing the application of the present invention.

FIG. 1 illustrates one embodiment of a communications environment 10 in which a transaction and collaborative management application 12 embodying features of the present invention may be implemented. The communications environment 10 is designed to facilitate communication between a client 14, which may be, for example, a small company or large corporation, and a provider such as a single outside counsel 16 via a client server 18 which includes one or more computers. The client 14 and the outside counsel 16 each include one or more computers, such as a computers 14a and 16a, respectively.

It should be noted that, as used herein, the term "outside counsel" shall be deemed to include any type of outside service provider, including, for example, law firms, accounting firms, advertising agencies, etc. The specific example of a law firm is used herein to facilitate a complete understanding of the invention and should not be construed to limit application of the invention in connection with other outside service providers.

In the embodiment shown in FIG. 1, the client server 18 is preferably located at the offices of the outside counsel 16 for the outside counsel to maintain and service; however, it is possible that the client server 18 will be located on the client's premises. It will be recognized that the application 12 resides on the client server 18.

To illustrate different configurations, a network 19 is shown in phantom between the client server 18 and the client 14 as well as between the client server and the outside counsel 16. It is understood that many different configurations of the network 19 may exist, and the network may be of different types, e.g., a voice network, a data network, a public switched telephone network, or a local area network ("LAN"). Also, in some applications, the client server 18 may represent a functional subset of the computer 14a.

It should also be recognized that both the client 14 and the outside counsel 16 will typically comprise a LAN to which several individual client users 20 and counsel users 22 are respectively connected. Examples of client users include senior managers, general counsel, support staff, and business people. Examples of counsel users include attorney's and staff. Of course, legal service providers are merely one example of participants in the present invention. Other examples include accounting service providers, maintenance providers, and others.

FIG. 1a illustrates an alternative embodiment of the communications environment 10 (FIG. 1), designated by a reference numeral 200, in which the transaction and collaborative management application 12 may be implemented. Computers and networks exist in the environment 200, such as is shown in FIG. 1. In contrast to the communications environment 10, the communications environment 200 is designed to facilitate communication between a client 202 and multiple outside counsel, represented in FIG. 1a by three outside counsel 204a, 204b, 204c, via a client server 206. Also in contrast to the embodiment shown in FIG. 1a, in the embodiment shown in FIG. 1a, the client server 206 is preferably located on the client's premises, to facilitate access by the multiple outside counsel 204a–204c. Again, the application 12 resides on the client server 206.

Although not shown in FIG. 1a, it will be recognized that, as discussed with respect to FIG. 1, the environment 200 supports a variety of client users (e.g., senior managers, general counsel, support staff, and business people) and counsel users (e.g., attorneys and support staff) via respective LANs of the client 202 and counsel 204a–204c.

Figure 2:
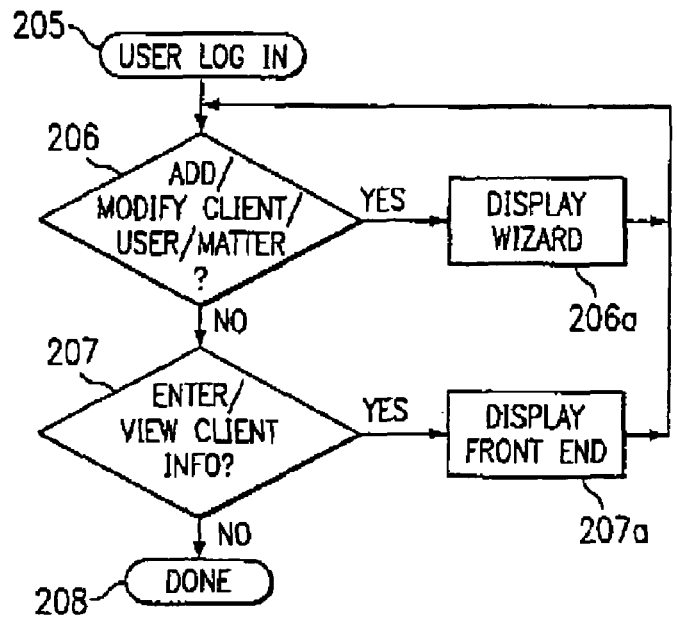
FIG. 2 is a flowchart of the operation of the application of the present invention.
Figure 3:
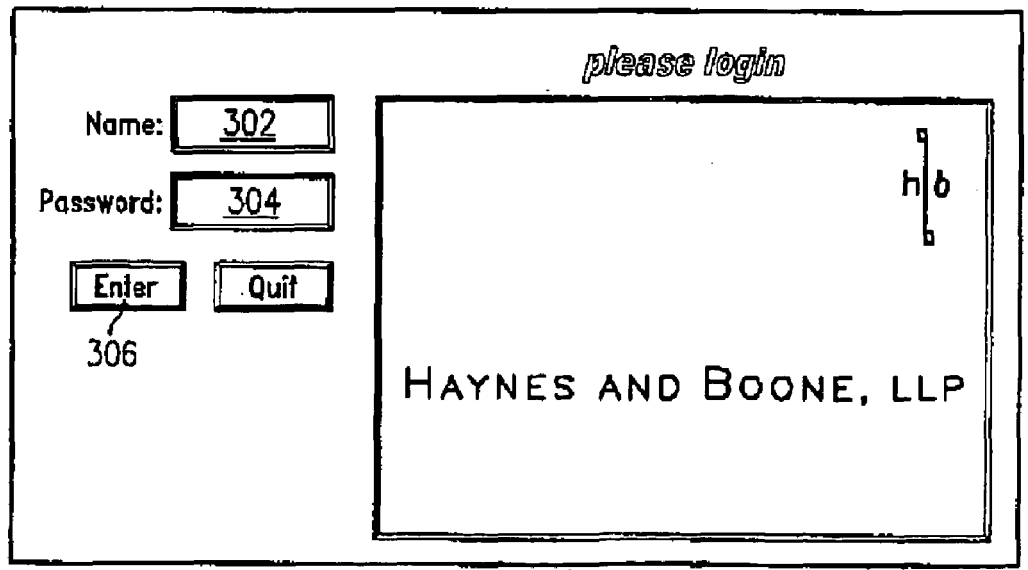
FIG. 3 illustrates a log in screen of the application of FIG. 1 or 2.
Figure 2A:
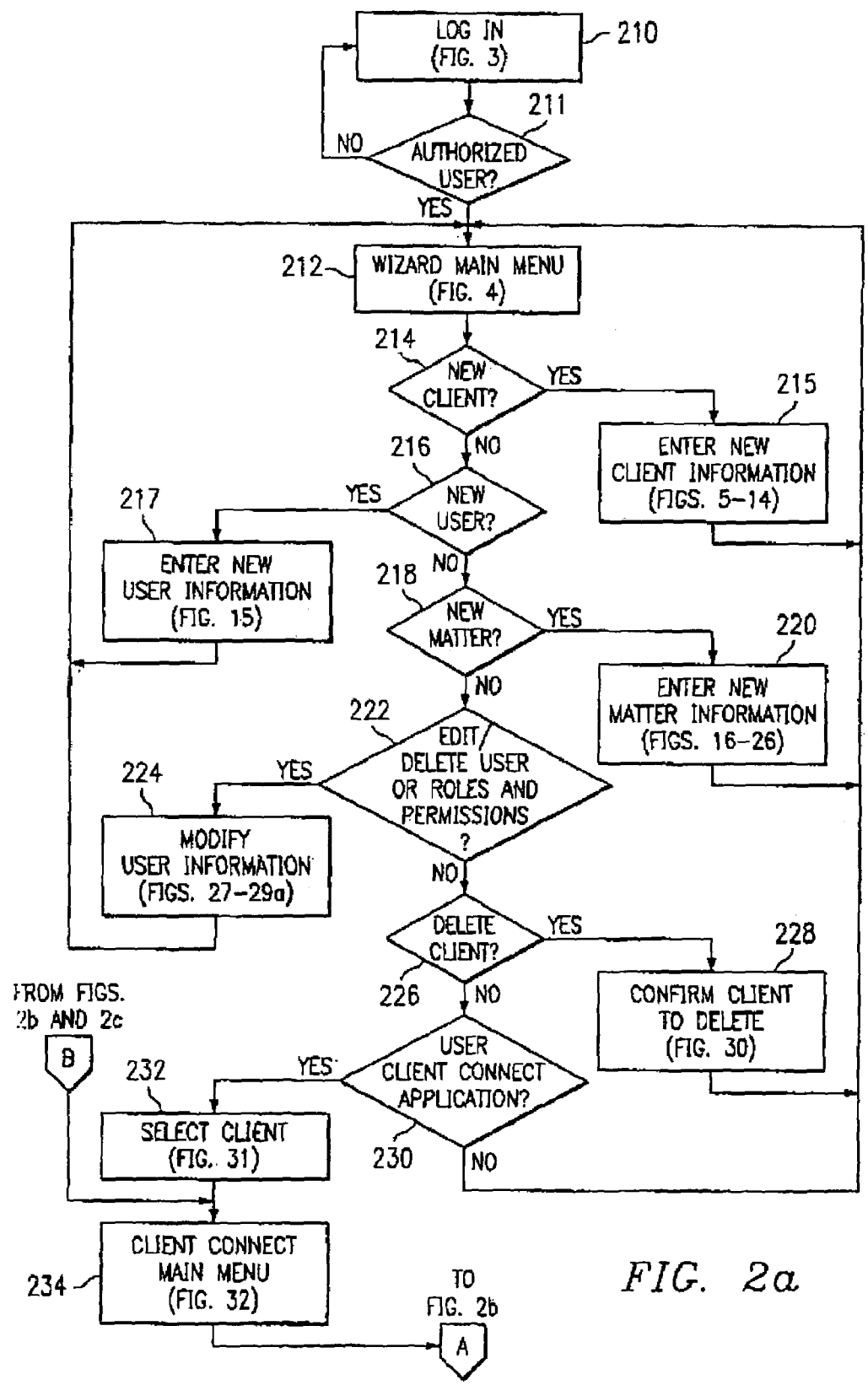
Figure 2B:
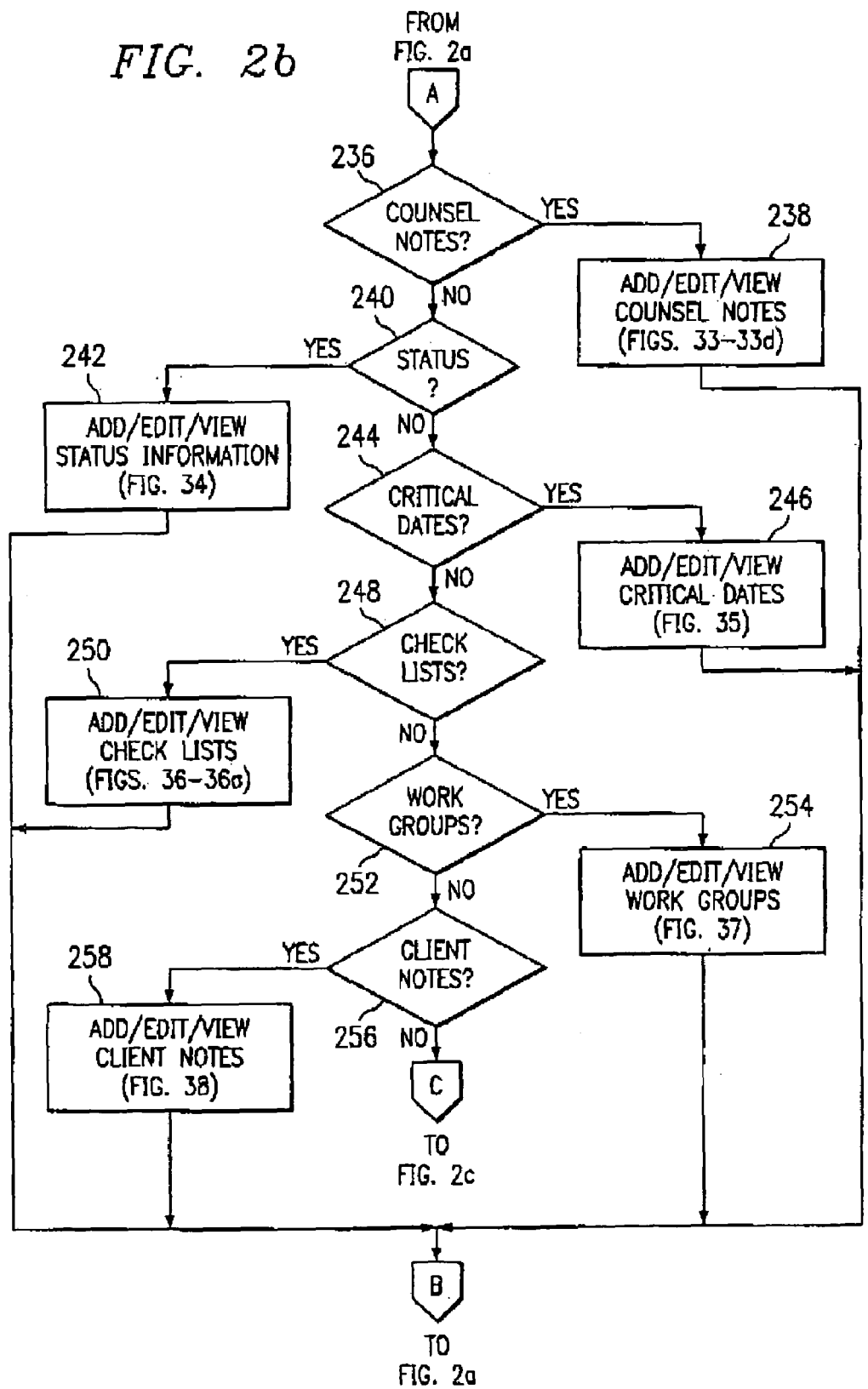

FIG. 2 illustrates a flowchart of the operation of the application 12. FIGS. 2a–2c illustrate a more detailed flowchart of the operation of the application 12. FIG. 3 et seq. are used to illustrate the operation and use of the application 12. Using a computer associated with either the client 14, in the case of a client user, or counsel 16, in the case of a counsel user, a user initially accesses a home page of the application 12, it being recognized that this may be accomplished by entering the Internet "address" for the home page in the appropriate field of a web browser application executing on the user's computer.

In general, referring to FIG. 2, in step 205, the user logs in to the application 12 using a log in screen 300 (FIG. 3). The log in process is described in further detail below in connection with step 210 (FIG. 2a). In step 206, a determination is made whether the user wants to add or modify a client, matter, or user. If so, execution proceeds to step 206a, in which a Wizard function of the application 12, which enables authorized users to configure the appearance of a front end of the application as described in greater detail below with reference to FIGS. 4–30, is displayed; otherwise, execution proceeds to step 207, in which a determination is made whether the user wants to access the front end of the application to enter and/or access client information as described below. If so, execution proceeds to step 207a, in which the front end function, as described in greater detail with reference to FIGS. 31–54, is displayed; otherwise, execution terminates in step 208.

Figure 4:
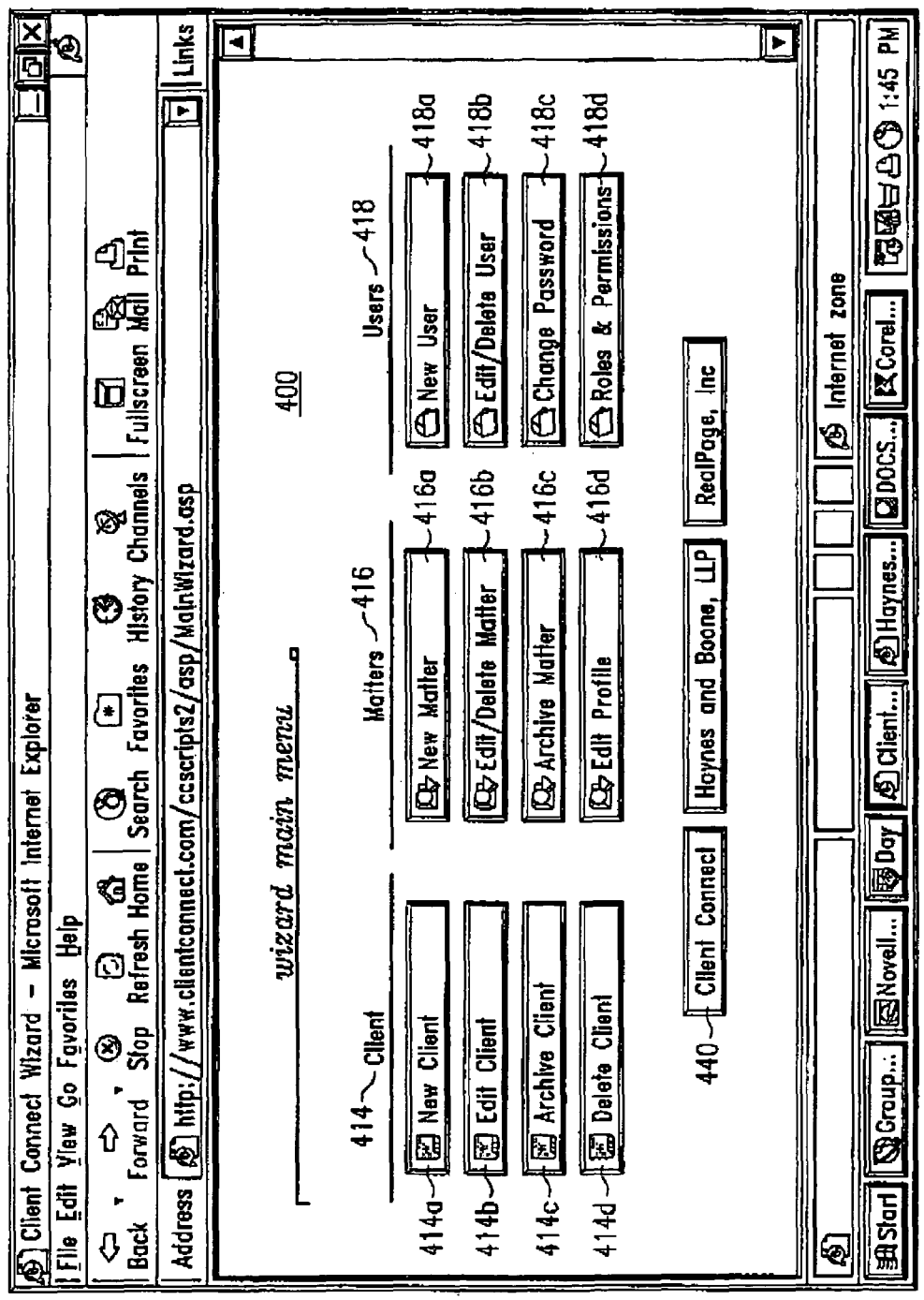

Referring now to FIGS. 2a–2c, in step 210 (FIG. 2a) the user logs in to the application using a log in screen 300, as shown in FIG. 3. The log in process serves as a security measure, such that only those users who are authorized to access use the application 12 will be granted access thereto. Once a user has entered a name and password in the appropriate fields 302 and 304, respectively, and clicks on an "Submit Query" button 306, in step 211, the application 12 determines whether the name and password correspond to an authorized user. If so, execution proceeds to step 212 (FIG. 2a) in which a "Wizard Main Menu" screen 400, as illustrated in FIG. 4, is displayed.

As will be described in greater detail below with reference to FIGS. 4–30, the Wizard of the application 12 enables an authorized user to control the appearance and other features of the application as presented to other "front end" users, as also described below (FIG. 31 et seq.), using a plurality of buttons displayed on the Main Menu screen 400. For ease of location and use, the buttons are divided into three categories, respectively designated "Client" 414, "Matters" 416, and "Users" 418. The buttons included in the Client category 414 include "New Client" 414a, "Edit Client" 414b, "Archive Client" 414c, and "Delete Client" 414d. The buttons included in the Matters category 416 include "New Matter" 416a, "Edit/Delete Matter" 416b, "Archive Matter" 416c, and "Edit Profile" 416d. Finally, the buttons included in the Users category 418 include "New User" 418a, "Edit/Delete User" 418b, "Change Password" 418c, and "Roles & Permissions" 418d. Several of the more important functions and features accessible using these buttons will be described below.

Figure 6:
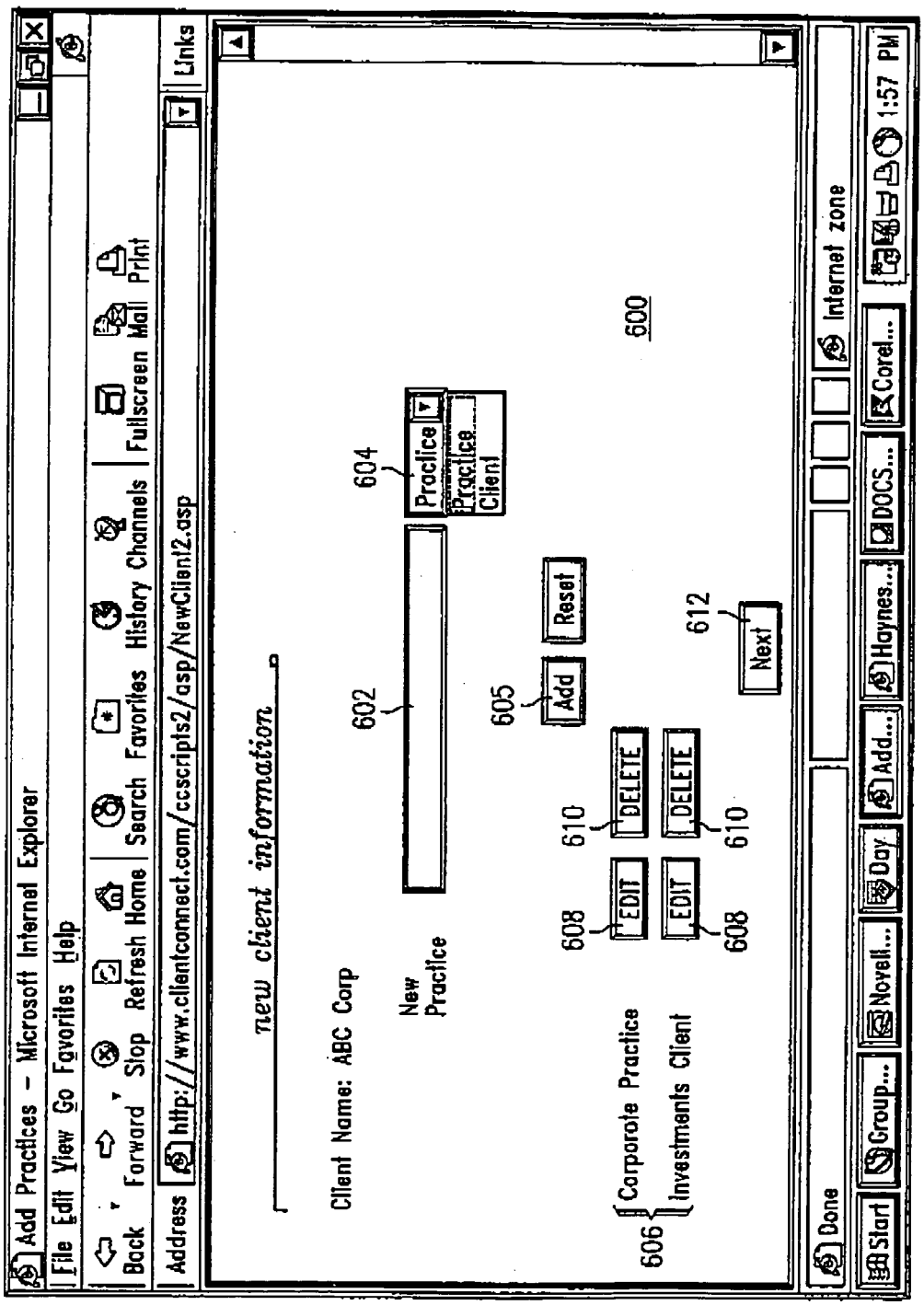

In step 214, a determination is made whether the user has clicked on the New Client button 414a. If so, execution proceeds to step 215, in which a "New Client Information" screen 500, as illustrated in FIG. 5, is displayed. Using this screen 500, the user enters in the appropriate fields all of the information relevant to establishing a new client, including, for example, the client's name and a primary contact, as well as the client's address, phone and fax numbers, E-mail address, and web site address, if any, and a designation of the client's word processing system. Once all of the relevant information is entered in the respective fields, clicking on a "Submit" button 502 results in the display of a "Practice Area/Client Work Group Designation" screen 600, as illustrated in FIG. 6.

Figure 7:
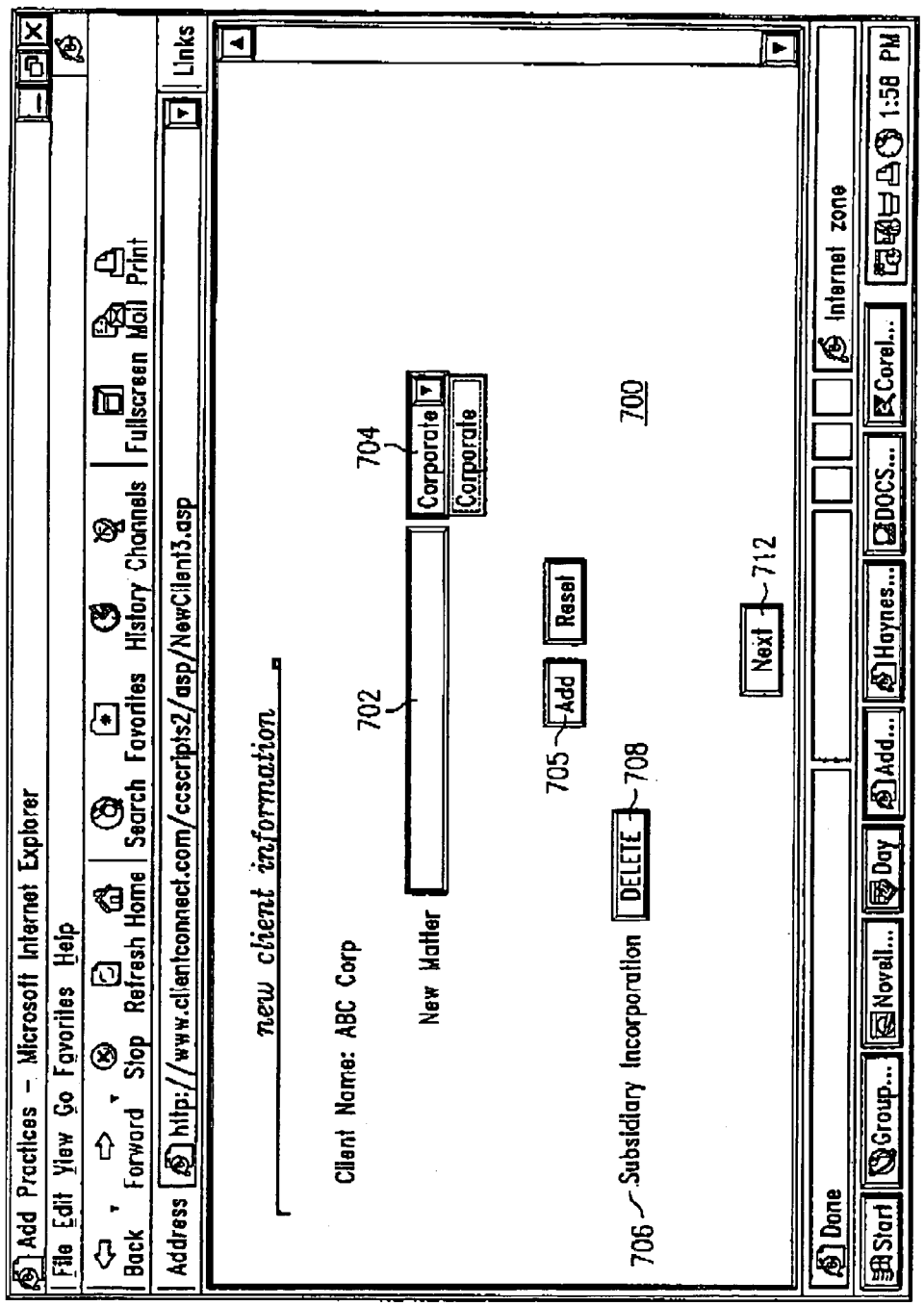

Using the Practice Area/Client Work Group Designation screen 600, the user enters, in a New Practice field 602 the name of the practice area/client work group. Using a drop-down menu 604, the user specifies whether the entry in the field 602 designates a new practice ("Practice") or client work group ("Client"). Once this information is entered and the user clicks on an "Add" button 605, the name and type of practice is included in a list 606 displayed on the screen 600. Practice areas/work groups can be edited and deleted from the list 606 by clicking on the associated "Edit" and "Delete" buttons 608, 610, respectively. Clicking on a "Next" button 612 results in the display of a "New Matter Designation" screen 700 as illustrated in FIG. 7.

Figure 8:
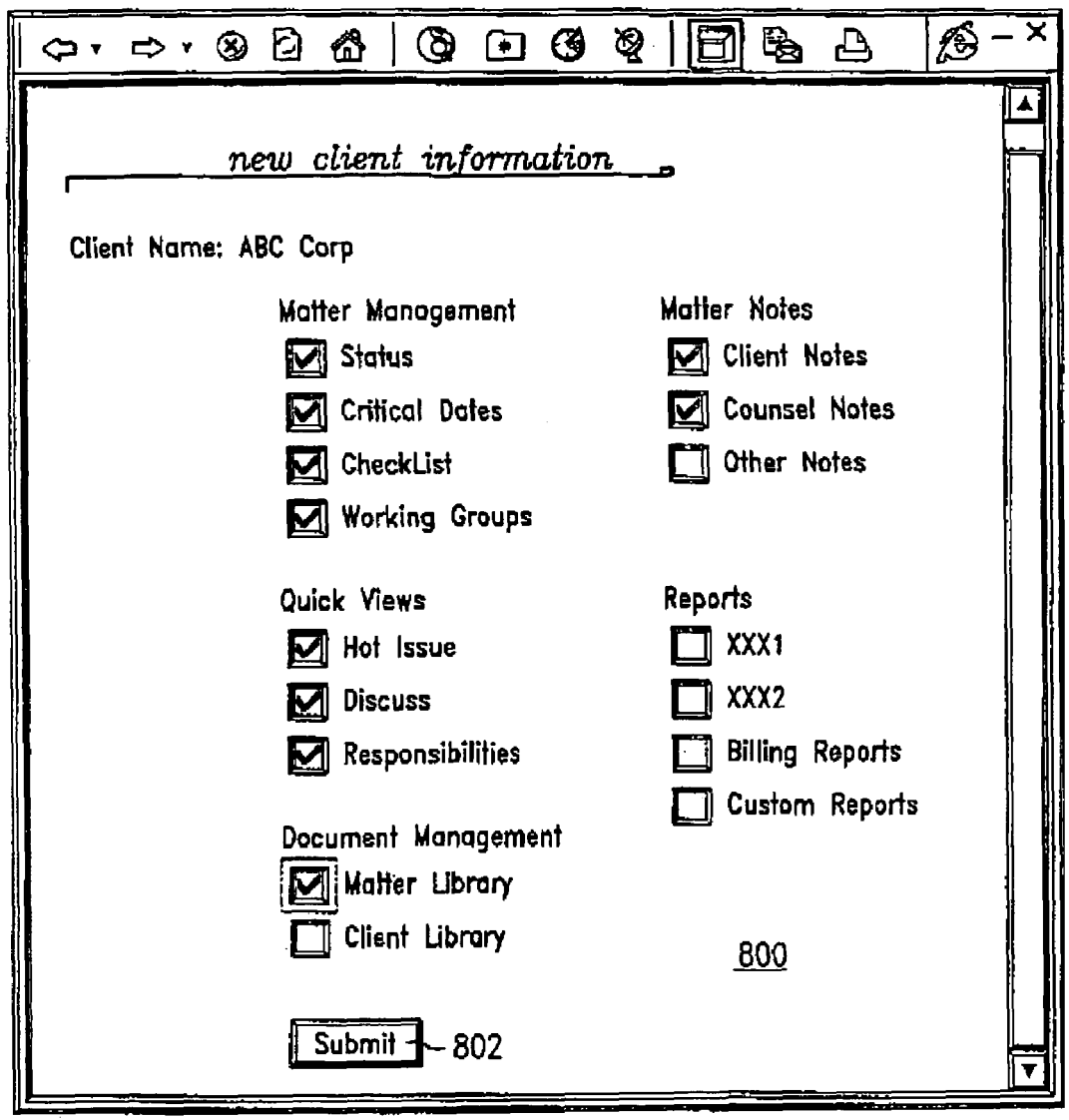

Using the New Matter Designation screen 700, a user can add new matters to the practice areas/work groups set up using the screen 700. The name of the new matter is entered in a "New Matter" field 702 and then the practice area/work group is selected from a drop-down menu 704. Once this information is entered and the user clicks on an "Add" button 705, the name of the new matter is included in a list 706 displayed on the screen 700. Matters can be deleted from the list 706 by clicking on the associated "Delete" button 708. Clicking on a "Next" button 712 results in the display of a "Select Components" screen 800 as illustrated in FIG. 8.

Using the Select Components screen 800, the user selects the various components to be made available for the new client by checking the box associates with the selected components. The selected components will be displayed as active buttons on the "Main Menu" screen (FIG. 32) for the client. As shown in FIG. 8, the following components have been selected for client "ABC Corp.," "Status," "Critical Dates," "Checklist," "Working Groups," "Hot Issue," "Discuss," "Responsibilities," "Matter Library," "Client Library," "Client Notes," "Counsel Notes," "Billing Reports," and "Custom Reports." Clicking on a "Submit" button 802 completes the selection process and results in the display of a "Name Categories for Components" screen 900, as shown in FIG. 9.

Figure 9:
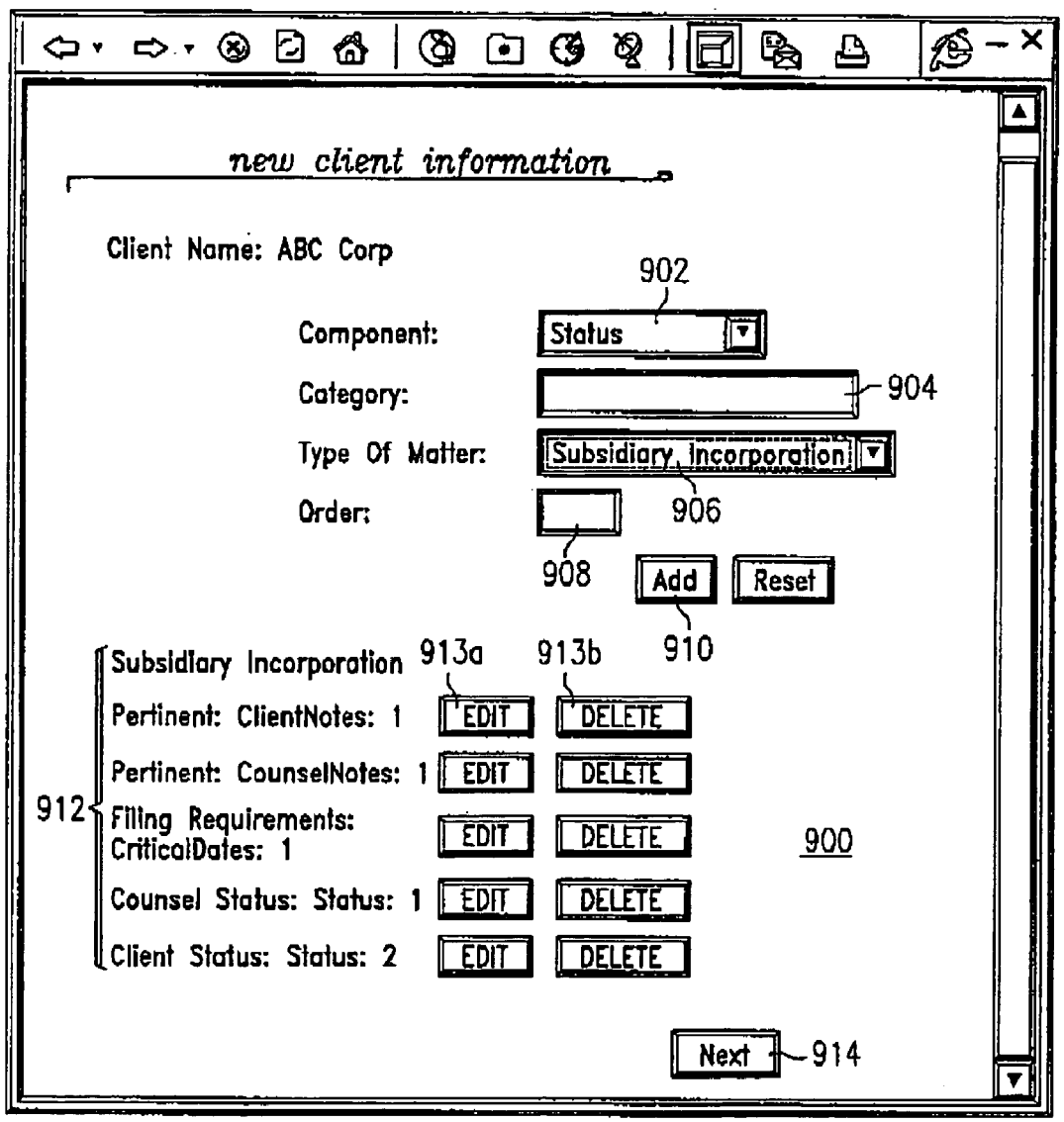
Figure 10:
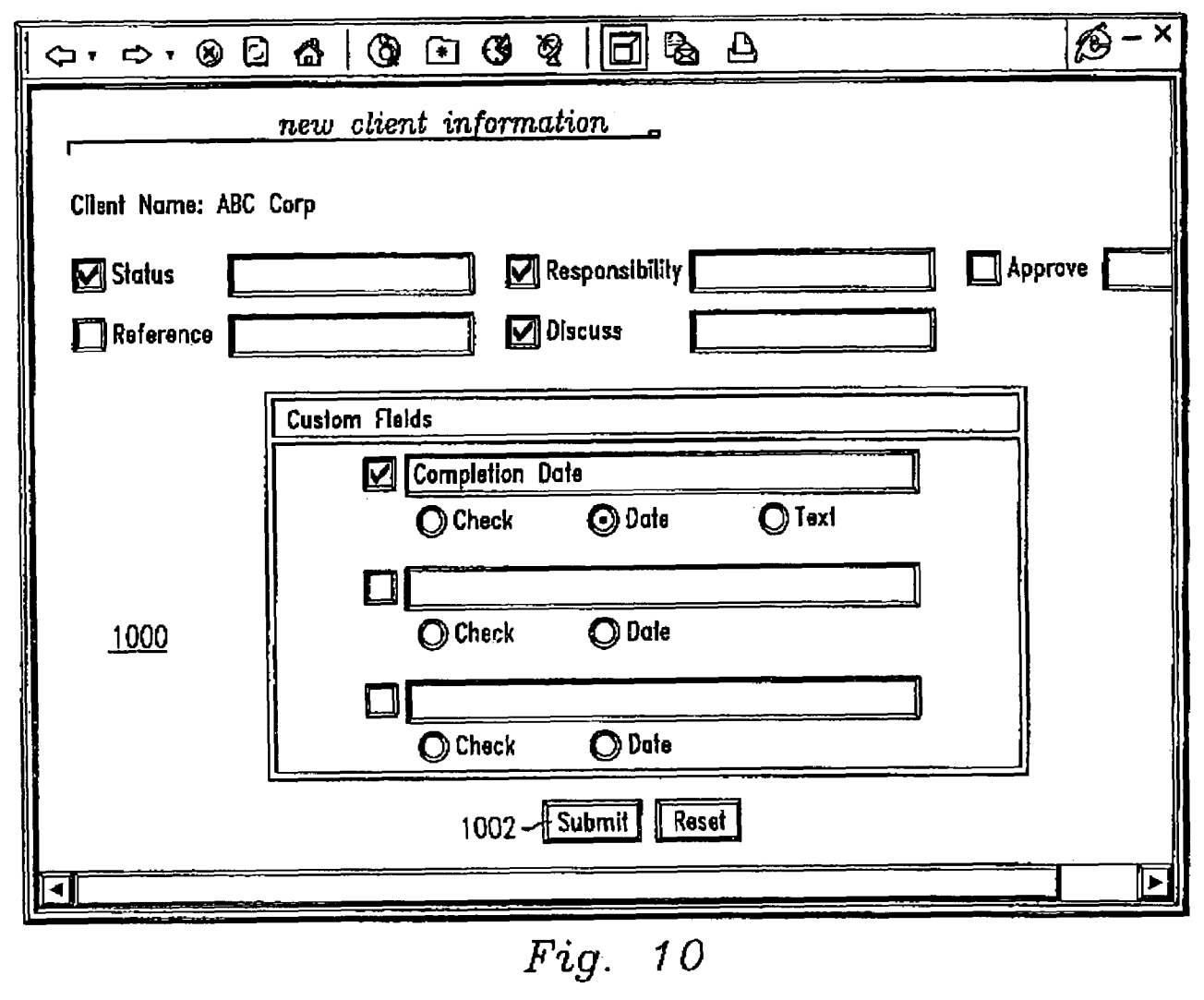

Referring to FIG. 9, the Name Categories for Components screen 900 is used to add various categories for components. As will be explained in further detail with reference to FIGS. 33–38, the categories added using the screen 900 will be displayed on the individual screens of the respective components. As shown in FIG. 9, the user selects a component from a drop-down menu 902, it being recognized that the menu 902 will include all of the components selected using the screen 900 (FIG. 8). The user then enters the name of the category in a "Category" field 904, selects a type of matter from a drop-down menu 906 comprising a list of the matters added using the New Matter Designation screen 700 (FIG. 7), and designates the numerical order in which the category should appear on the component screen in an "Order" field 908. For example, if a "1" is entered in the order field 908, the category will be the first category listed on the component screen; if a "2" is entered, the category will be the second category listed, and so on. Clicking on an "Add" button 910 results in the information being added to a list 912 under the type of matter specified. Categories can be edited and deleted by clicking on associated "Edit" and "Delete" buttons 913a, 913b, respectively. Once all of the categories have been added in this matter, clicking on a "Next" button 914 results in the display of a "Name Columns for Checklists" screen 1000, as shown in FIG. 10.

Figure 36:
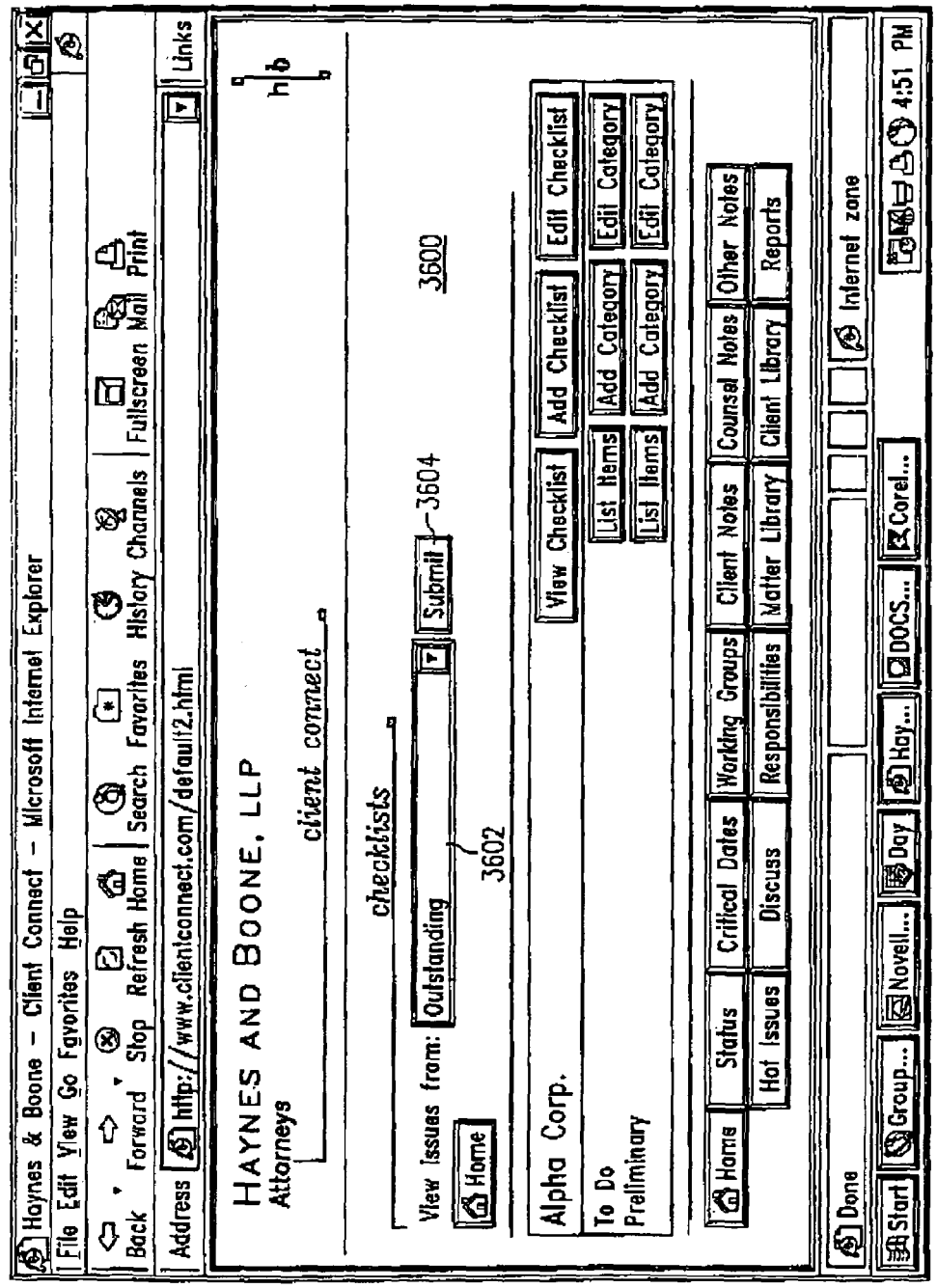
FIG. 36 illustrates a "Checklists" screen of the application of FIG. 1 or 2.

The Name Columns for Checklists screen 1000 is used to designate which columns will appear on the "Checklists" screen, as described in greater detail with reference to FIG. 36. In particular, the user selects the columns to appear on the Checklists screen (FIG. 36) by checking the box associated with the selected columns. In one embodiment, available columns include a "Status" column, a "Responsibility" column, an "Approve" column, a "Reference" column, and a "Discuss" column. The default names for these columns can be changed by entering a different name in the field associated with the column. In addition to the previously described five column headings, there are three "custom" fields, one of which may be designated as a check box, a date, or a text entry column, and the other two of which may be designated as either a check box or date column. Again, selection of these custom fields is accomplished by entering a name for the column in the field associated therewith and checking the check box associated with the field. Once the column names have been entered as previously described, clicking on a "Submit" button 1002 results in the submission of the information entered thereon.

Figure 11:
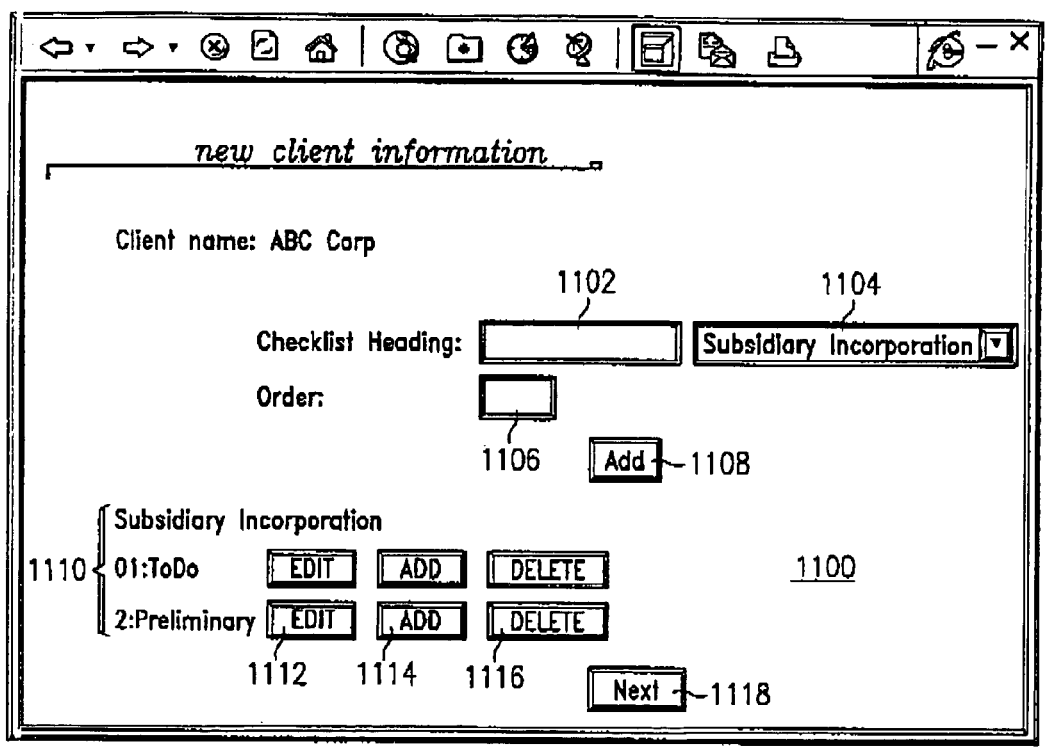
Figure 12:
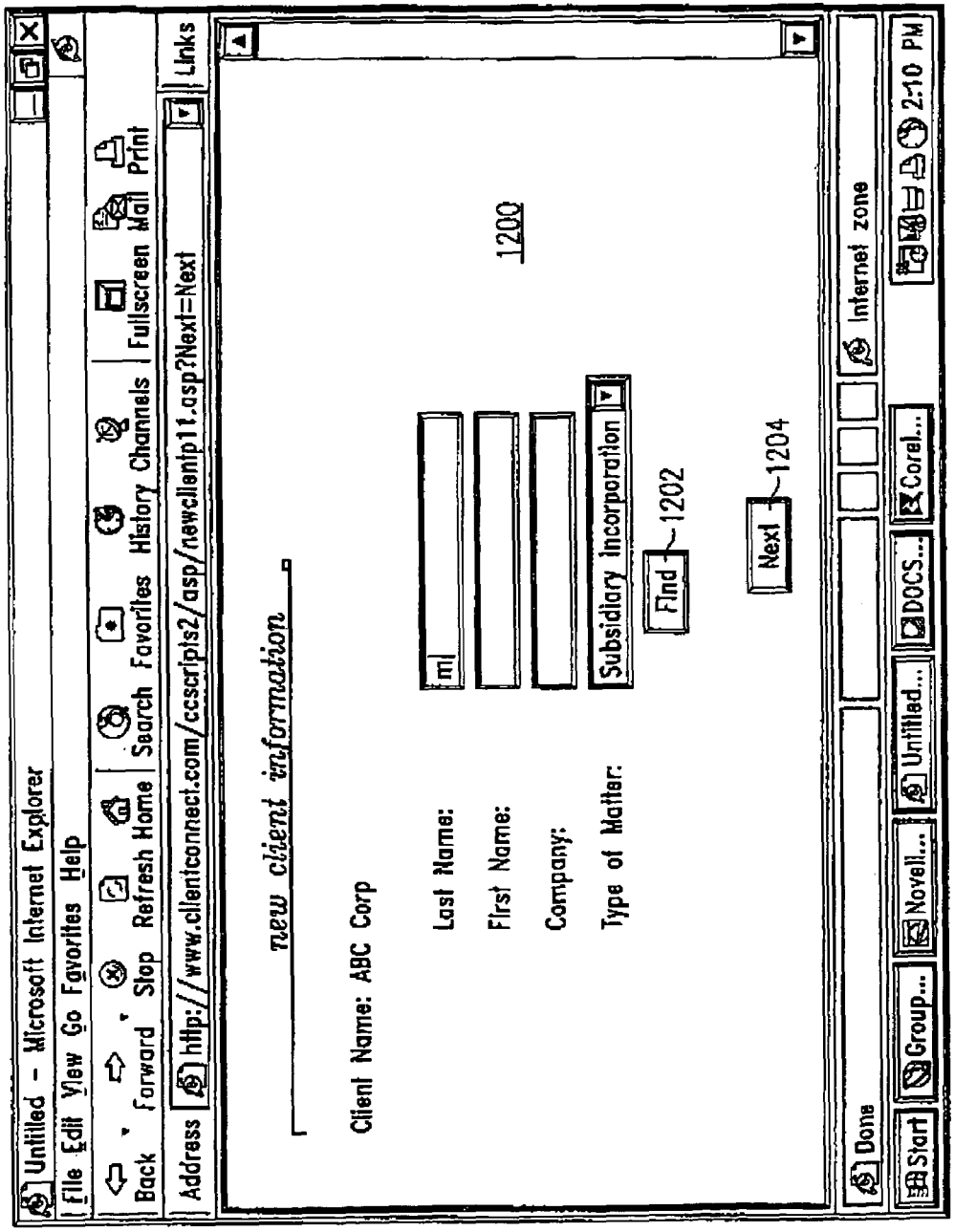

A "Name Checklists" screen 1100 is shown in FIG. 11. Using the screen 1100, the user enters a Checklist name in a "Checklist Heading" field 1102, selects a matter type from a drop-down menu 1104, and enters a number indicating where in the list of Checklists the current Checklist is to appear in an "Order" field 1106. Once the information has been entered as previously described, the user clicks on an "Add" button 1108 to add the information to a list 1110 under the appropriate matter heading. Checklists can be edited, added, and/or deleted by clicking on the respective button 1112, 1114, and/or 1116 associated with the Checklist in the list 1110. Clicking on a "Next" button 1118 results in the display of a "User Search" screen 1200, as shown in FIG. 12.

Figure 14:
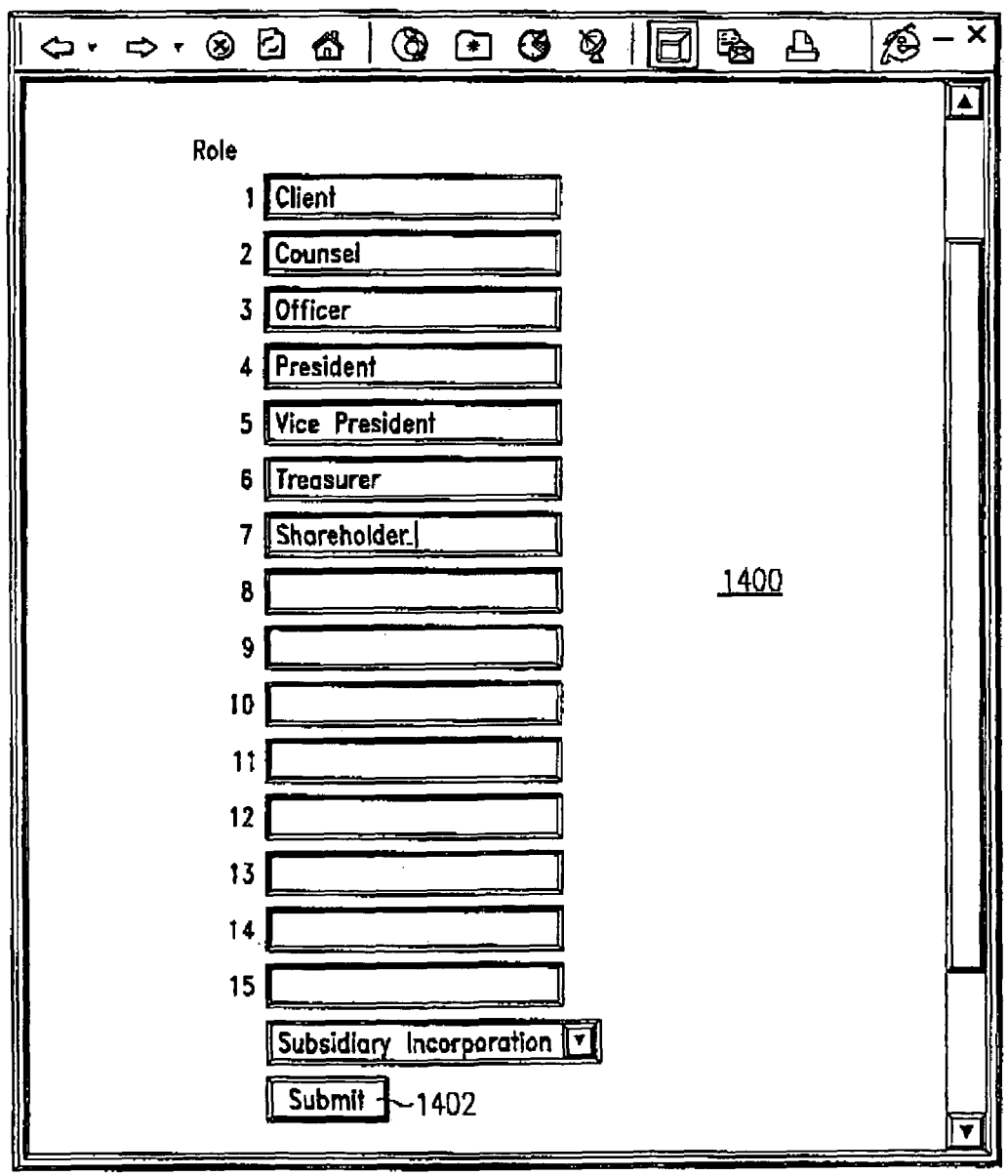

Using the User Search screen 1200, the user enters a relevant portion of identifying information for a user to be searched for and then clicks on a "Find" button 1202, which results in the display of a list of users who fit the criteria. An exemplary "Search Results" screen 1300 for the search information illustrated in FIG. 12 is shown in FIG. 13. Using the Search Results screen 1300, the user checks the appropriate boxes corresponding to the selected user to include the selected user in various user groups, such as "Responsible Party," "Discussion Party," "Approval Party," and "Working Group List." Clicking on an "Add" button 1302 adds the selected user to the selected work groups and returns the user to the screen 1200 (FIG. 12). Clicking on a "Next" button 1204. results in the display of a "Role Designation" screen 1400, as shown in FIG. 14, that can be used by the user to designated various user roles or titles, e.g., "Client," "Counsel," "Officer," "President," "Vice President," "Treasurer," and "Shareholder." Clicking on a "Submit" button 1402 returns the user to the Wizard Main Menu screen 400.

It should be noted that the designations made using the screens illustrated in FIGS. 8–14 are client level designations; that is, unless modified as described below, they apply to all matters for a particular client.

If in step 214, it is determined that the user has not clicked on the New Client button 414a, in step 218, a determination is made whether the user has clicked on the New User button 418a. If so, execution proceeds to step 219, in which a "New User Information" screen 1500, as shown in FIG. 15, is displayed. Using the New User Information screen 1500, the user enters identifying information for a new user, including the new user's name, title, company name and address, phone number, E-mail address and access level, as well as an assistant's name and phone number and a designation of the word processing system of the new user. Clicking on a "Create User" button 1502 submits the information entered on the screen 1500 and returns the user to the Wizard Main Menu screen 400 (FIG. 4).

Figure 16:
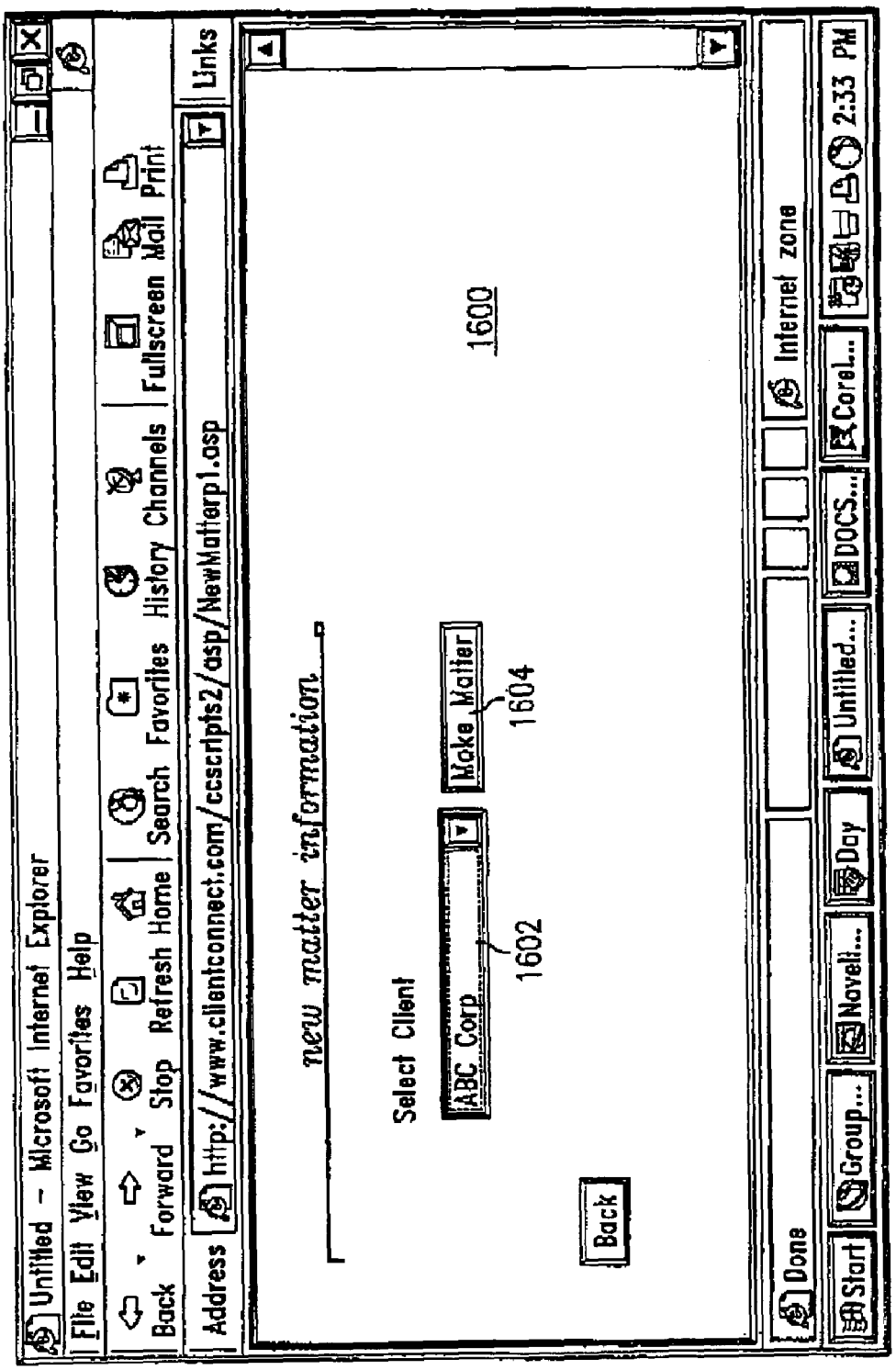

If in step 216, it is determined that the user has not clicked on the New User button 418a, in step 218, a determination is made whether the user has clicked on the New Matter button 416a. If so, execution proceeds to step 220, in which an "Add New Matter" screen 1600, as shown in FIG. 16, is displayed. Using the Add New Matter screen 1600, the user selects a client from a drop-down menu 1602 and then clicks on a "Make Matter" button 1604, which results in the display of a "New Matter Information" screen 1700, as illustrated in FIG. 17.

Figure 18:
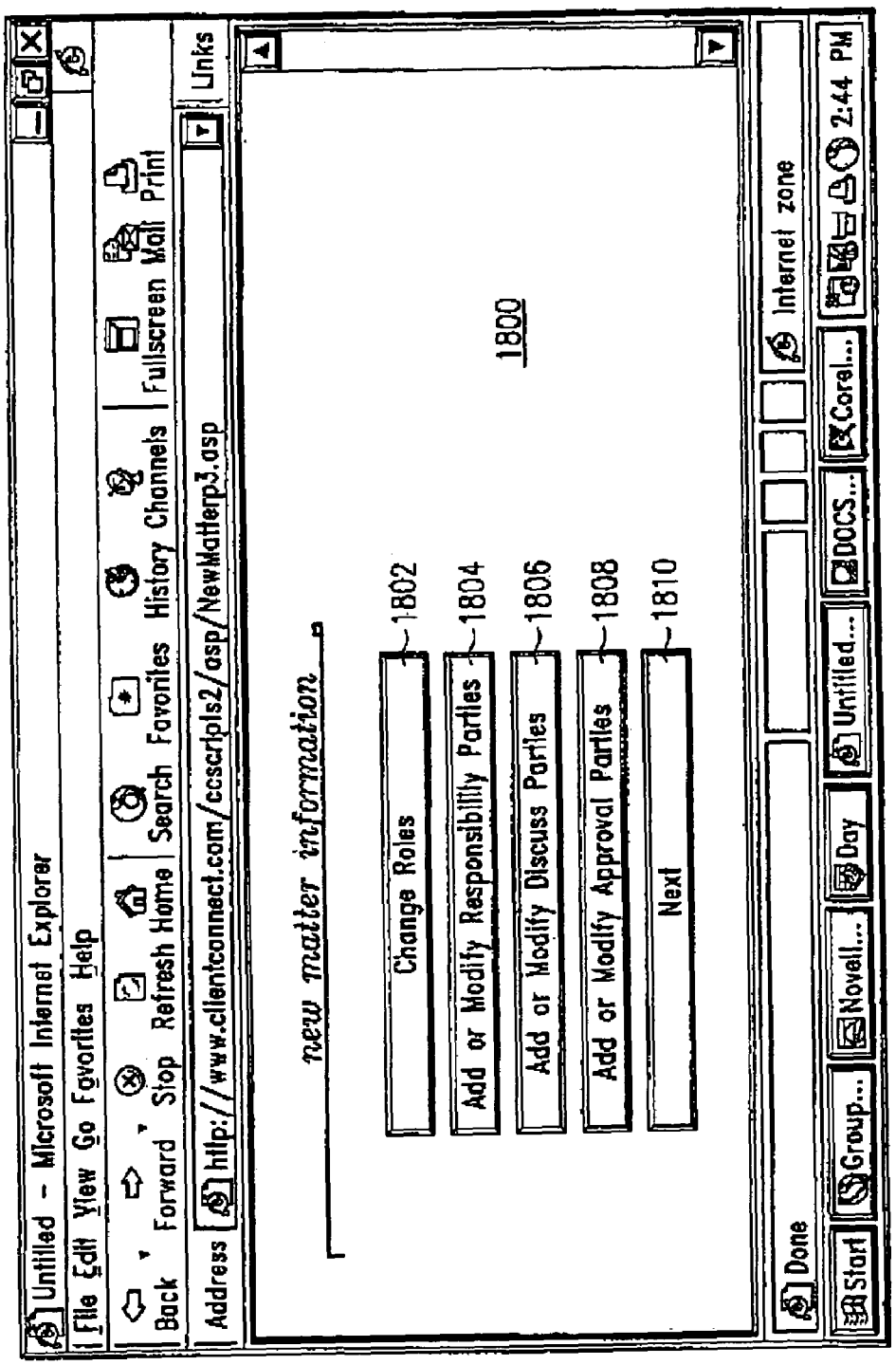

Using the New Matter Information screen 1700, the user enters various items of information for a new matter, including the matter name, city, state, client contact, law firm, and counsel contact. In addition, the user selects a matter type from a "Matter Type" drop-down menu 1702 and enters any necessary comments in a "Comments" field 1704. Checking a checkbox 1705 designated "Deactivate Checklists" enables a user to skip the portion of the Wizard that sets up the Checklists, as described below. When the user is later ready to set up the Checklists, he or she simply returns to this screen 1700 and unchecks the checkbox 1705 and then proceeds with Checklist set up as described below. Once the information is completed, the user clicks on a "Submit" button 1706 to create the new matter, at which point a "Modify Client Level Information" screen 1800, as shown in FIG. 18, is displayed.

Figure 19:
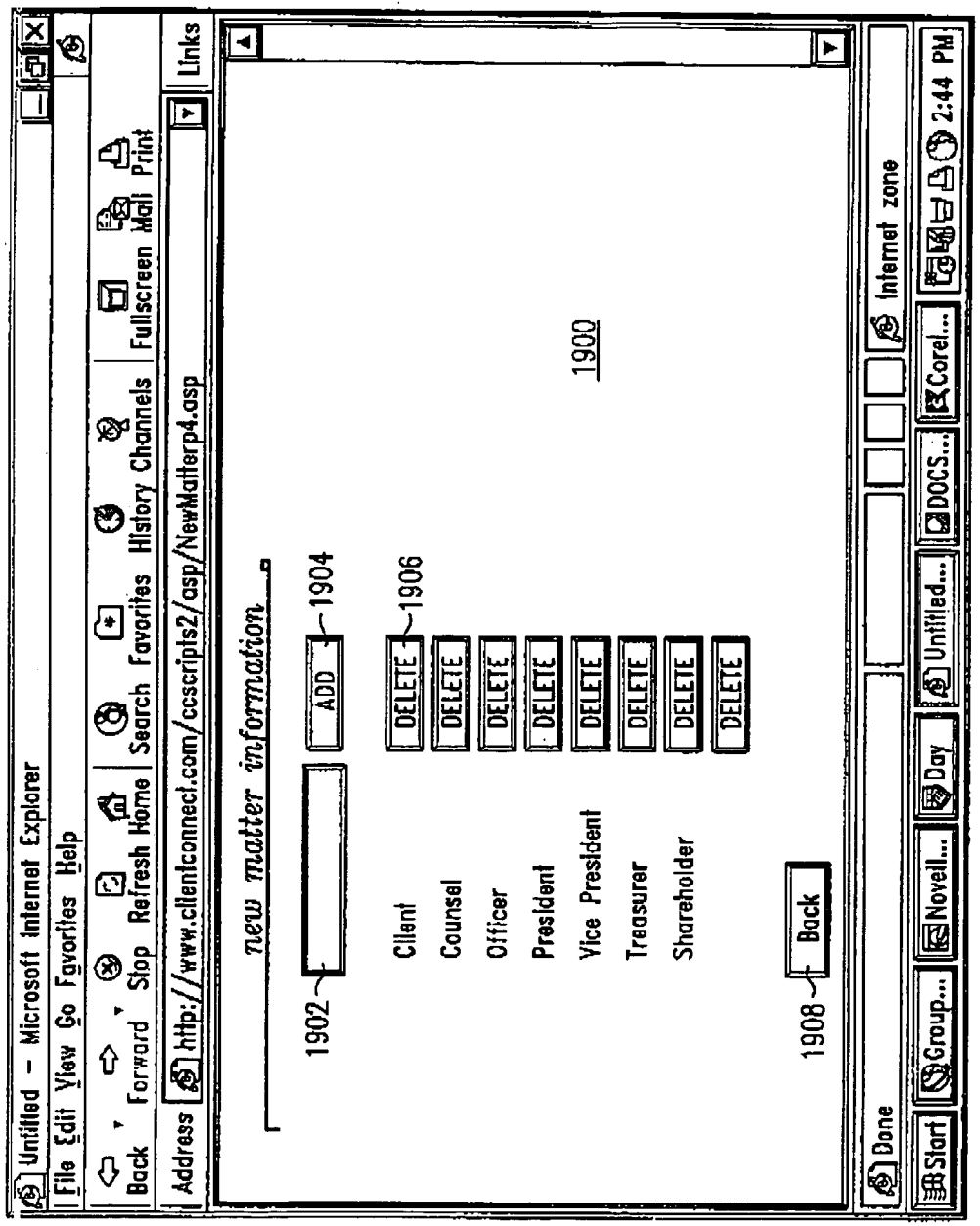

The screen 1800 includes a plurality of buttons for modifying the client level information for the new matter created using the screen 1700 (FIG. 17), including a "Change Roles" button 1802, an "Add or Modify Responsibility Parties" button 1804, an "Add or Modify Discuss Parties" button 1806, and an "Add or Modify Approved Parties" button 1808. Clicking on the Change Roles button 1802 results in the display of a "Change Roles" screen 1900, as shown in FIG. 19.

Using the Change Roles screen 1900, the user can delete roles designated using the Role Designation screen 1400 (FIG. 14) by clicking on a "Delete" button 1901 associated with the role to be deleted and can add new roles by entering the name of the role in a field 1902 and clicking on an "Add" button 1904. It will be recognized that the role changes are effective only for the matter created using the screen 1700 (FIG. 17). Clicking on a "Back" button 1906 returns the user to the screen 1800.

Figure 20:
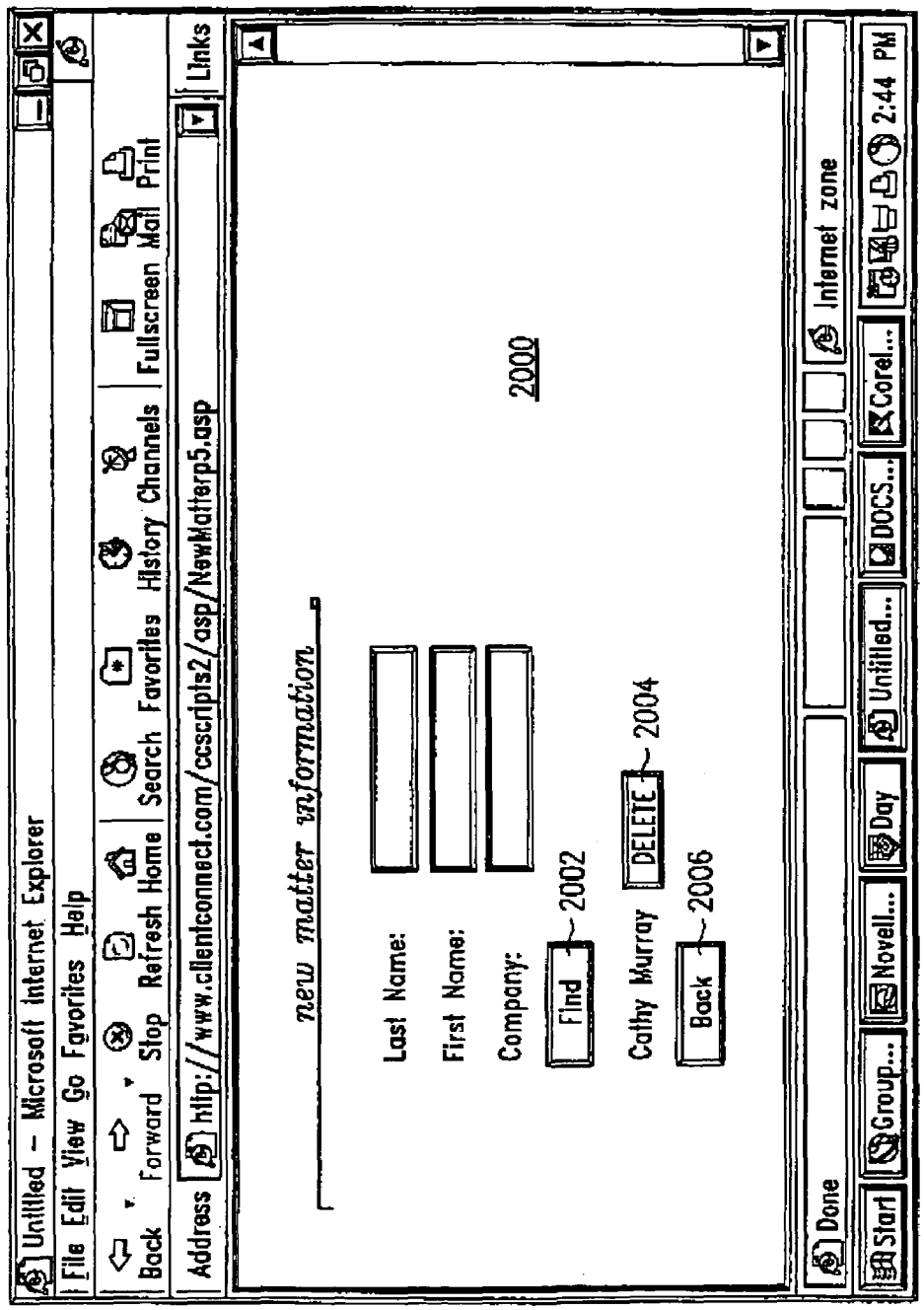

Referring again to FIG. 18, clicking on any of the buttons 1804, 1806, or 1808 results in the display of an "Edit User Group" screen 2000, as shown in FIG. 20. The screen 2000 operates in a similar fashion as the screen 1200 (FIG. 12) and clicking on a "Find" button 2002 results in the display of a screen similar to the screen 1300 (FIG. 13), with which the user can edit the user groups for the selected user. In addition, a user can be deleted from the user group by clicking on a "Delete" button 2004 associated with the user name. Clicking on a "Back" button 2006 returns the user to the screen 1800 (FIG. 18).

Figure 21:
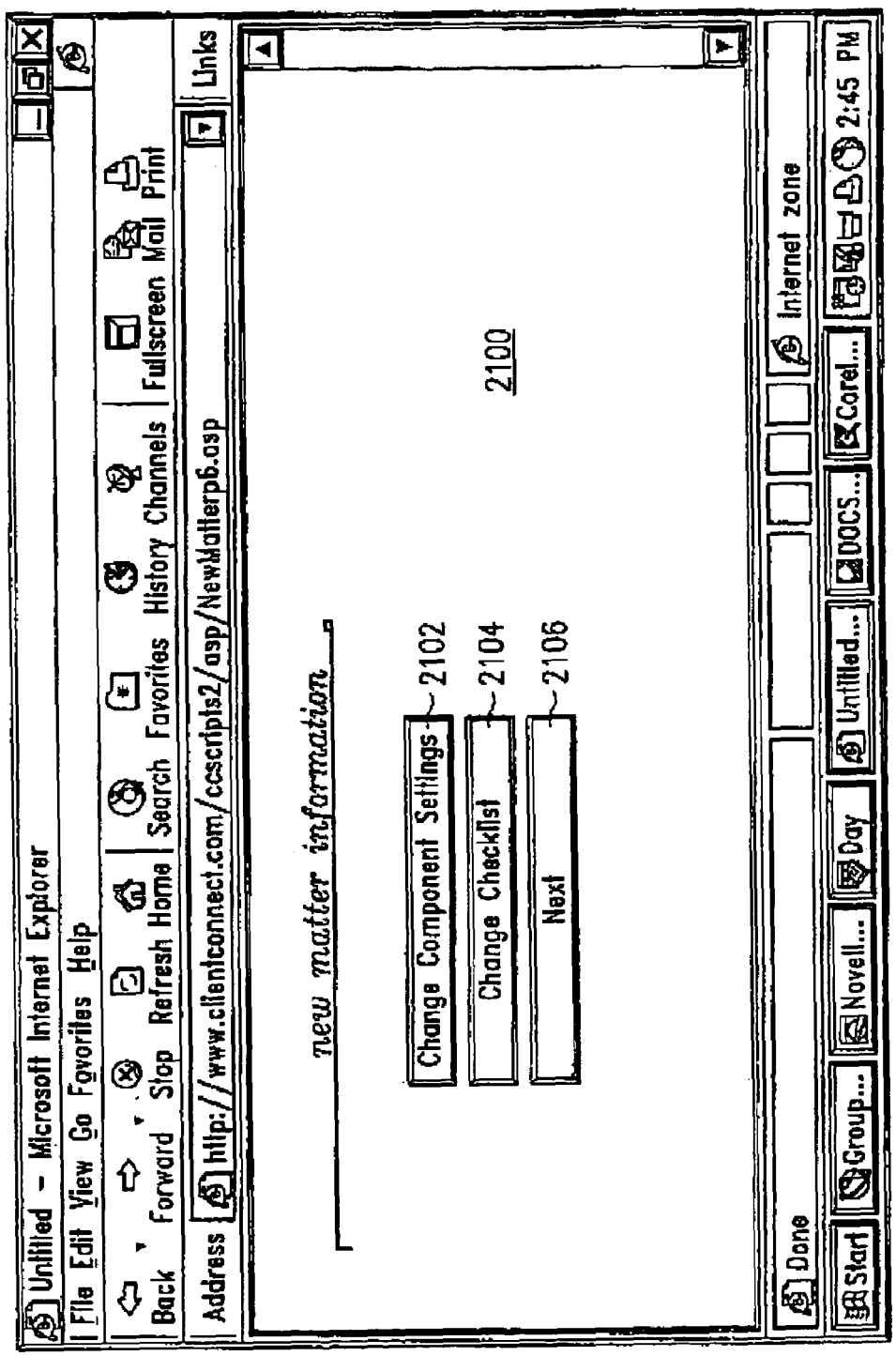
Figure 22:
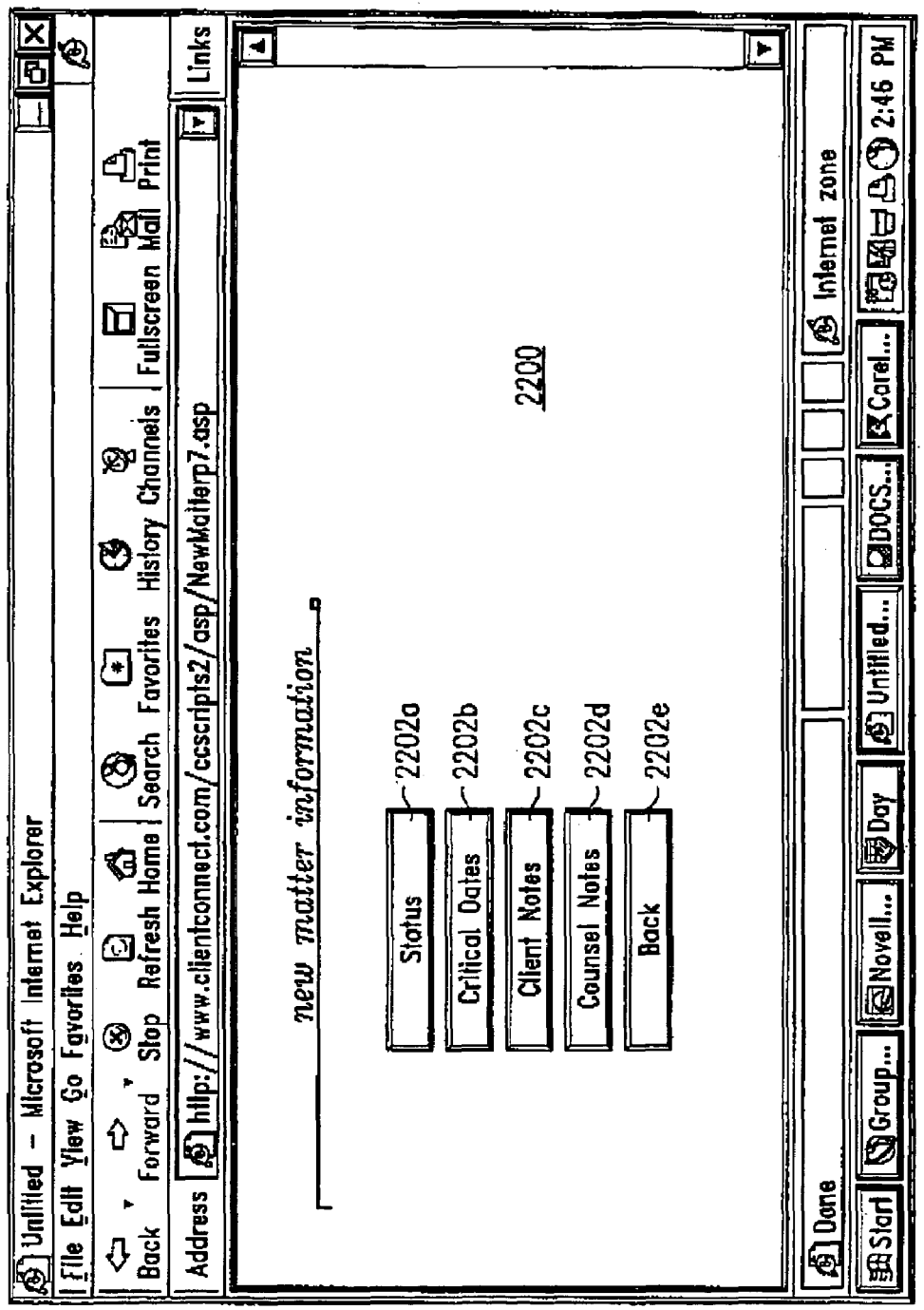
Figure 22A:
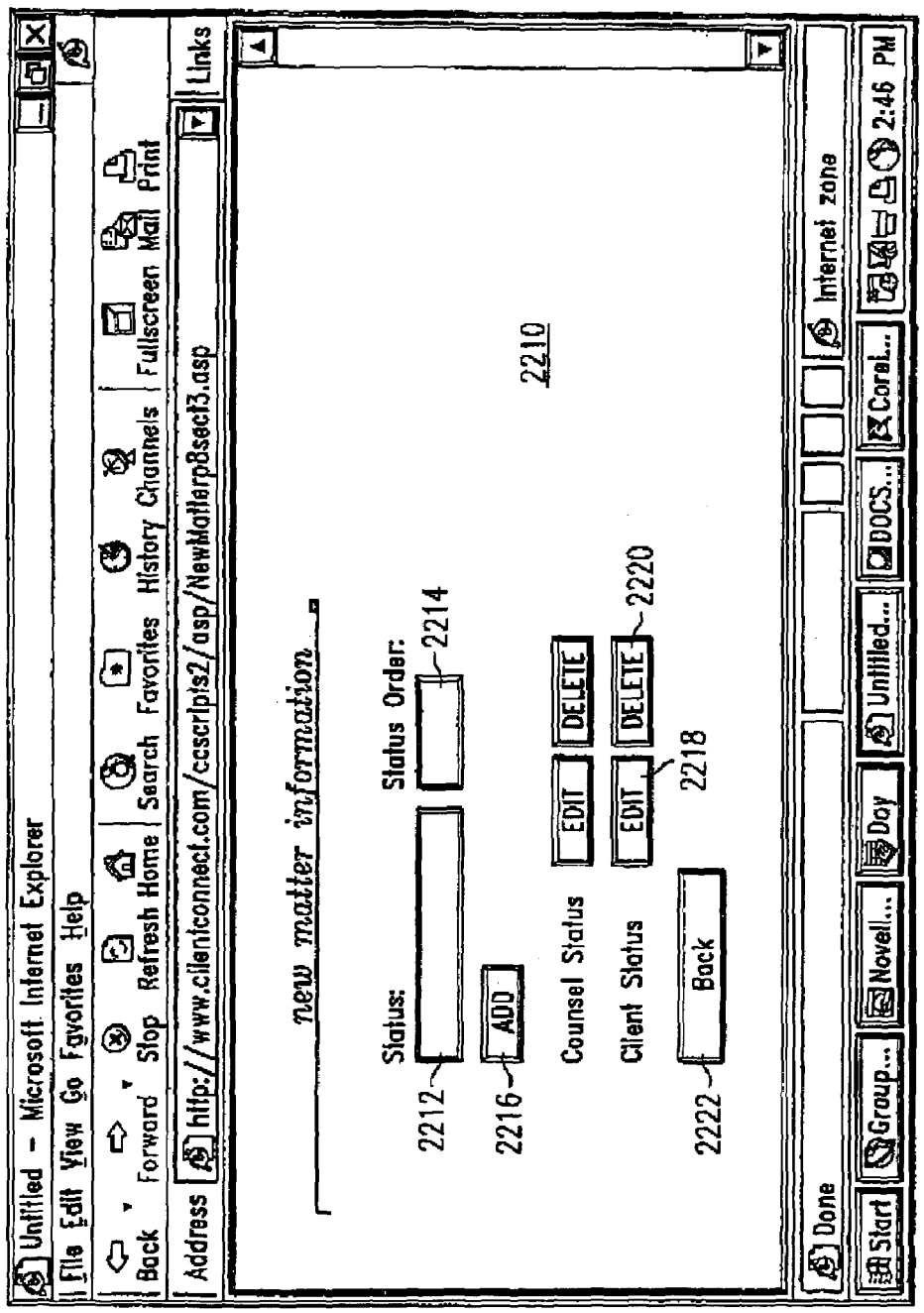

Clicking on a "Next" button 1810 results in the display of a "Change Component Settings" screen 2100, as shown in FIG. 21. The screen 2100 is used to change the component settings for the selected matter. Clicking on a "Change Component Settings" button 2102 results in the display of a "Component Selections" screen 2200, as shown in FIG. 22. Using this screen 2200, the user can change the component selections for any of the indicated components by clicking on the associated button 2202a–2202d. For example, clicking on the "Status" button 2202a results in the display of a "Modify Component Categories" screen 2210, as shown in FIG. 22a.

Using the screen 2210, the user can add a status category by entering the text for the category in a field 2212, the order in which the new category is to appear in a field 2214 and then clicking on an "Add" button 2216. Alternatively, the user can edit or delete existing categories by clicking on an associated "Edit" or "Delete" button 2218, 2220, respectively. Clicking on a "Back" button 2222 returns the user to the screen 2200 (FIG. 22). Similarly, from the screen 2200, clicking on a "Back" button 2202e returns the user to the screen 2100. It will be recognized that clicking on either of the buttons 2202b–2202d will results in the display of a screen similar to the screen 2200 for the respective component.

Figure 22B:
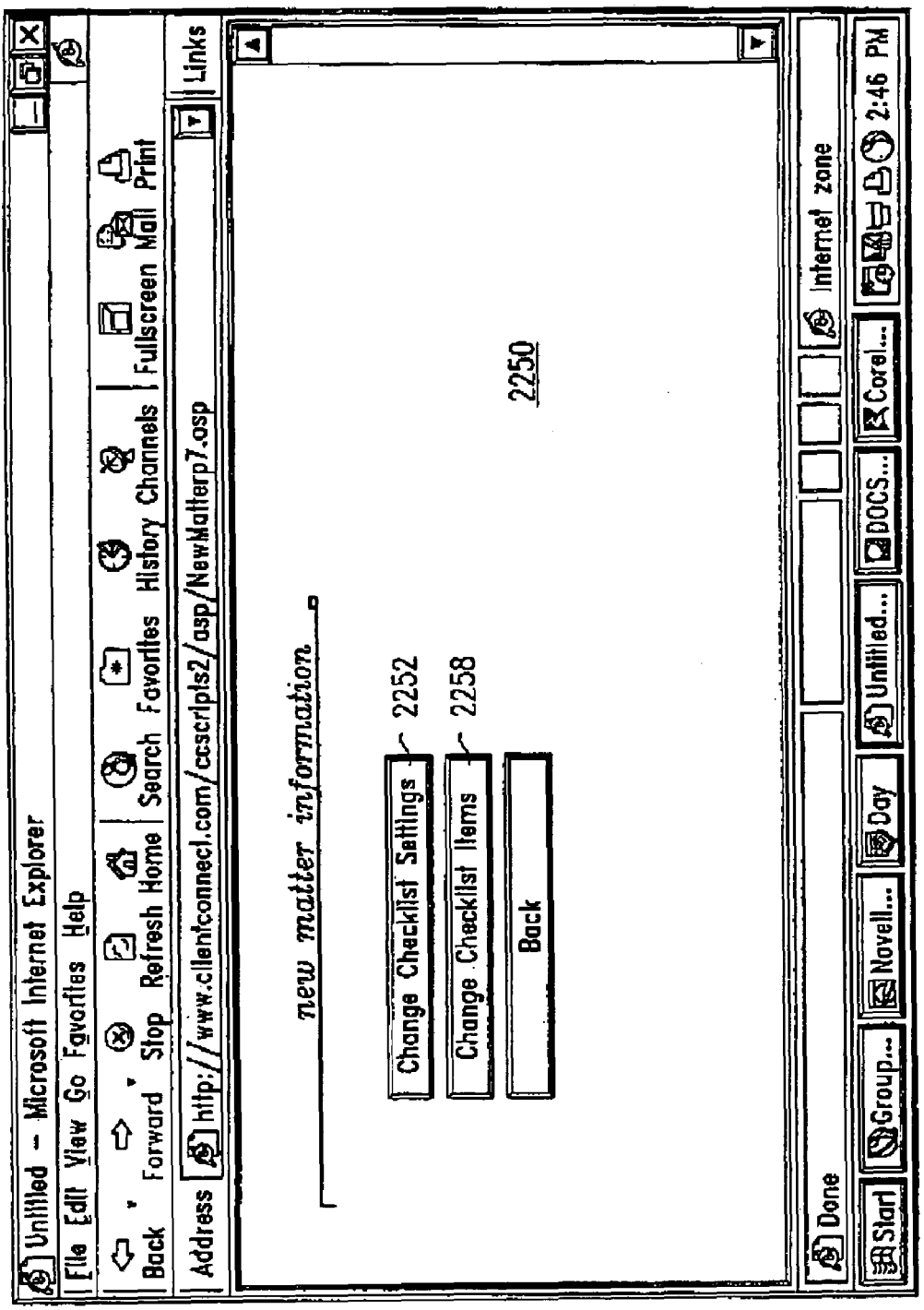
Figure 22C:
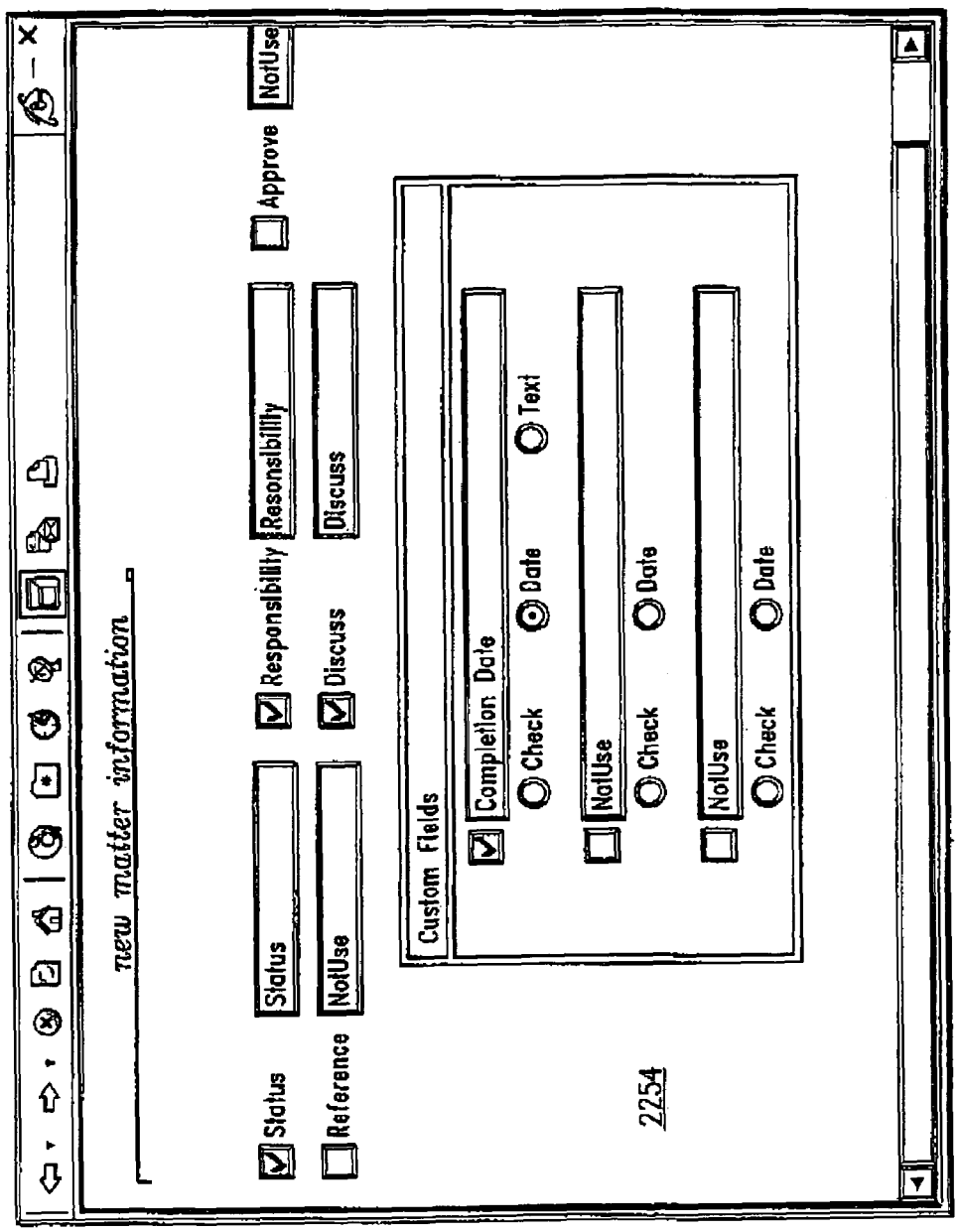
Figure 23:
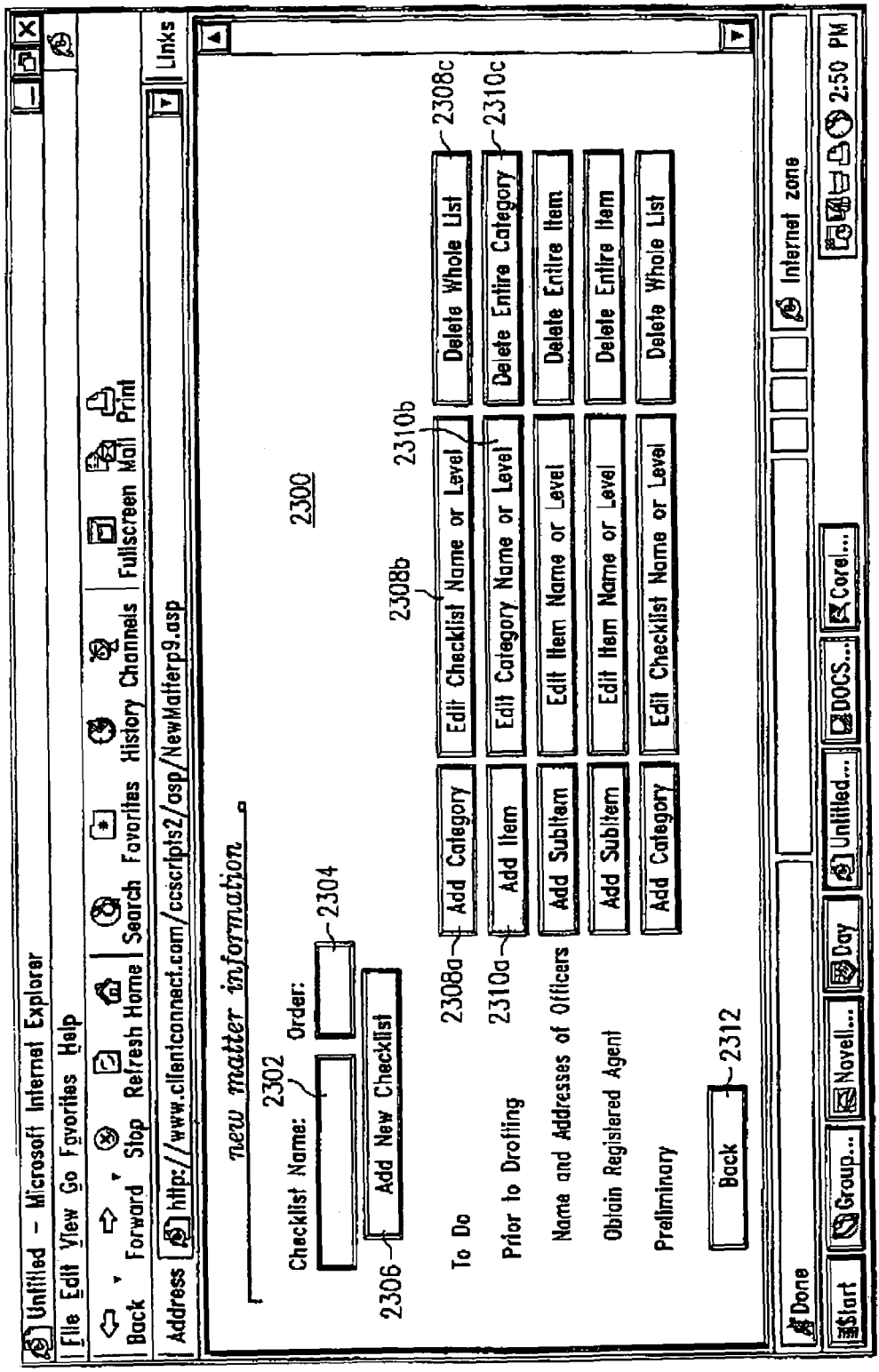

From the screen 2100, clicking on a "Change Checklist" button 2104 results in the display of a "Change Checklists" screen 2250 as shown in FIG. 22b. Clicking on a "Change Checklist Spettings" button 2252 results in the display of a "Change Checklists Settings" screen 2254 as shown in FIG. 22c. the Change Checklists Settings screen 2254 can be used to change checklist setting information on a matter level. Referring again to FIG. 22b, clicking on a "Change Checklist Items" button 2258 results in the display of a "Name Checklists" screen 2300, as shown in FIG. 23.

Using the Name Checklists screen 2300, the user can add a new Checklist by entering a name in a field 2302, a number indicating the order in which the new Checklist is to appear in a field 2304, and then clicking on an "Add New Checklist" button 2306. Alternatively, the user can modify an existing Checklist to add a category to a Checklist by clicking on an associated "Add Category" button 2308a, to edit the name or order of a Checklist by clicking on an associated "Edit Checklist Name or Level" button 2308b, or delete a checklist by clicking on an associated "Delete Whole List" button 2308c. Similarly, the user can add a new item under a category by clicking on an associated "Add Item" button 2310a, can edit the name or order of a category by clicking on an associated "Edit Category Name or Level" button 2310b, and delete an entire category by clicking on an associated "Delete Entire Category" button 2310c. It will be recognized that subitems can be added and items can be modified or deleted in a similar fashion as that described above.

Clicking on a "Back" button 2312 returns the user to the screen 2250 (FIG. 22b). Clicking on a "Back" button 2260 returns the user to the screen 2200 (FIG. 22). Similarly, from the screen 2200, clicking on the "Back" button 2202e returns the user to the screen 2100. From the screen 2100, clicking on a "Next" button 2106 results in the display of an "Add User Group" screen 2400 as shown in FIG. 24.

Figure 24:
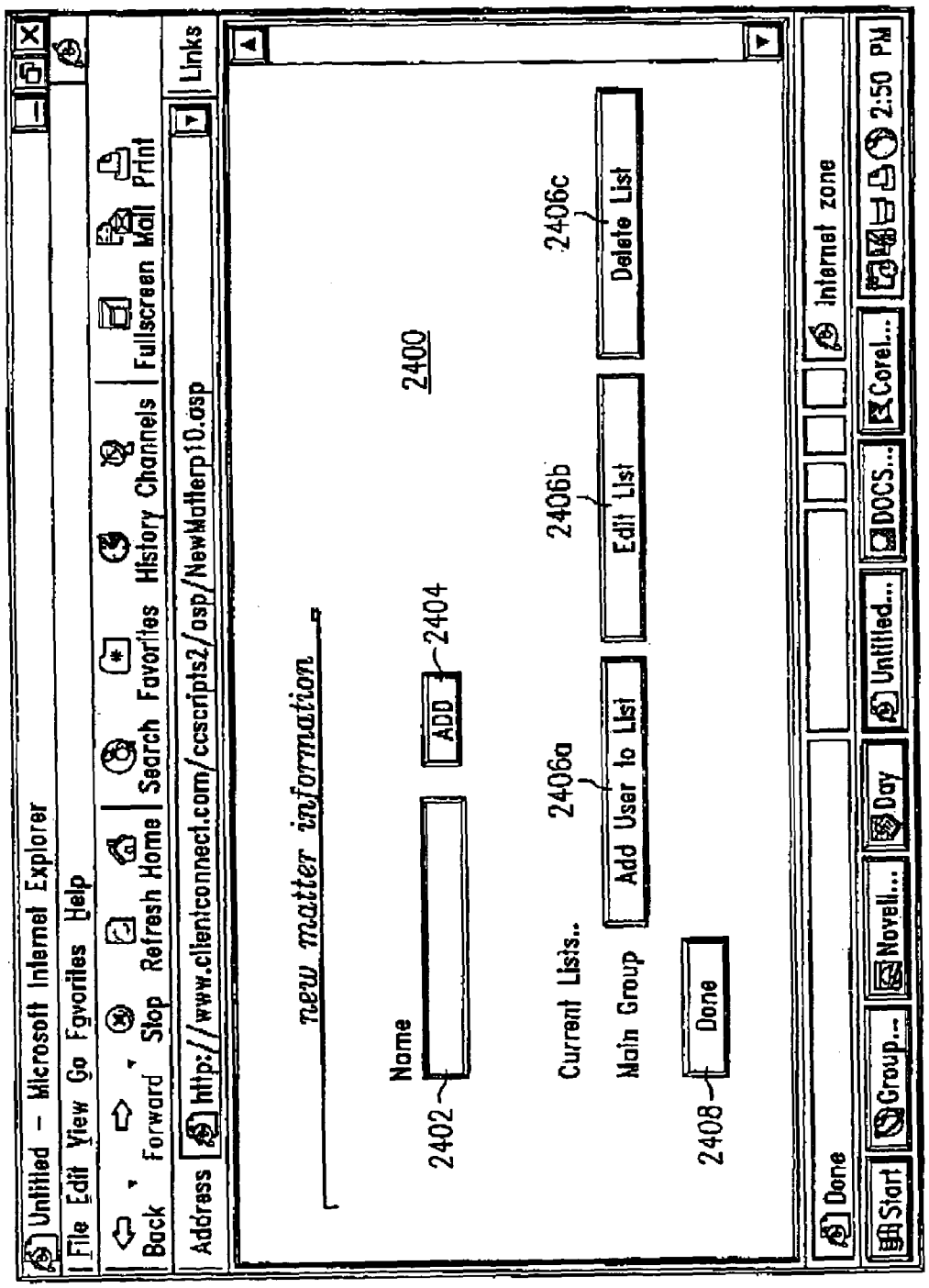

Referring to FIG. 24, a user can add a new user group by entering the name of the new user group in a field 2402 and clicking on an "Add" button 2404. These user groups are used on the front end of the application 12 in connection with the e-mail function, as will be described below. The user can modify an existing group, e.g, "Main Group," to add a new user to the group by clicking on an associated "Add User to List" button 2406a, to edit the group by clicking on an associated "Edit List" button 2406b, or to delete the entire group by clicking on an associated "Delete List" button 2406c.

Figure 25:
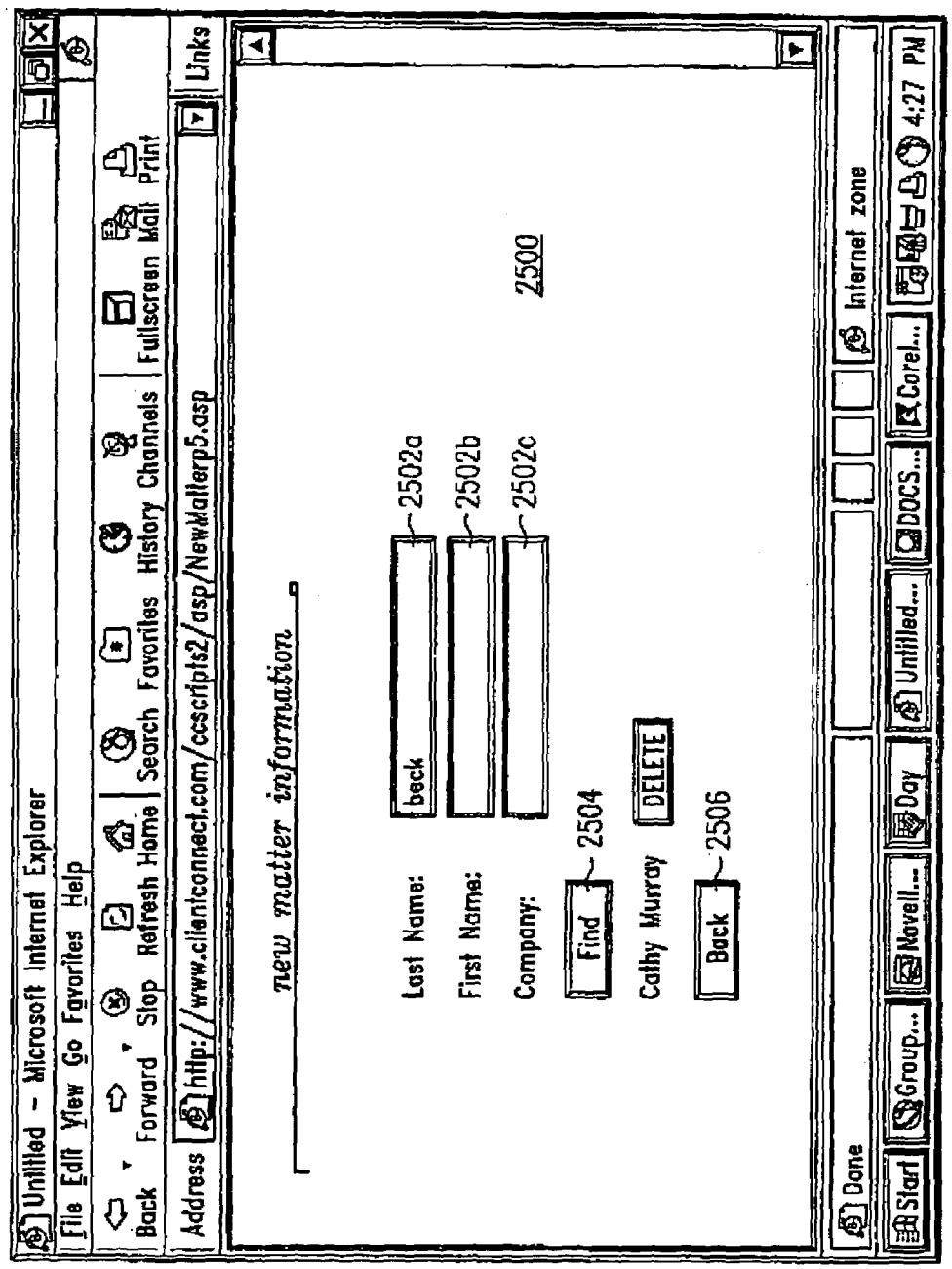
Figure 26:
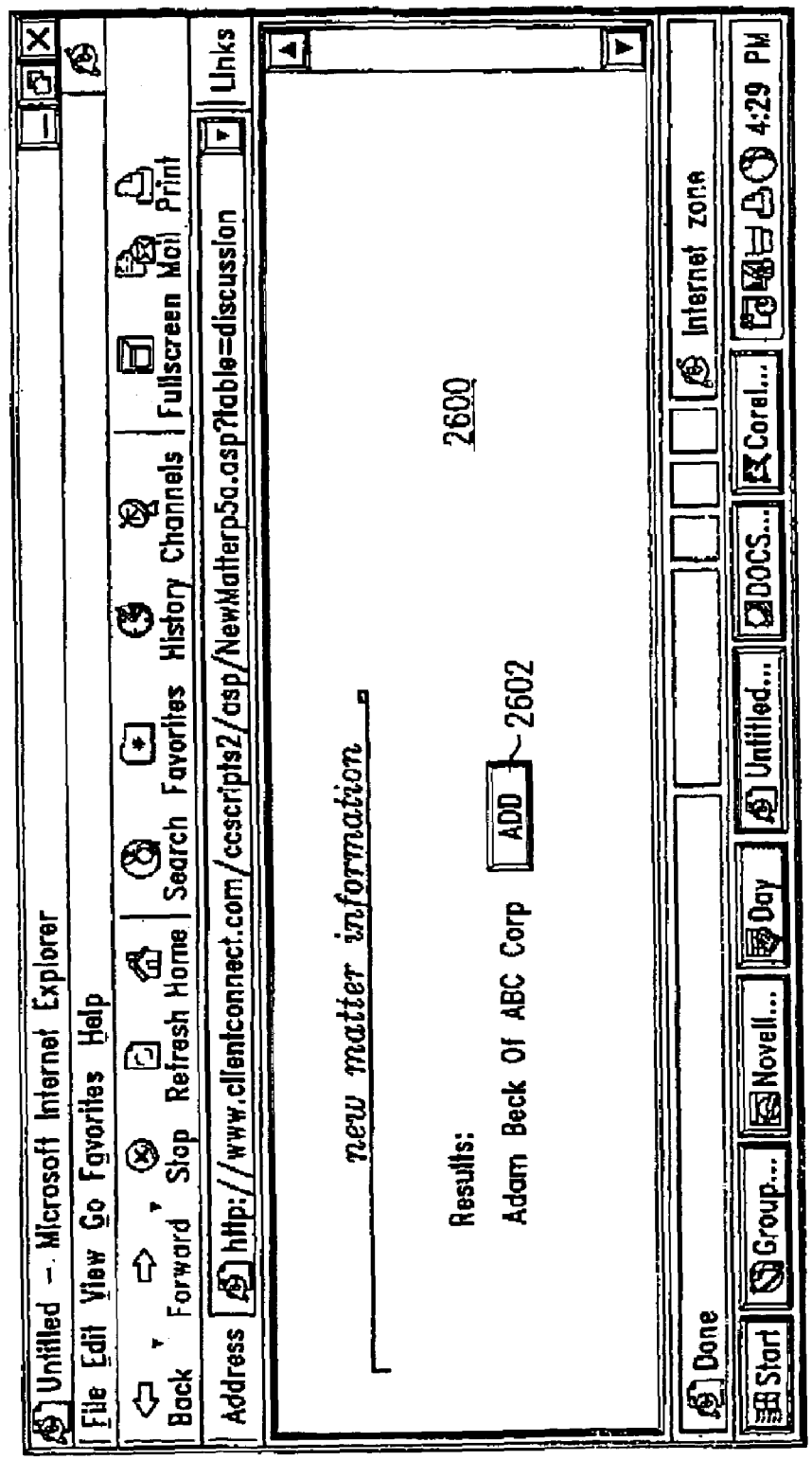

Clicking on the "Add User to List" button 2406a results in the display of a "User Search" screen 2500 as shown in FIG. 25. Using the screen 2500, the user can search for a user to add to the group by entering a portion of identifying information for the user in one or more of fields 2502a, 2502b, 2502c, and then clicking on a "Find" button 2504, resulting in the display of a "Search Results" screen 2600 as shown in FIG. 26 showing the results of the search using the criteria entered on the screen 2500 (FIG. 25). Clicking on an "Add" button 2602 adds the resultant user to the group and returns the user to the screen 2500 (FIG. 25).

From the screen 2500, clicking on a "Back" button 2506 returns the user to the screen 2400 (FIG. 24). Clicking on the Edit List button 2406b associated with a list allows the user to edit the associated user group list. Clicking on the Delete List button 2406c associated with a list deletes the entire user group list. Clicking on a "Done" button 2408 returns the user to the Main Menu screen 400 (FIG. 4).

It should be noted that the designations made using the screens illustrated in FIGS. 18–26 are "matter level" designations and allow the user to modify the Client-Level designations with respect to a particular matter.

Figure 27:
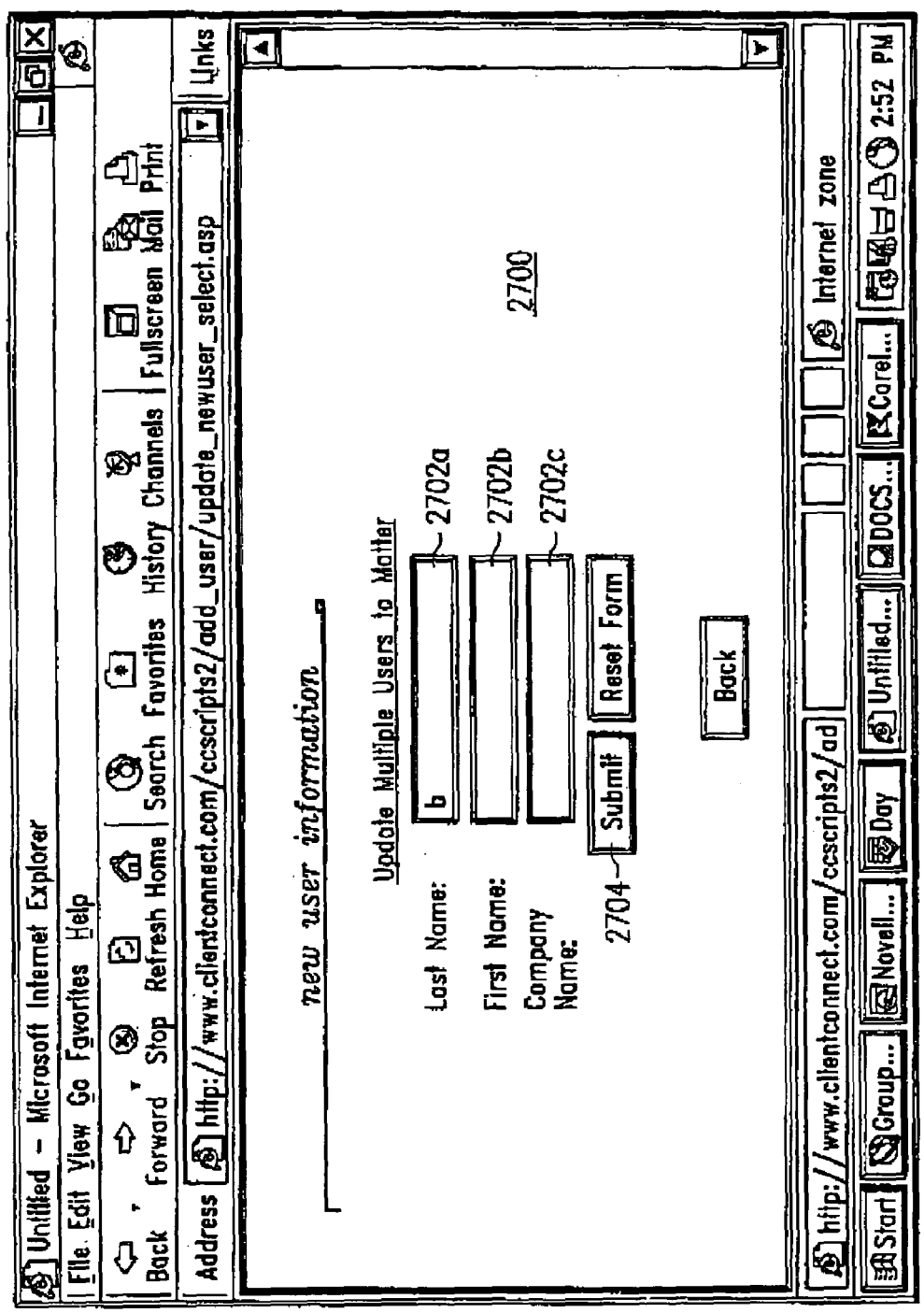
Figure 29:
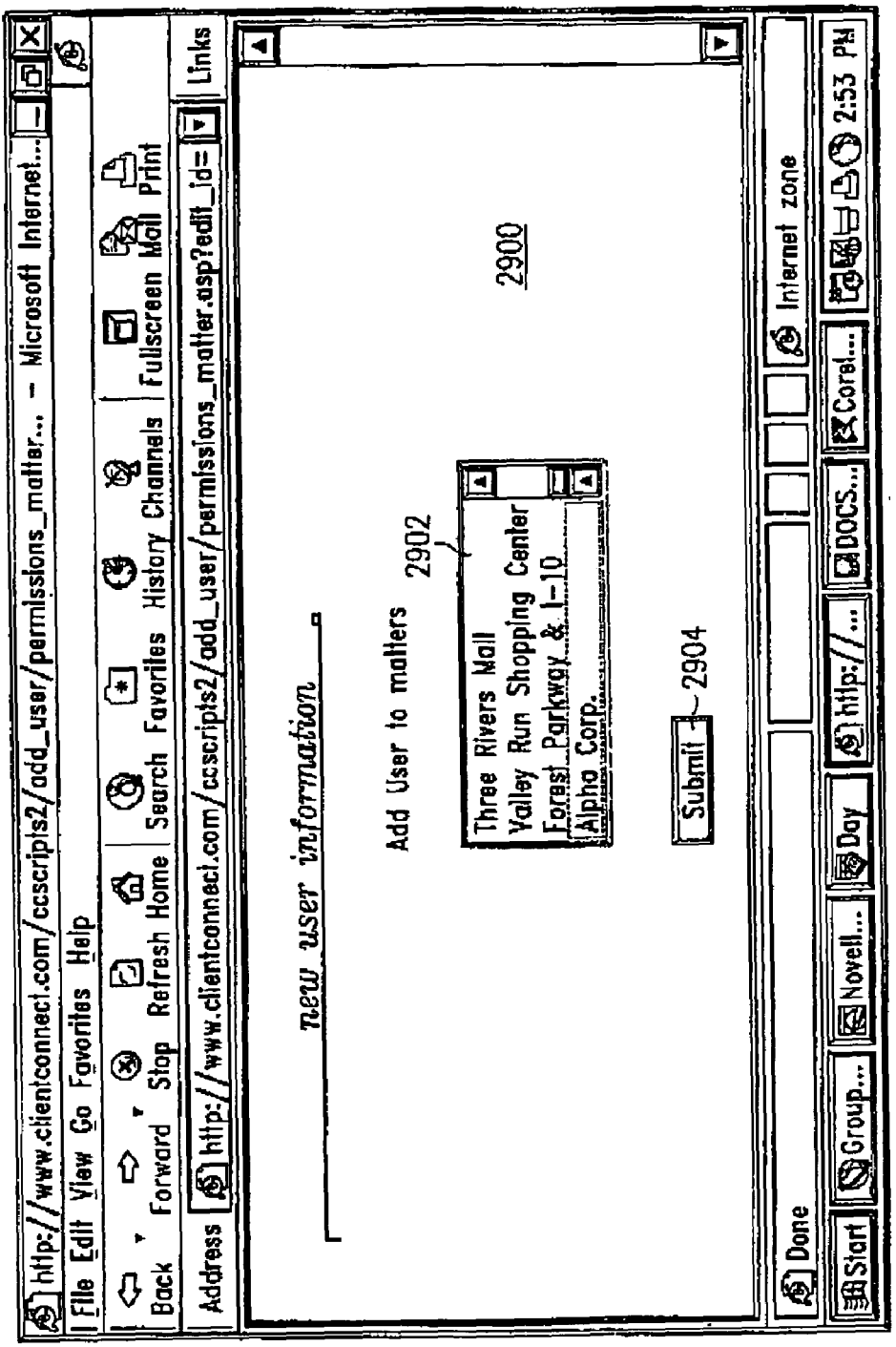
Figure 30:
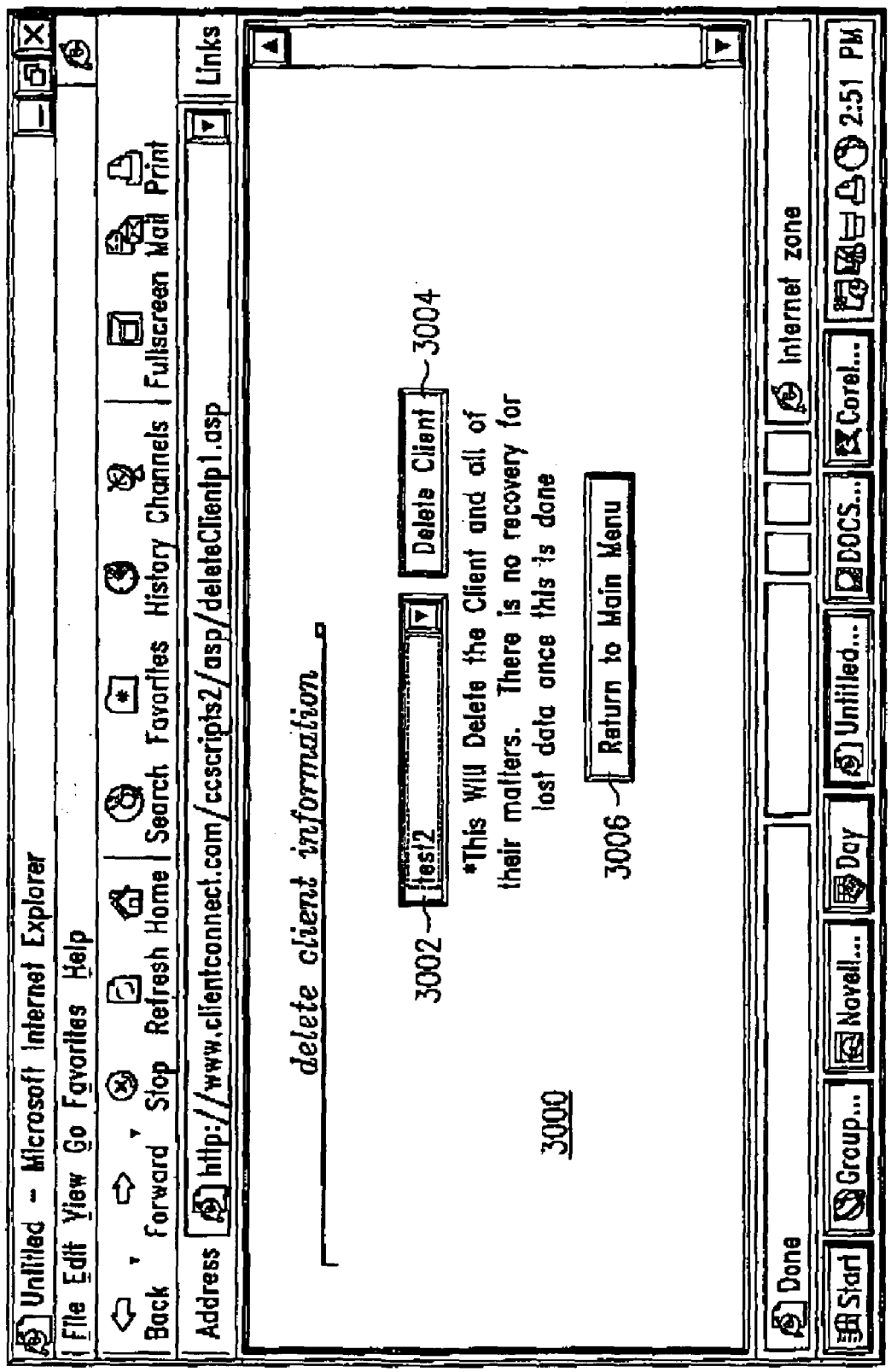

If in step 218, it is determined that the user has not clicked on the New Matter button 416a, in step 222, a determination is made whether the user has clicked on either the Edit/Delete User button 418b or the Roles and Permissions button 418d. If so, execution proceeds to step 224, in which a "Modify User Information" screen 2700, as shown in FIG. 27, is displayed. From the screen 2700, the user enters search criteria in the fields 2702a–2702c and then clicks on a "Submit" button 2704 to submit the criteria and initiate the search. FIG. 28 illustrates a "Search Results" screen 2800 for the criteria shown in FIG. 27. From this screen 2800, the user clicks on the appropriate phrase associated with a selected user to perform the indicated action. For example, clicking on "Permissions" for a user results in the display of an "Add User to Matters" screen 2900, as shown in FIG. 29, from which the user selects from a drop down menu 2902 the appropriate matter and then clicks on a "Submit" button 2904, resulting in the display of a "Specify User Access Levels" screen 2920, as shown in FIG. 29a.

Using the screen 2920, the user selects the various access levels for the selected user and matter by checking the appropriate boxes. For example, as shown in FIG. 29a, for the matter "Alpha Corp.", the selected user can view, add, edit, and delete information with respect to Client Status, Client Notes, Critical Dates, Reports, and Checklists and can view information with respect to Counsel Notes and Other Notes. Access can be restricted by checking only certain ones of "View," "Add," "Edit," and "Delete" for each of the components. Clicking on a "Submit" button 2922 submits the information entered using the screen 2920 and updates the permissions as indicated.

If in step 222, it is determined that the user has not clicked on the Edit/Delete User button 418b or the Roles and Permissions button 418d, execution proceeds to step 226. In step 226, a determination is made whether the user has clicked on the Delete Client button 414d. If so, execution proceeds to step 228, in which a "Delete Client" screen 3000 (FIG. 30) is displayed. Using the screen 3000, the user can select a client using a drop-down menu 3002 and then click on a "Delete Client" button 3004 to delete the client. Clicking on a "Return to Main Menu" button 3006 returns the user to the screen 400 (FIG. 4).

Figure 31:
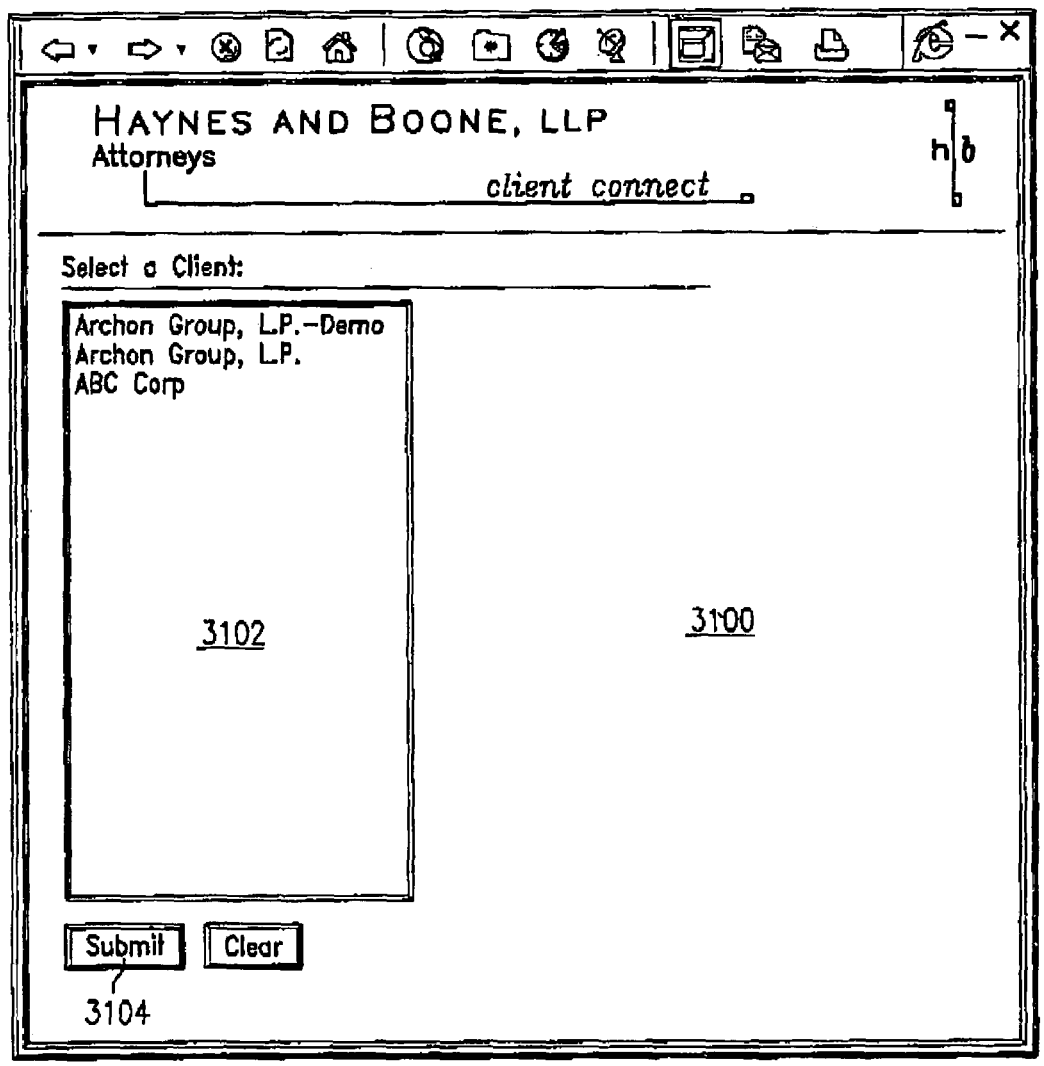
FIG. 31 illustrates a "Select a Client" screen of the application of FIG. 1 or 2.

If in step 226 it is determined that the user has not clicked on the Delete Client button 414d, execution proceeds to step 230, in which a determination is made whether the user has, from the Wizard Main Menu screen 400, clicked on a button 440 designated "Client Connect". If not, execution returns to step 212; otherwise, execution proceeds to step 232, in which a "Select a Client" screen 3100, as shown in FIG. 31, is displayed. Alternatively, a separate web site address and/or log in procedure similar to that described in with reference to FIG. 4 for the Wizard portion can be required for the Client Connect portion of the application described hereinbelow. In any event, using the Select a Client screen 3100, the user selects an appropriate entry from a list 3102 of entries each of which corresponds to a client. It should be recognized that each of the clients of the list 3102 were set up using the New Client Information screen 500 as shown in and described above with reference to FIG. 5. To select a particular entry, e.g., "ABC Corp.", the user highlights the entry and then clicks on a "Submit" button 3104.

Figure 32:
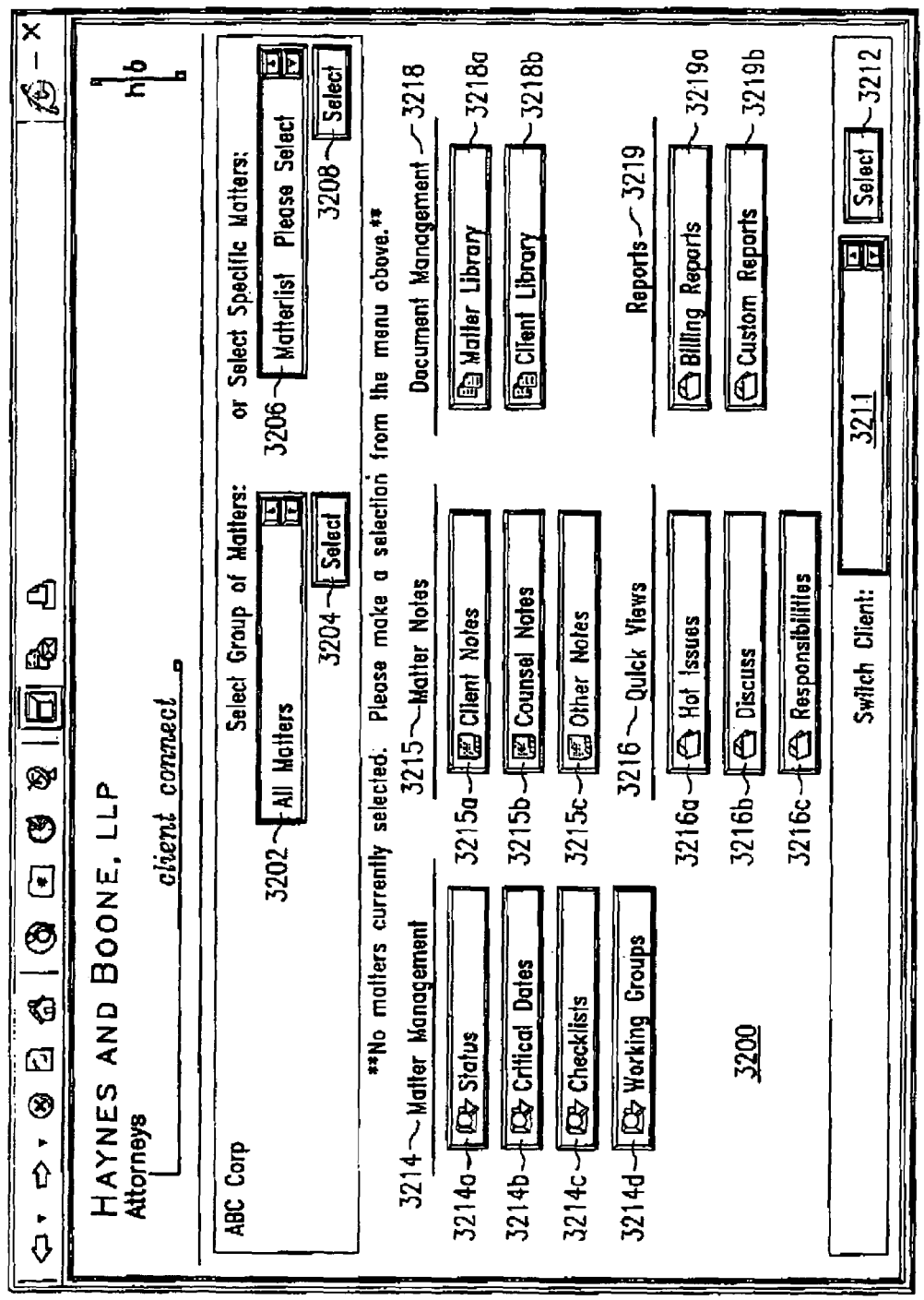
FIG. 32 illustrates a "Main Menu" screen of the application of FIG. 1 or 2.

Once the user has selected a client as explained above with reference to FIG. 31, execution proceeds to step 234, in which a "Front End Main Menu" screen 3200 is displayed, as shown in FIG. 32. At the Main Menu screen 3200, the user is prompted to select one or more matters within the previously selected client. Specifically, the user can select a group of matters by using a drop down menu 3202 to select a group and then clicking on a "Select" button 3204 or can select a specific matter by using a drop down menu 3206 to select a matter and then clicking on a "Select" button 3208. It should be recognized that each of the matters and groups of matters available for selection on the screen 3200 are set up using the Practice Area/Client Work Group Designation Screen 600 (FIG. 6) and the New Matter Designation screen 700 (FIG. 7), respectively, as described above.

If at any time the user determines that he or she would like to select a different client/division combination, rather than returning to the screen 3100, he or she may do so from the Main Menu screen 3200 by using up/down arrows 3210 to display a desired client/division combination in a field 3211 and then clicking on a "Select" button 3212.

Once the user has selected one or more matters, as described above, the user may then access specific types of transaction and matter management information tracked by the application 12 by clicking on one of a plurality of buttons displayed on the Main Menu screen 3200. For ease of location and use, the buttons are divided into several categories, respectively designated "Matter Management" 3214, "Matter Notes" 3215, "Quick Views" 3216, "Document Management" 3218, and "Reports" 3219. The buttons included in the Matter Management category 3214 include "Status" 3214a, "Critical Dates" 3214b, "Checklists" 3214c, and "Working Groups" 3214d. The buttons included in the Matter Notes category include "Client Notes" 3215a, "Counsel Notes" 3215b, and "Other Notes" 3215c. The buttons included in the Quick Views category 3216 include "Hot Issues" 3216a, "Discuss" 3216b, and "Responsibilities" 3216c. The buttons included in the Document Management category 3217 include "Matter Library" 3217a, and "Client Library" 3217b. The buttons included in the Reports category 3218 include "Billing Reports" 3218a and "Custom Reports" 3218b. Several of the more important functions and features accessible using these buttons will be described below.

It should be noted that the activation of buttons displayed on the screen 3200 is specified using the Select Components screen 800, as described above in connection with FIG. 8.

Figure 33:
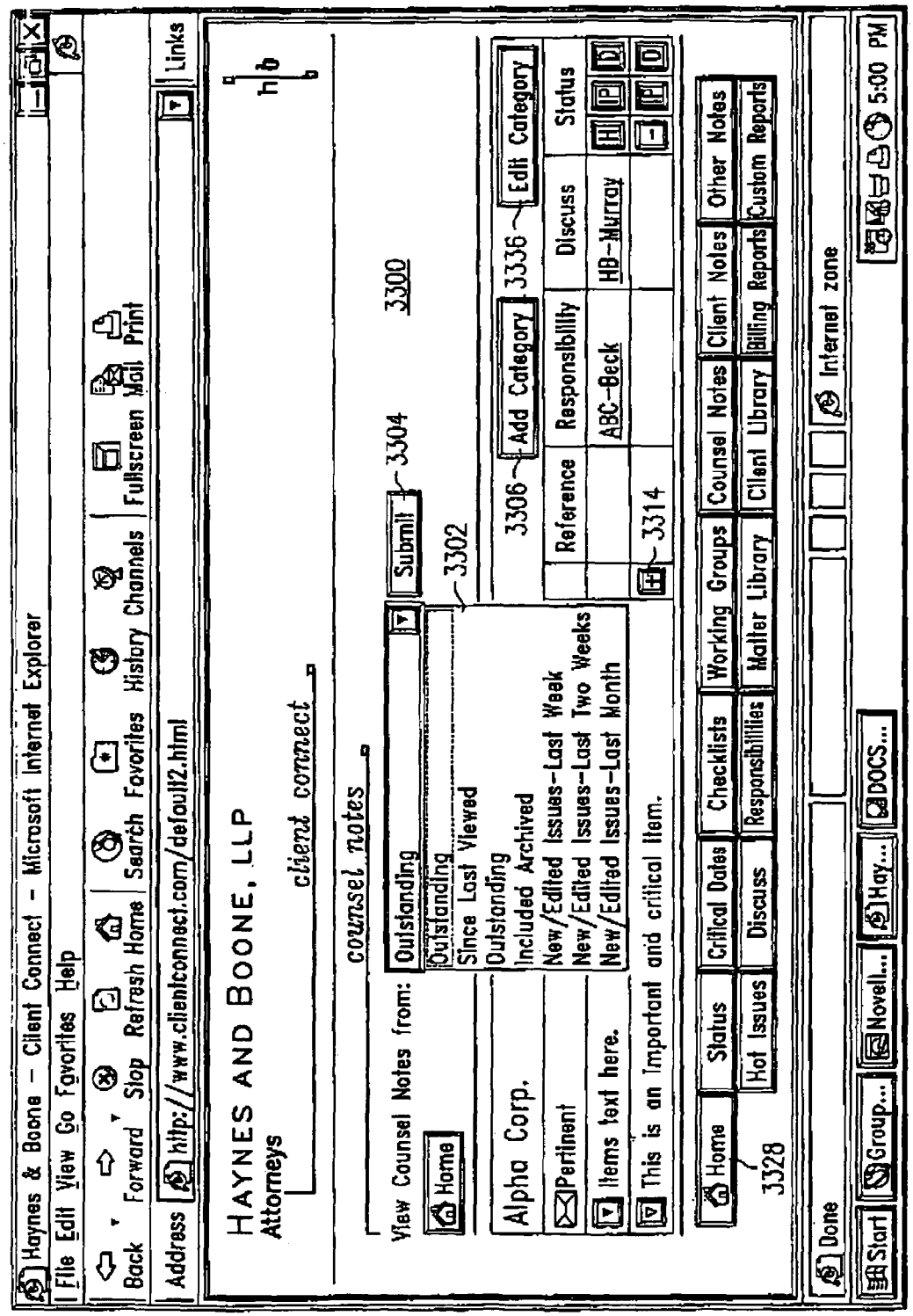

Referring again to FIGS. 2a–2c, in step 236, a determination is made whether the user has clicked on the Counsel Notes button 3215b. If so, execution proceeds to step 238, in which the user is able to add, edit and/or view counsel notes as described below. In particular, the Counsel Notes button 3215b provides access to counsel issues entered by any authorized counsel user identifying important legal issues, reminders, or action items, sorted by project or matter. It should be noted that only users designated as "counsel" will be able to modify (i.e., add or edit) counsel notes. As will be described in detail below, each issue or item can be tagged "Hot Issue" or "Discuss With" a specific client user. An exemplary "Counsel Notes" screen 3300 is illustrated in FIG. 33. The user is able to filter the items for which status is requested according to when the item was last edited by selecting a filter from a drop-down menu 3302 and then clicking on a "Submit" button 3304. As shown in FIG. 33, exemplary filters include "Outstanding," "Since Last Viewed," "Included Archived," "New/Edited Issues-Last Week," "New/Edited Issues-Last Two Weeks," and "New/Edited Issues-Last Month." Once a selection is made, the appropriate items will be displayed on the screen 3300.

The Counsel Notes screen 3300 displays the name(s) of the selected matter(s) with corresponding categories and items within those categories displayed thereunder. For example, the matter "Alpha Corp." includes one category "Pertinent".

Figure 33A:
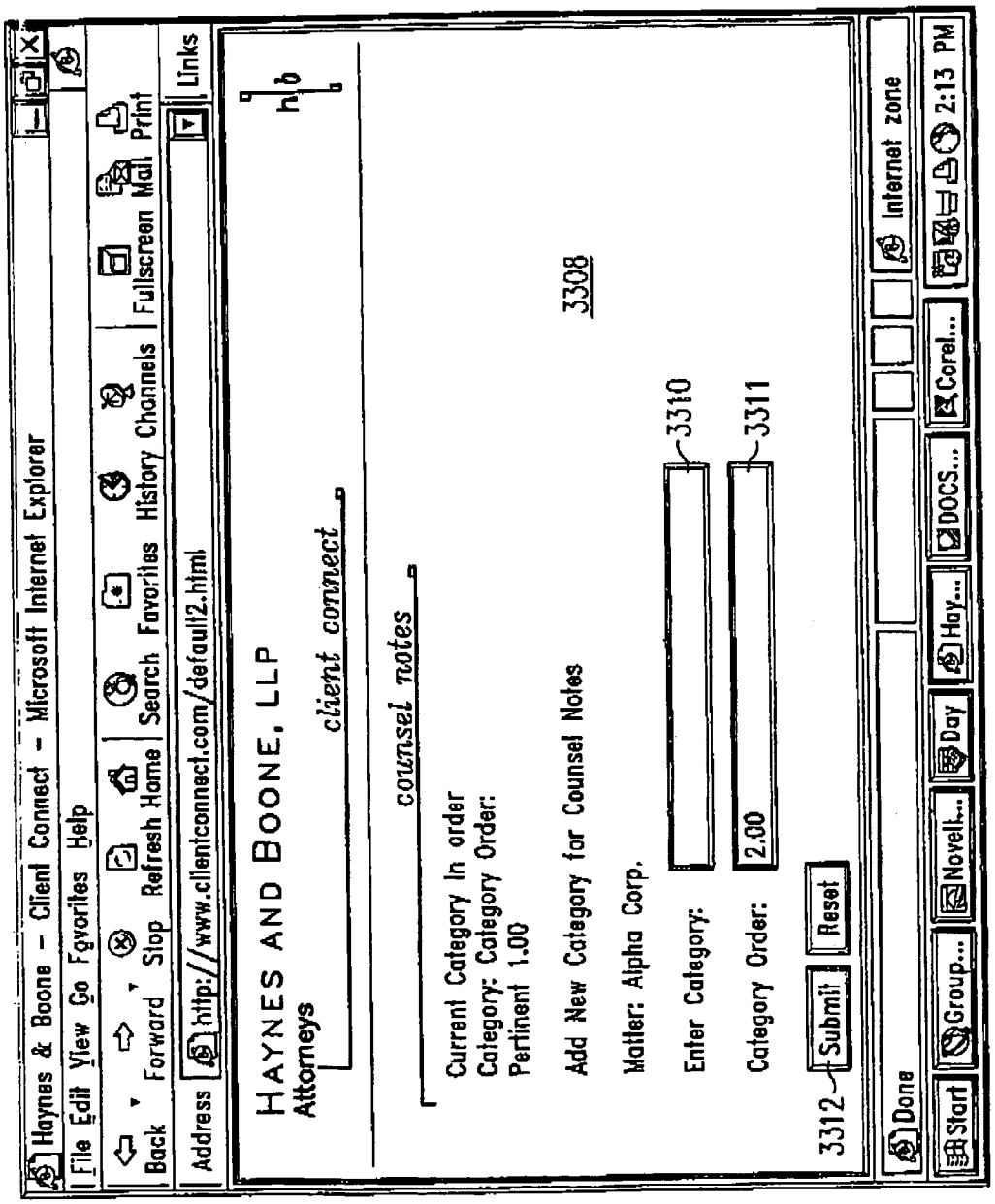
FIG. 33a illustrates an "Add Category" screen of the application of FIG. 1 or 2.

To add a new category to a matter in connection with a component, the user simply clicks on an "Add Category" button 3306 corresponding to the matter in connection with which a category is to be added, resulting in the display of an "Add Category" screen 3308, as shown in FIG. 33a. Using this screen, the user fills in the name of the category to be added in a field 3310, fills in the order of the category in a field 3311, and then clicks on a "Submit" button 3312 to add the category and return to the screen 3300.

Figure 33B:
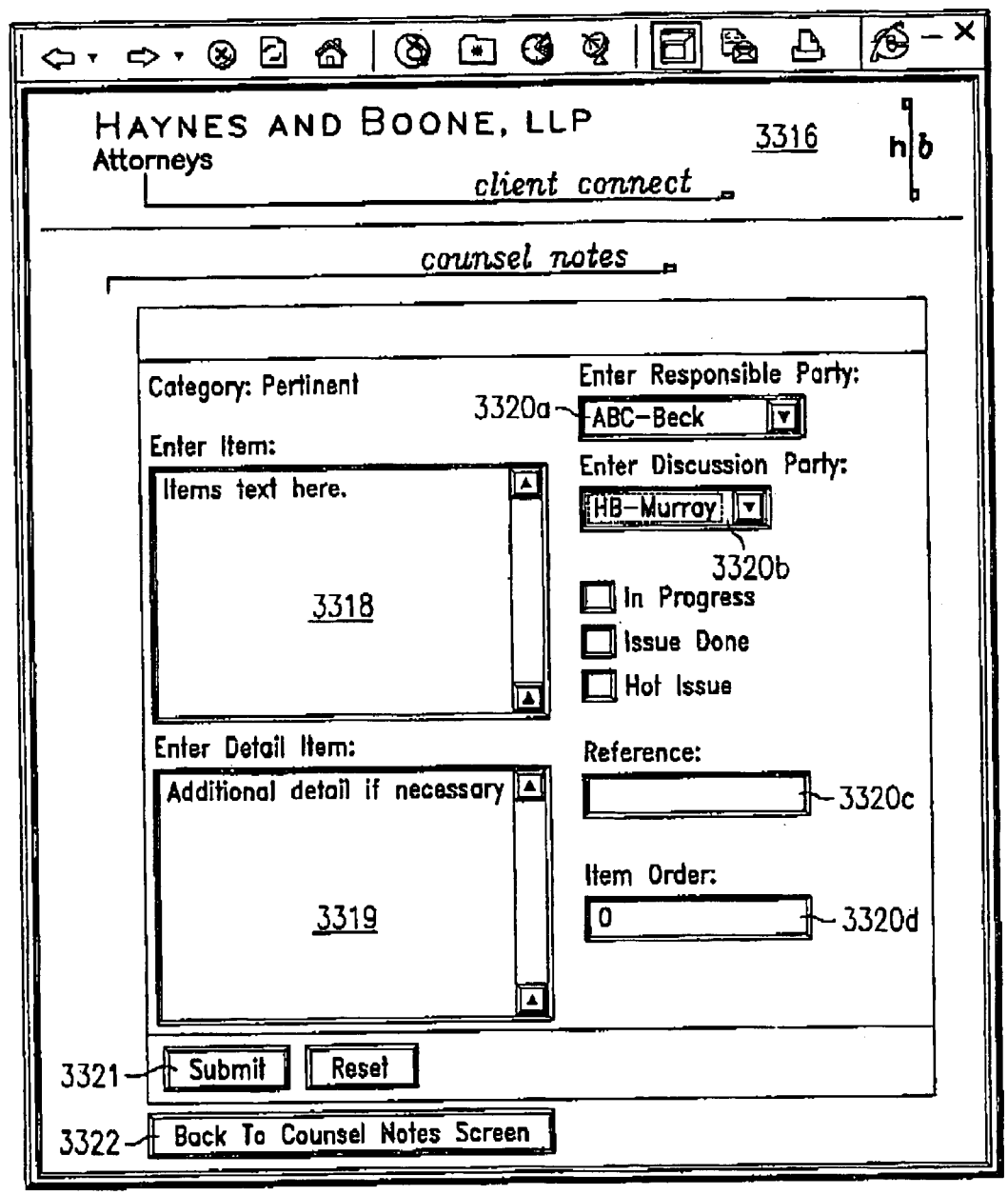
FIG. 33b illustrates an "Add Item" screen of the application of FIG. 1 or 2.

Similarly, to add a new item to a category, the user simply clicks on an "+" button 3314 corresponding to the category in connection with which the item is to be added, resulting in the display of an "Add Item" screen 3316, as shown in FIG. 33b. Using this screen 3316, the user enters the name of the item to be added in an "Enter Item" field 3318 and may enter information concerning the item status in an "Enter Item Detail" field 3319. The item can be tagged as "In Progress," "Done," and/or "Hot" by checking respective boxes labeled "In Progress" (3319a), "Issue Done" (3319b) and/or "Hot Issue" (3319c). It should be noted that an item tagged "Done" will not be displayed on the screen 3300 unless the filter "Included Archived" has been selected. A responsible party, discussion party, reference, and order for the item can be entered in respective fields 3320a, 3320b, 3320c and 3320d. Once the information has been entered, the user clicks on a "Submit" button 3321 to add the item. To return to the screen 3300, the user click on a "Back To Issues Main Menu" button 3322.

Figure 33C:
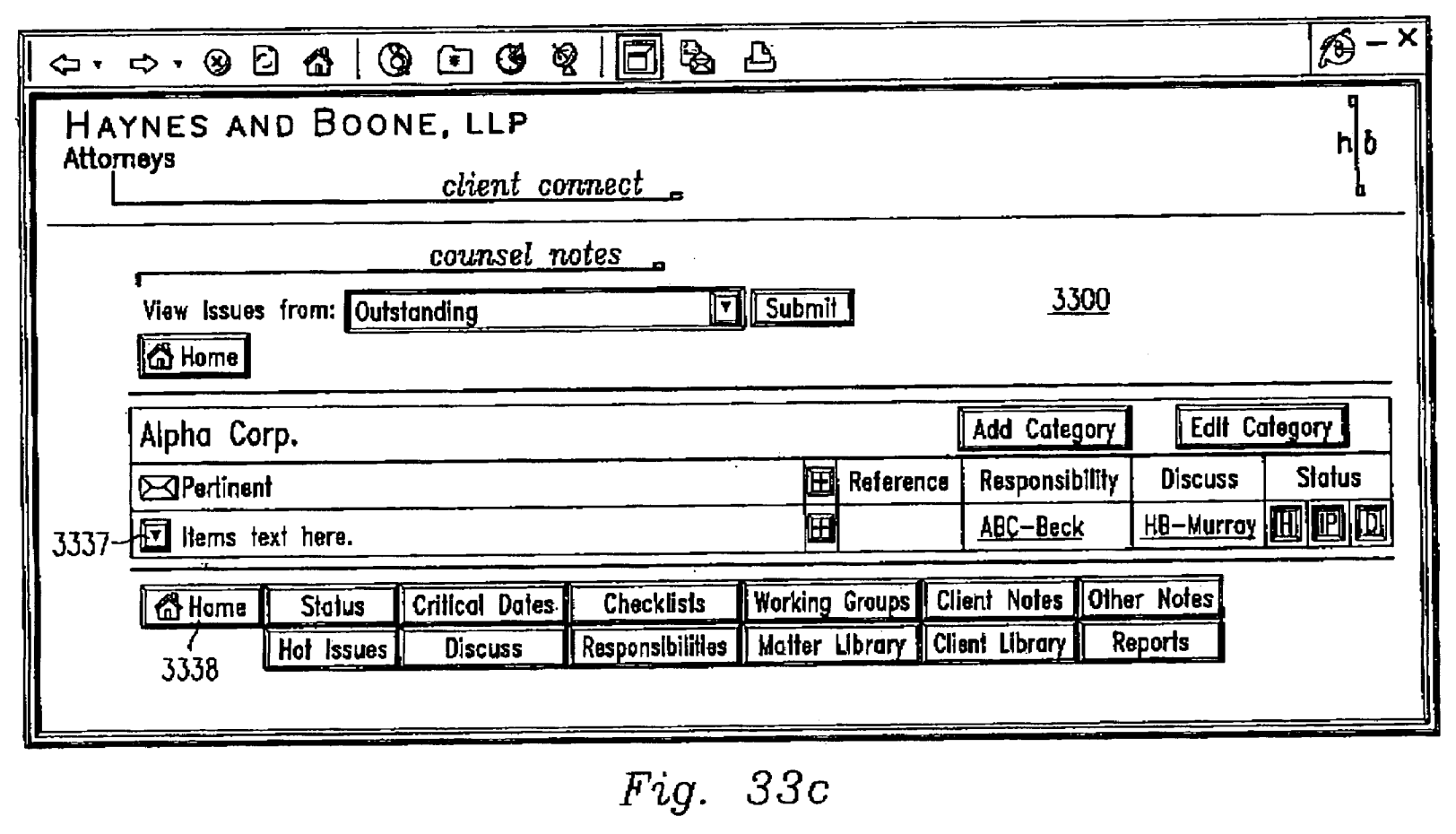

FIG. 33c illustrates the screen 3300 (FIG. 33) after the item has been added as illustrated in FIG. 33b. It should be noted that sub-items are added in much the same way as items; that is, by clicking on a "+" button 3323 of the item in connection with which the sub-item is to be added. It should be noted that the reference and the responsible and discussion parties, if any, will be indicated in the "Reference," "Responsibility" and "Discuss" columns, respectively, for the item. In addition, if the item has been tagged as "In Progress," "Issue Done," or "Hot Issue," a corresponding icon ("IP," "D," or "H," respectively) will be highlighted in the Status column. In addition, an item's "tag" can be changed by clicking on the corresponding icon to toggle it from active (highlighted) to inactive (shaded). For example, an item that had been tagged as "Hot" will have a highlighted "H" icon displayed in connection therewith. If the item is no longer considered "Hot", the user can click on the "H" icon to deactivate the tag with respect to the item. Changing an items status as "In Progress" and "Done" is accomplished in the same fashion.

Figure 33D:
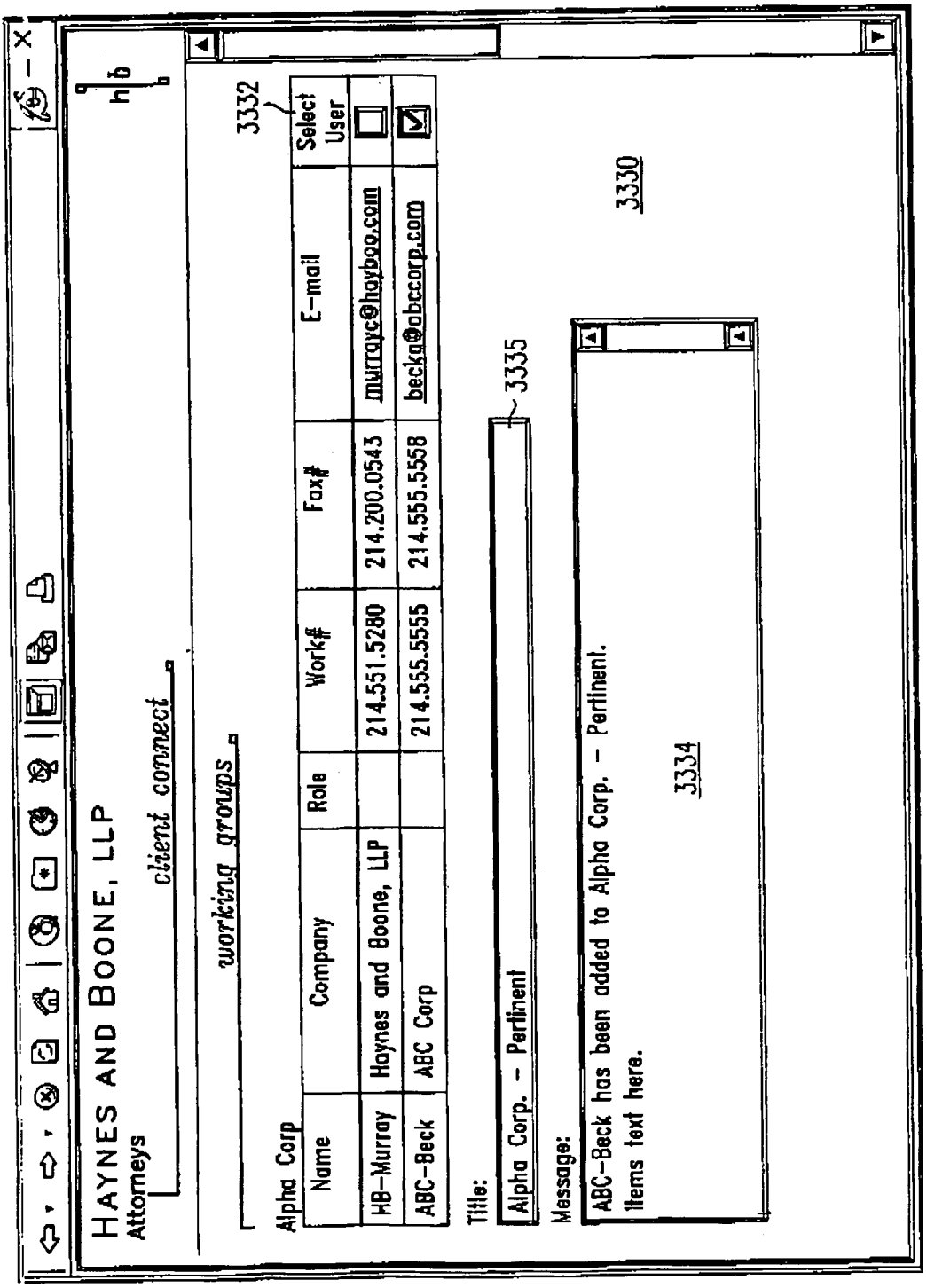

In addition, it should be noted that the name of each category is preceded by a small icon 3328 resembling an envelope. Clicking on this icon automatically takes the user to a "Working Groups E-Mail" screen 3330, as shown in FIG. 33d, comprising a list of each responsible party for the category, his or her company affiliation, role, telephone number, fax number, and E-mail address. The user can E-mail any member of a working group directly from the application 12 simply by clicking on a check box for the user in a "Select User" column 3332 and then typing a the message in a "Message" field 3334. The matter and category name is automatically included in a "Title" field 3335 for the E-mail correspondence.

In one embodiment, the E-Mail screen 3330 includes a list of all of the user groups established by the user (Add User Group screen 2400, FIG. 24). The user can then select one of the user groups and send the e-mail to all or selected members of the selected user group.

Referring again to FIG. 33, to edit a category, the user clicks on an "Edit Category" button 3336 and is prompted to select a category to be edited, at which point the Add Category screen 3308 (FIG. 33a) for the category is redisplayed and the user can make any desired changes. Items and sub-items may be edited in a similar fashion. Referring to FIG. 33c, an icon 3337 is used to indicate to the user whether additional information (i.e., "Item Detail") is available for the item with which the icon 3337 is associated. In particular, if the icon 3337 is a particular color (e.g., blue), the user should be alerted to the fact that there is additional information to that can be accessed by clicking on the icon 3337; otherwise, no additional information is available.

As best shown in FIG. 33c, a menu bar 3338 is displayed near the bottom of the screen 3300 and includes a "Home" button 3339 to return the user to the Main Menu screen 3200 and buttons corresponding to each of the buttons 3214a–3214d, 3215a, 3215c, 3216a–3216c, 3217a, and 3217b, as well as a button 3340 corresponding to the Reports category 3218. It will be noted that a button corresponding to the screen currently being displayed (i.e., the Counsel Notes button 3215b) is not displayed. Alternatively, the button may be displayed in a different color.

If in step 236 it is determined that the user has not clicked on the Counsel Notes button 3215b, execution proceeds to step 240, in which a determination is made whether the user has clicked on the Status button 3214a. If so, execution proceeds to step 242, in which the user is able to add, edit, and view status items as described below.

Figure 34:
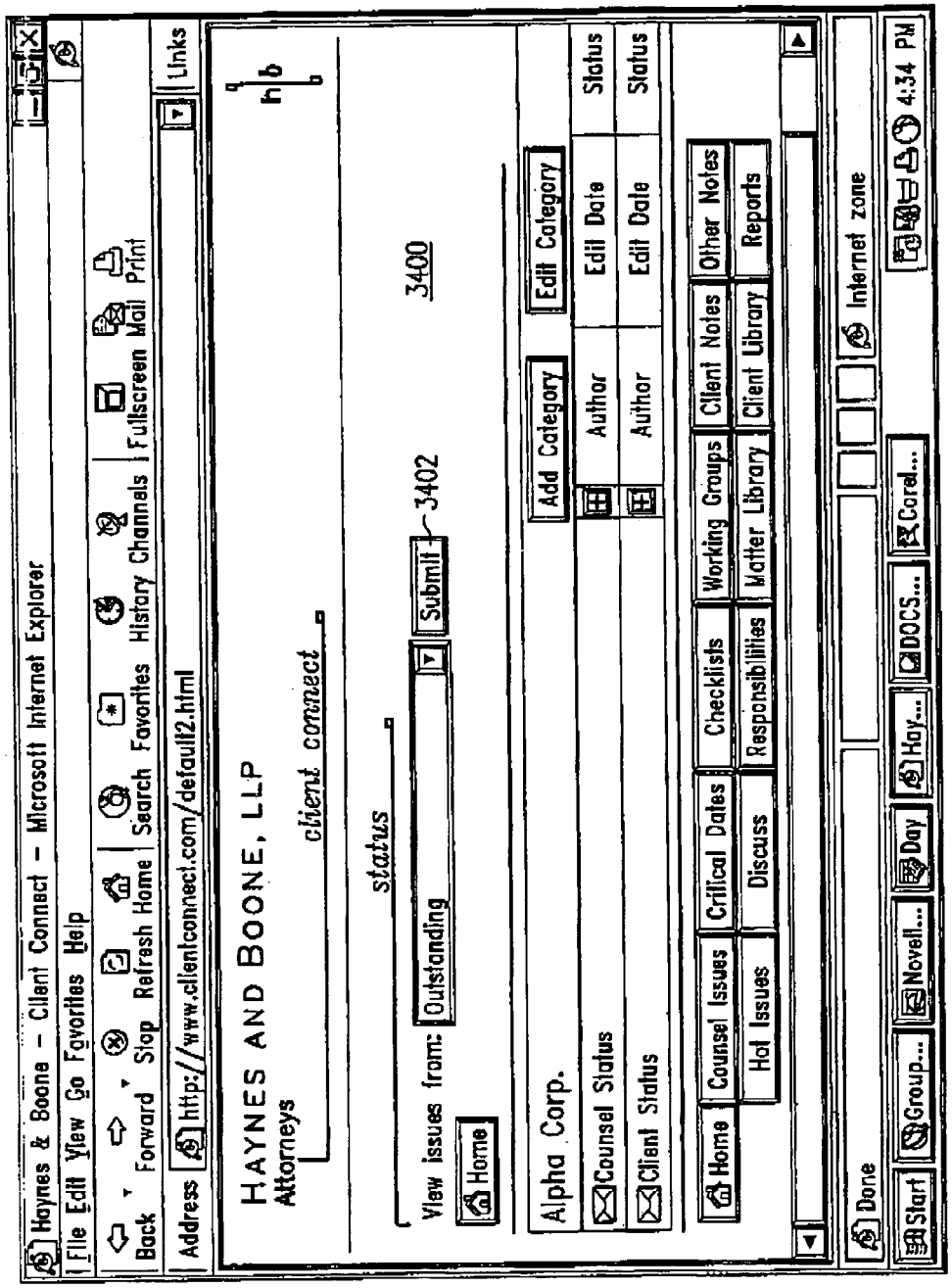
FIG. 34 illustrates a "Status" screen of the application of FIG. 1 or 2.

In particular, referring again to FIG. 32, the Status button 3214a provides access to current client status notes entered by client users and counsels status notes entered by counsel users, displaying the name of the user entering the note and that date of the note, sorted by project or matter. An exemplary "Status" screen 3400 is illustrated in FIG. 34.

Again, the user is able to filter the items for which status is requested according to when the item was last edited by selecting a filter from a drop-down menu 3402 and then clicking on a "Submit" button 3404. Once a selection is made, the appropriate items will be displayed on the screen 3400.

The Status screen 3400 displays the name(s) of the selected matter(s) with corresponding categories and items within those categories displayed thereunder. For example, the matter "Alpha Corp." includes two categories "Counsel Status" and "Client Status". Although no items are shown for either of the categories, it should be noted that, for each item, the author of the item, as well as the last edit date and status of the item, are indicated under the headings "Author," "Edit Date," and "Status," respectively, in connection with the item. Categories, items and subitems are added as described above with reference to FIGS. 33*a* and 33*b*. Similarly, e-mail messages may be sent from the Status screen 3400 as described above with reference to FIG. 33*d*.

If in step 240 it is determined that the user has not clicked on the Status button 3214*a*, execution proceeds to step 244, in which a determination is made whether the user has clicked on the Critical Dates button 3214*b*. If so, execution proceeds to step 246, in which the user is able to add, edit, and view critical dates items as described below.

Figure 35:
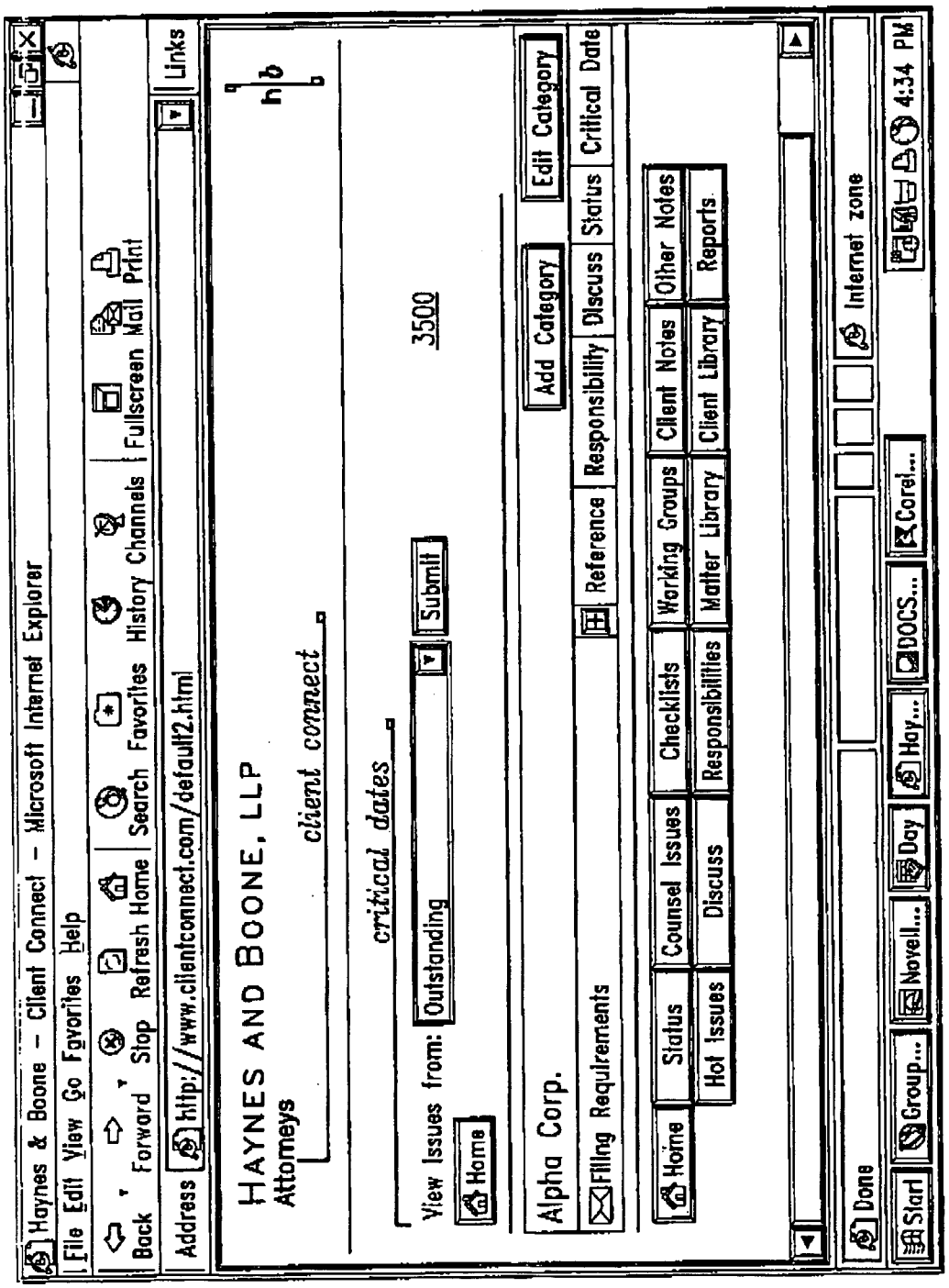
FIG. 35 illustrates a "Critical Dates" screen of the application of FIG. 1 or 2.

Referring again to FIG. 32, the Critical Dates button 3214*b* provides access to critical dates for projects or matters as identified by client users or counsel users. An exemplary "Critical Dates" screen 3500 is illustrated in FIG. 35. Again, the user is able to filter the items for which status is requested using a drop-down menu 3502 to select a filter and then clicking on a "Submit" button 3504. Once a selection is made, the appropriate items will be displayed on the screen 3500.

The Critical Dates screen 3500 displays the name(s) of the selected matter(s) with corresponding categories and items within those categories displayed thereunder. For example, the matter "Alpha Corp." includes one category "Filing Requirements". Although no items are shown for the category, it should be noted that, for each item, the reference, responsible party, discussion party, status, and critical date, if any, are indicated under the headings "Reference," "Responsibility," "Discuss," "Status," and "Critical Date," respectively, in connection with the item. Categories, items and subitems are added as described above with reference to FIGS. 33*a* and 33*b*. Similarly, e-mail messages may be sent from the Critical Dates screen 3500 as described above with reference to FIG. 33*d*; however, for any Critical Dates item added, an email is automatically generated to the users designated as responsible and discussion parties for the item notifying them of the critical date.

If in step 244 it is determined that the user has not clicked on the Critical Dates button 3214*b*, execution proceeds to step 248, in which a determination is made whether the user has clicked on the Checklists button 3214*c*. If so, execution proceeds to step 250, in which the user is able to add, edit, and view checklists as described below.

Referring again to FIG. 32, the Checklists button 3214*c* provides access to multiple interactive Checklists for each project or matter, customizable for each client's particular business. Examples include due diligence checklists, closing checklists, and leasing checklists. An exemplary "Checklists" screen 3600 is illustrated in FIG. 36. Again, the user is able to filter the items that are requested using a drop-down menu 3602 to select a filter and then clicking on a "Submit" button 3604. Once a selection is made, the appropriate items will be displayed on the screen 3600.

The Checklists screen 3600 displays the name(s) of the selected matter(s) with corresponding categories, or Checklists, and items within those Checklists displayed thereunder. For example, the matter "Alpha Corp." includes two Checklists "To Do" and "Preliminary". It should be noted that the names of the checklists displayed on the screen 3600 are designated using the Name Checklists screen 1100 as shown in and described above with reference to FIG. 11. Similarly, column headings displayed on the screen 3600 are designated using the Name Columns for Checklists screen 1000, as shown in and described above with reference to FIG. 10.

To display the items for a particular Checklist, the user clicks on a "List Items" button 3606 for that item. For example, clicking on the List Items button 3606 for the To Do Checklist results in the display of a "List Items" screen 3620, as shown in FIG. 36*a*.

Figure 36A:
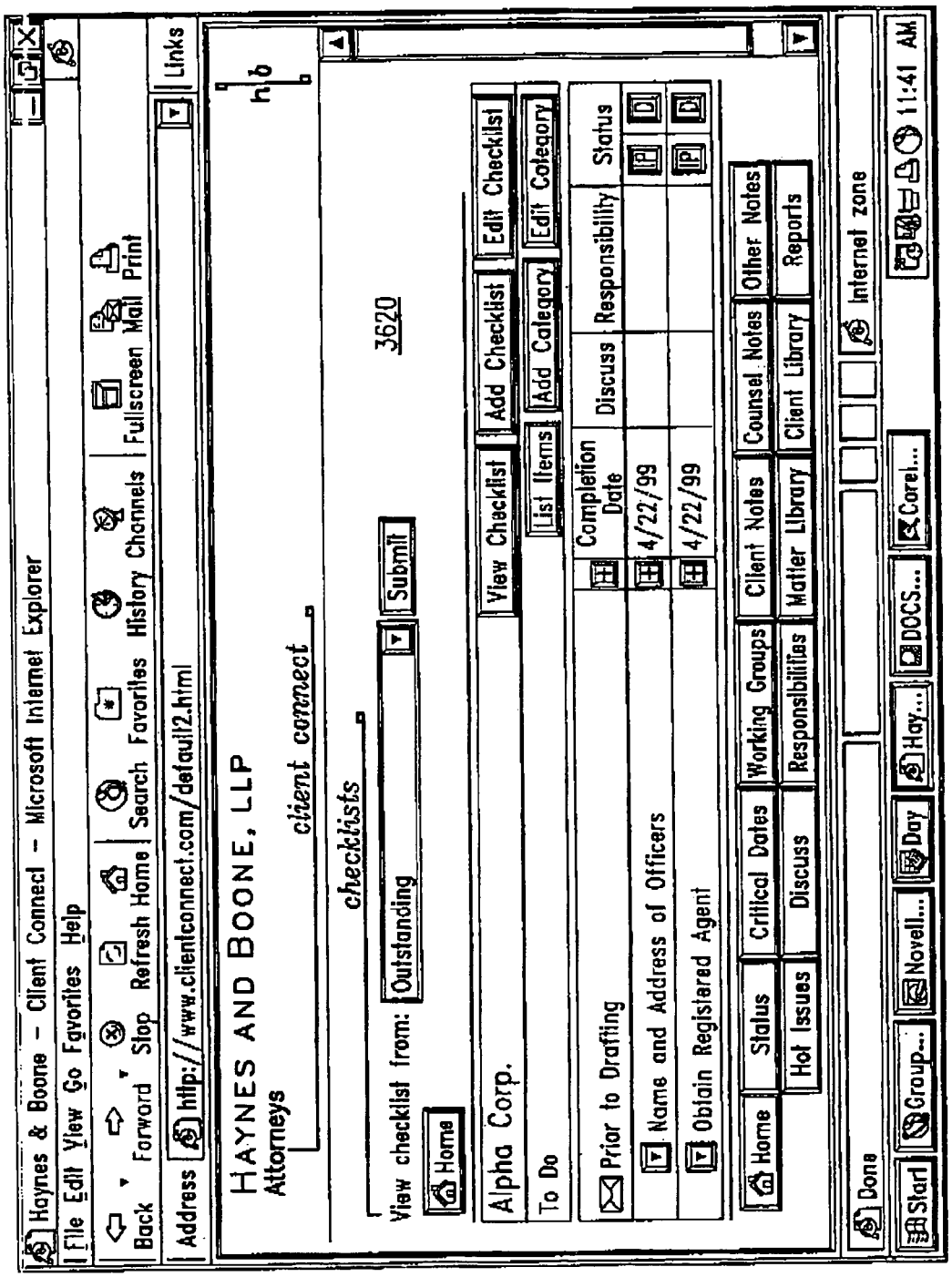
FIG. 36a illustrates a "Checklists-List Items" screen of the application of FIG. 1 or 2.

As shown in FIG. 36*a*, the To Do Checklist includes one category "Prior to Drafting" and two items "Name and Address of Officers" and "Obtain Registered Agent." For each item, the completion date, discussion party, responsible party, and status of the item, if any, are indicated under the headings "Completion Date," "Discuss," "Responsibility," and "Status," respectively, in connection with the item. Categories, items and subitems are added as described above with reference to FIGS. 33*a* and 33*b*. Similarly, e-mail messages may be sent from the screens 3600, 3620, as described above with reference to FIG. 33*d*.

If in step 248 it is determined that the user has not clicked on the Checklists button 3214*c*, execution proceeds to step 252, in which a determination is made whether the user has clicked on the Working Groups button 3214*d*. If so, execution proceeds to step 254, in which the user is able to add, edit, and view working groups as described below.

Figure 37:
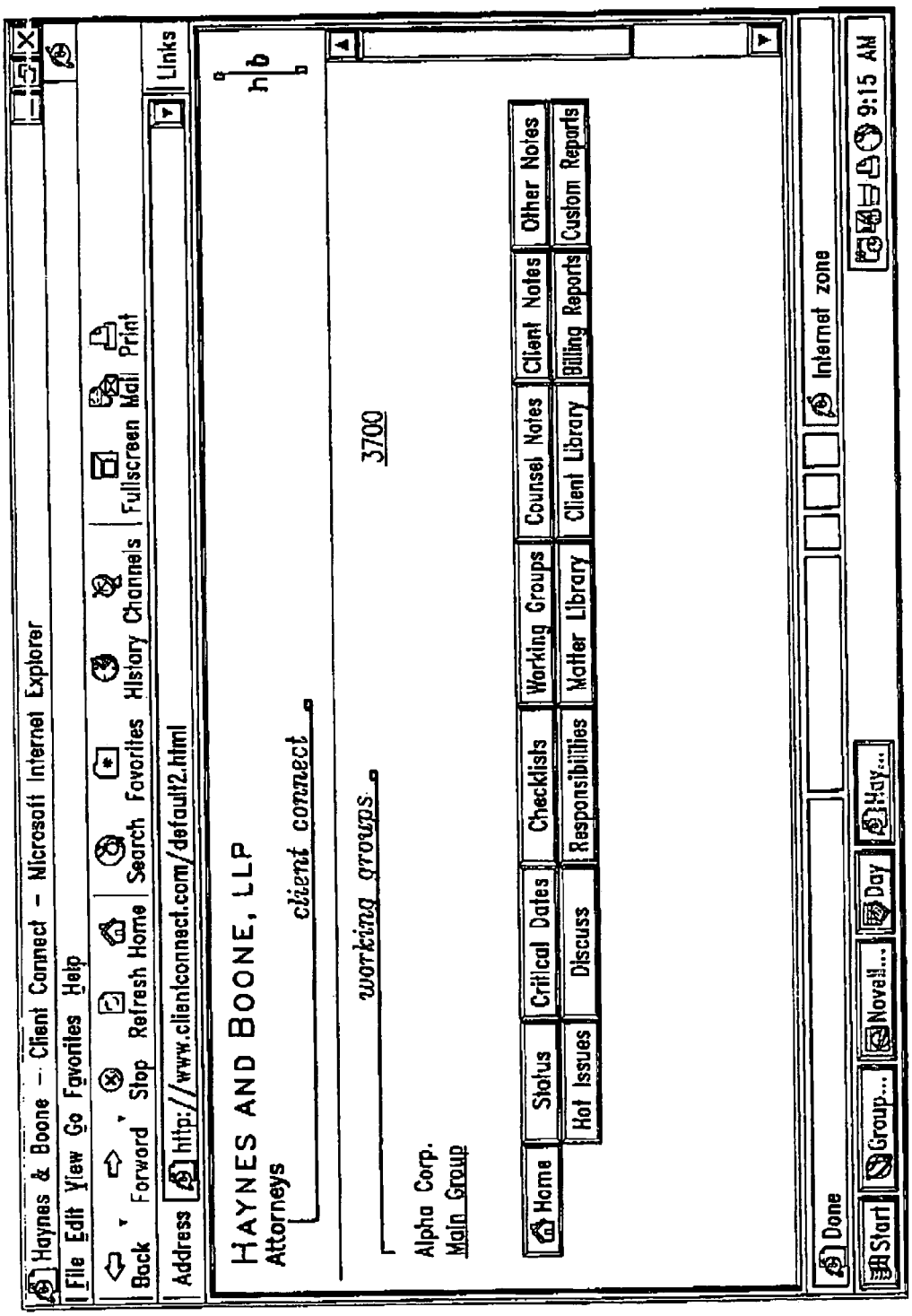
FIGS. 37 and 37a illustrate "Working Groups" screens of the application of FIG. 1 or 2.
Figure 37A:
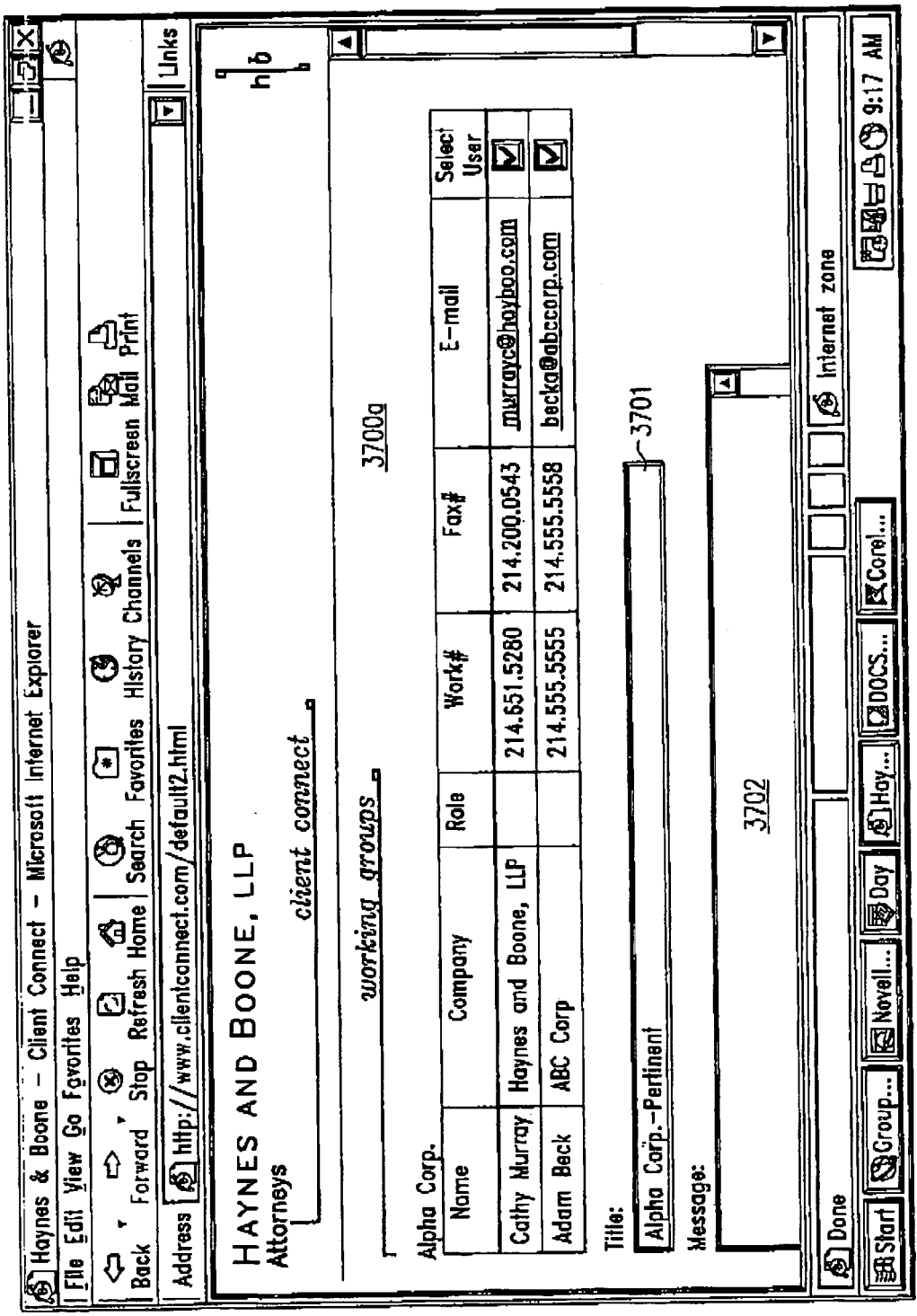

Referring again to FIG. 32, the Working Groups button 3214*d* results in the display of a Working Groups screen 3700 as shown in FIG. 37, comprising a list of working groups for the selected matter(s). As shown in FIG. 37, the selected matter is "Alpha Corp." and the only working group included under Alpha Corp. is "Main Group." Clicking "Main Group" will result in the display of a screen 3700*a* as shown in FIG. 37*a* comprising a list that includes each working group member's company affiliation, address, role, telephone number, fax number, and E-mail address. This is the same list that is displayed when the envelope icon 3328 for a particular matter is clicked on. The screen 3700 is used in a similar fashion as the screen 3330 (FIG. 33*d*), except that a title field 3701 is automatically filled in with only the name of the matter and the message typed in the message field 3702 will be sent to all users on the list for which a check box under a heading "Select User" has been checked.

It should be noted that the group of users displayed in the Work Group screen 3700 includes the users designated for the matter as described above with reference to FIGS. 12 and 13 and FIGS. 25 and 26.

If in step 252 it is determined that the user has not clicked on the Working Groups button 3214*d*, execution proceeds to step 256, in which a determination is made whether the user has clicked on the Client Notes button 3215*a*. If so, execution proceeds to step 258, in which the user is able to add, edit, and view client notes as described below.

Figure 38:
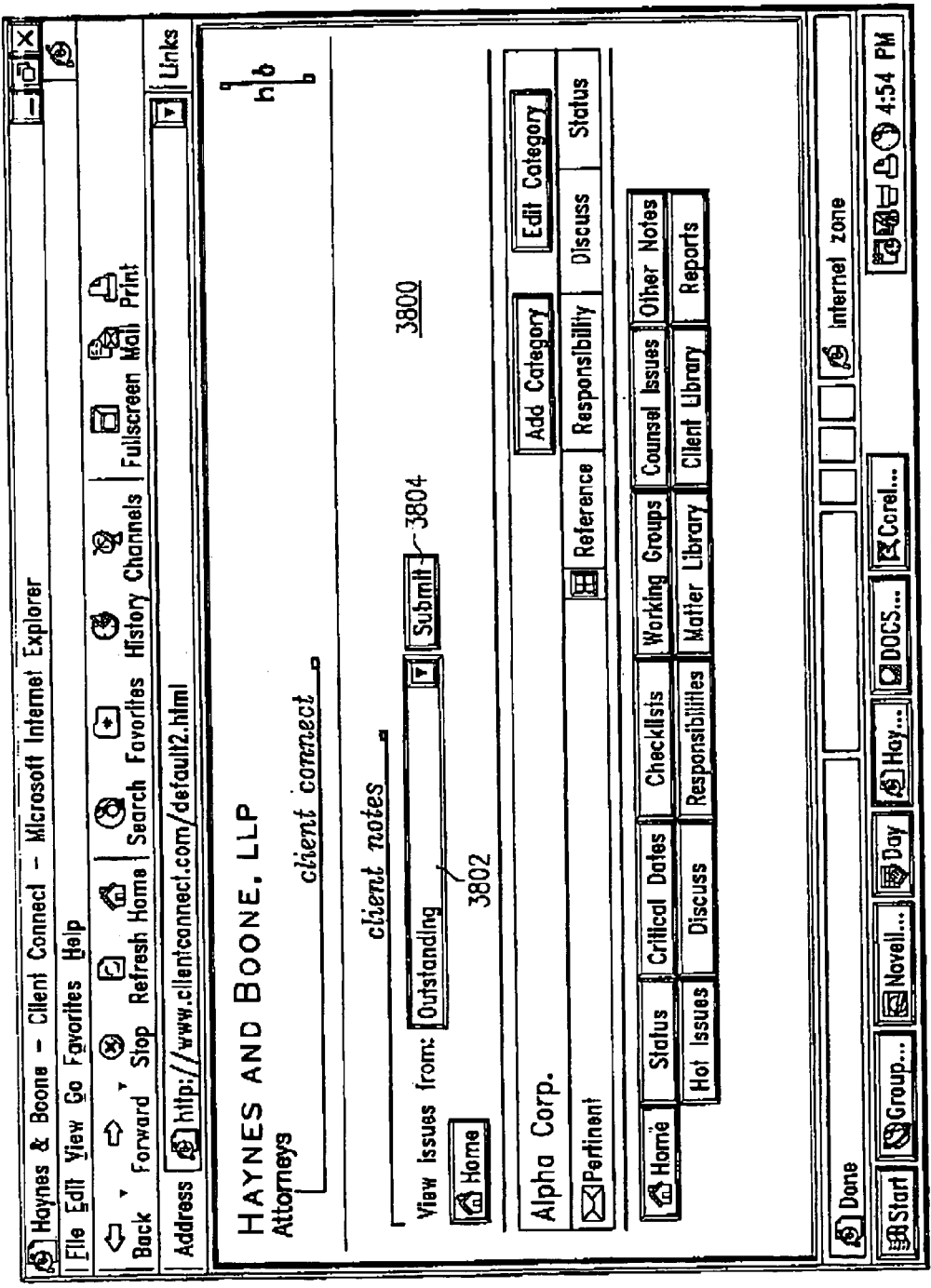
FIG. 38 illustrates a "Client Notes" screen of the application of FIG. 1 or 2.

Referring again to FIG. 32, the Client Notes button 3215*a* provides access to client notes entered by any authorized client user identifying important business points, reminders, or action items, sorted by project or matter. It should be noted that only users identified as "clients" are able to modify (i.e., add or edit) client notes. As with Counsel Notes, each note can be tagged "Hot Issue" or "Discuss With" a specific client user or counsel user. An exemplary "Client Notes" screen 3800 is illustrated in FIG. 38. Again, the user is able to filter the items for which status is requested using a drop-down menu 3802 to select a filter and then clicking on a "Submit" button 3804. Once a selection is made, the appropriate items will be displayed on the screen 3800.

The Client Notes screen 3800 displays the name(s) of the selected matter(s) with corresponding categories and items within those categories displayed thereunder. For example, the matter "Alpha Corp." includes one category "Pertinent". Although no items are shown for the category, it should be noted that, for each item, the reference, responsible party, discussion party, and status, if any, for the item are indicated under the headings "Reference," "Responsibility," "Discuss," and "Status," respectively, in connection with the item. Categories, items and subitems are added as described above with reference to FIGS. 33a and 33b. Similarly, e-mail messages may be sent from the Critical Dates screen 3500 as described above with reference to FIG. 33d.

It should be noted that the categories displayed on the components screens 3300 (FIG. 33a), 3400 (FIG. 34), 3500 (FIG. 35), and 3800 (FIG. 38) are specified using the Name Categories for Components Screen 900 as shown in and described above with reference to FIG. 9.

If in step 256 it is determined that the user has not clicked on the Client Notes button 3215b, execution proceeds to step 260, in which a determination is made whether the user has clicked on the Hot Issues button 3216a. If so, execution proceeds to step 262, in which the user is able to view items tagged as hot issues as described below.

Figure 39:
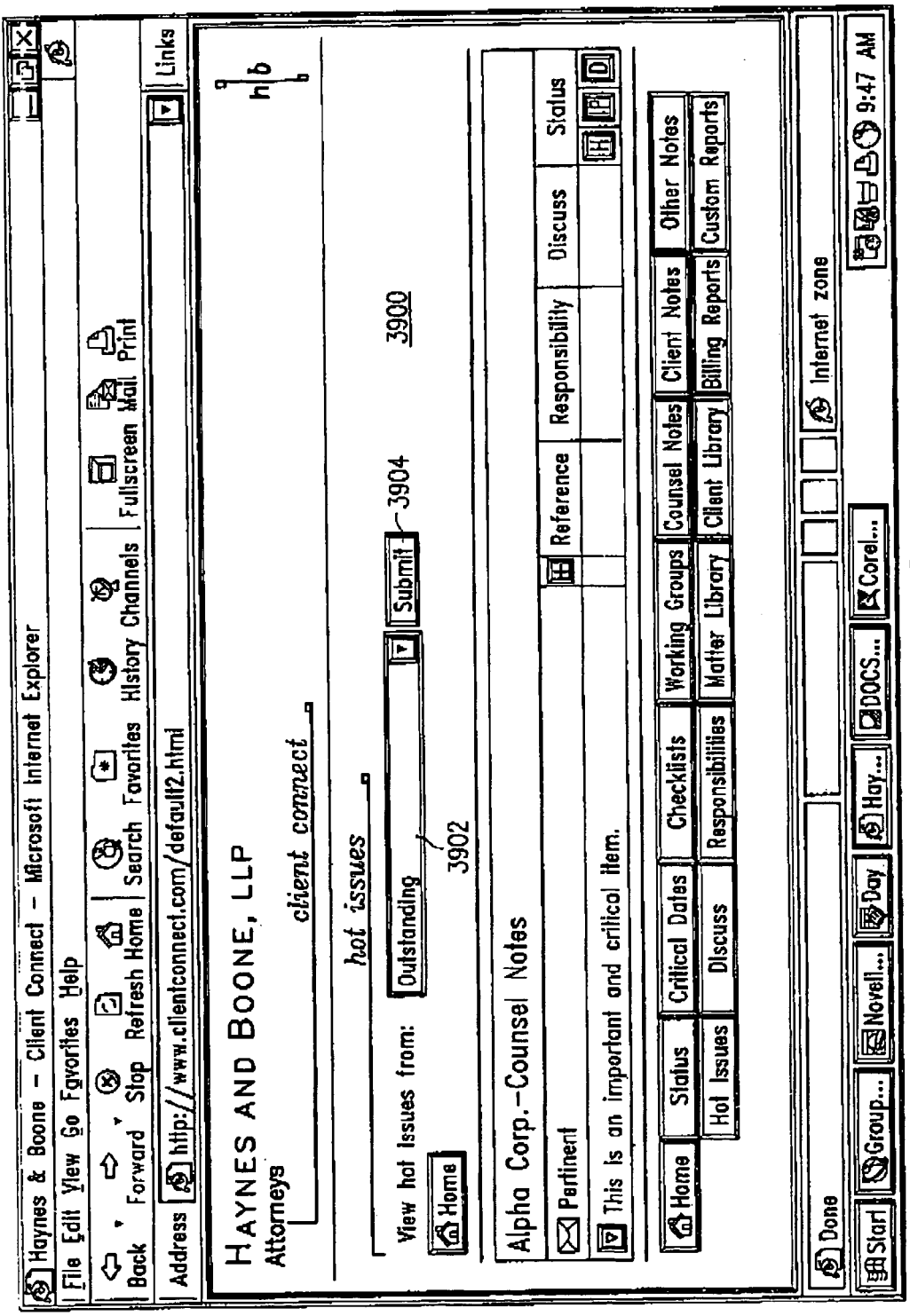
FIG. 39 illustrates a "Hot Issues" screen of the application of FIG. 1 or 2.

In particular, referring again to FIG. 32, clicking on the Hot Issues button 3216a results in the display of a quick view of all currently outstanding items or issues that have been tagged Hot Issues, as described above, by any client user or counsel user, sorted by project or matter. This feature is primarily designed for use by CEOs and other senior managers, business people, and general counsel to quickly view highly significant issues without suffering information overload. An exemplary "Hot Issues" screen 3900 is illustrated in FIG. 39. Again, the user is able to filter the items to be displayed using a drop-down menu 3902 and then clicking on a "Submit" button 3904.

If in step 260 it is determined that the user has not clicked on the Hot Issues button 3216a, execution proceeds to step 264, in which a determination is made whether the user has clicked on the Discuss button 3216b. If so, execution proceeds to step 266, in which the user is able to view items tagged to be discussed with a selected party as described below.

Figure 40:
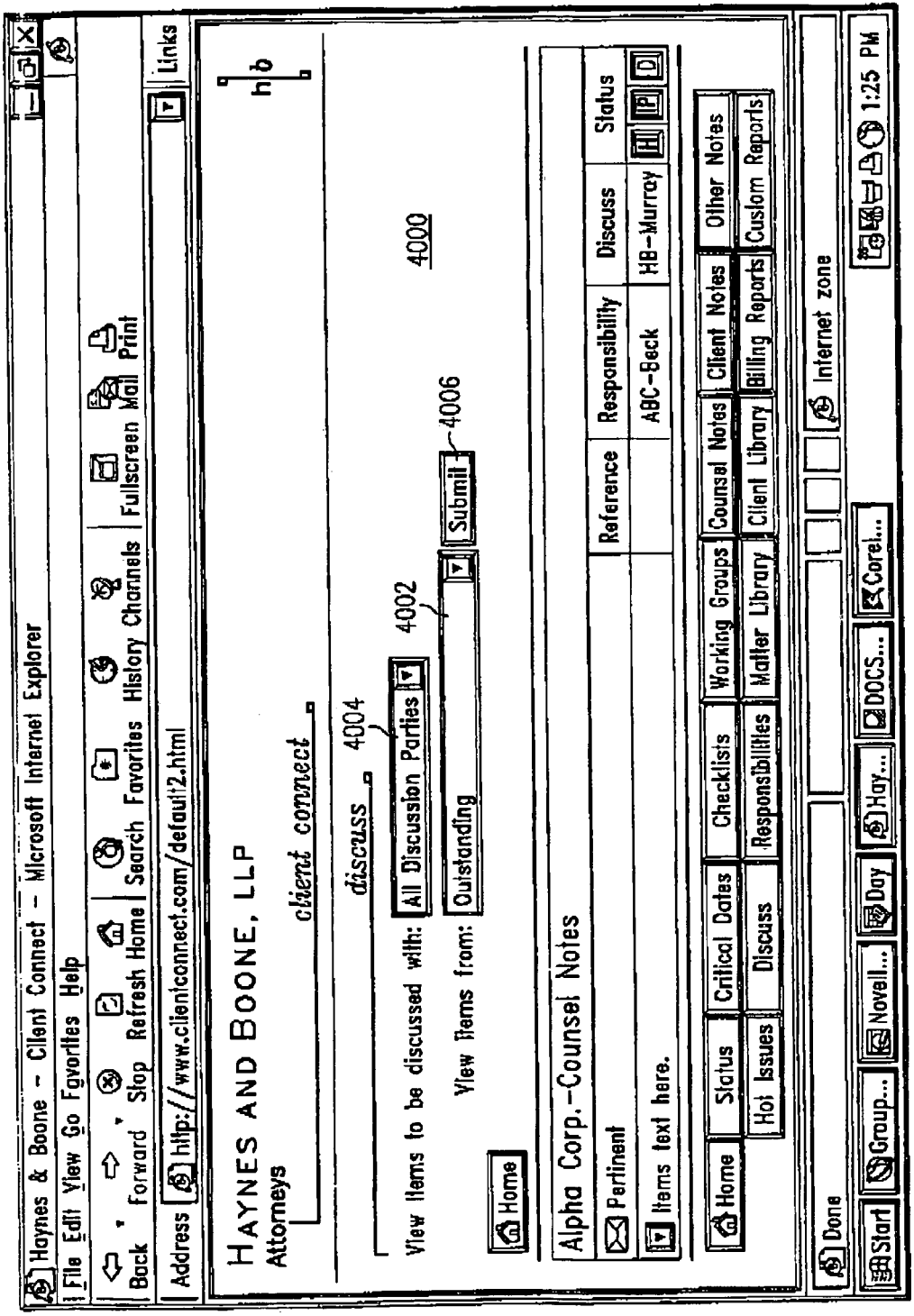
FIG. 40 illustrates a "Dicuss" screen of the application of FIG. 1 or 2.

In particular, referring again to FIG. 32, clicking on the Discuss button 3216b results in the display of a quick view of all currently outstanding items or issues that have been tagged Discuss With a selected user, as described above, by any client user or counsel user, sorted by project or matter. This feature is primarily designed for use by CEOs and other senior managers, business people, and general counsel to quickly view and respond to specific issues tagged for their immediate attention. An exemplary "Discuss" screen 4000 is illustrated in FIG. 40. Again, the user is able to filter the items to be displayed using a drop-down menu 4002. Additionally, the user is able to filter the items to be displayed using a drop-down menu 4002 to select a discussion party for whom items and issues are to be displayed. Once the filters have been selected from the menus 4002 and 4004, a "Submit" button 4006 is clicked to activate the filters. The Discuss screen 4000 is designed to allow the user to view issues and items that have been tagged for discussion with him or her by selecting another user's name from the drop-down menu 4004.

If in step 264 it is determined that the user has not clicked on the Discuss button 3216b, execution proceeds to step 268, in which a determination is made whether the user has clicked on the Responsibilities button 3216c. If so, execution proceeds to step 270, in which the user is able to view items for which a selected party has responsibility as described below.

Figure 41:
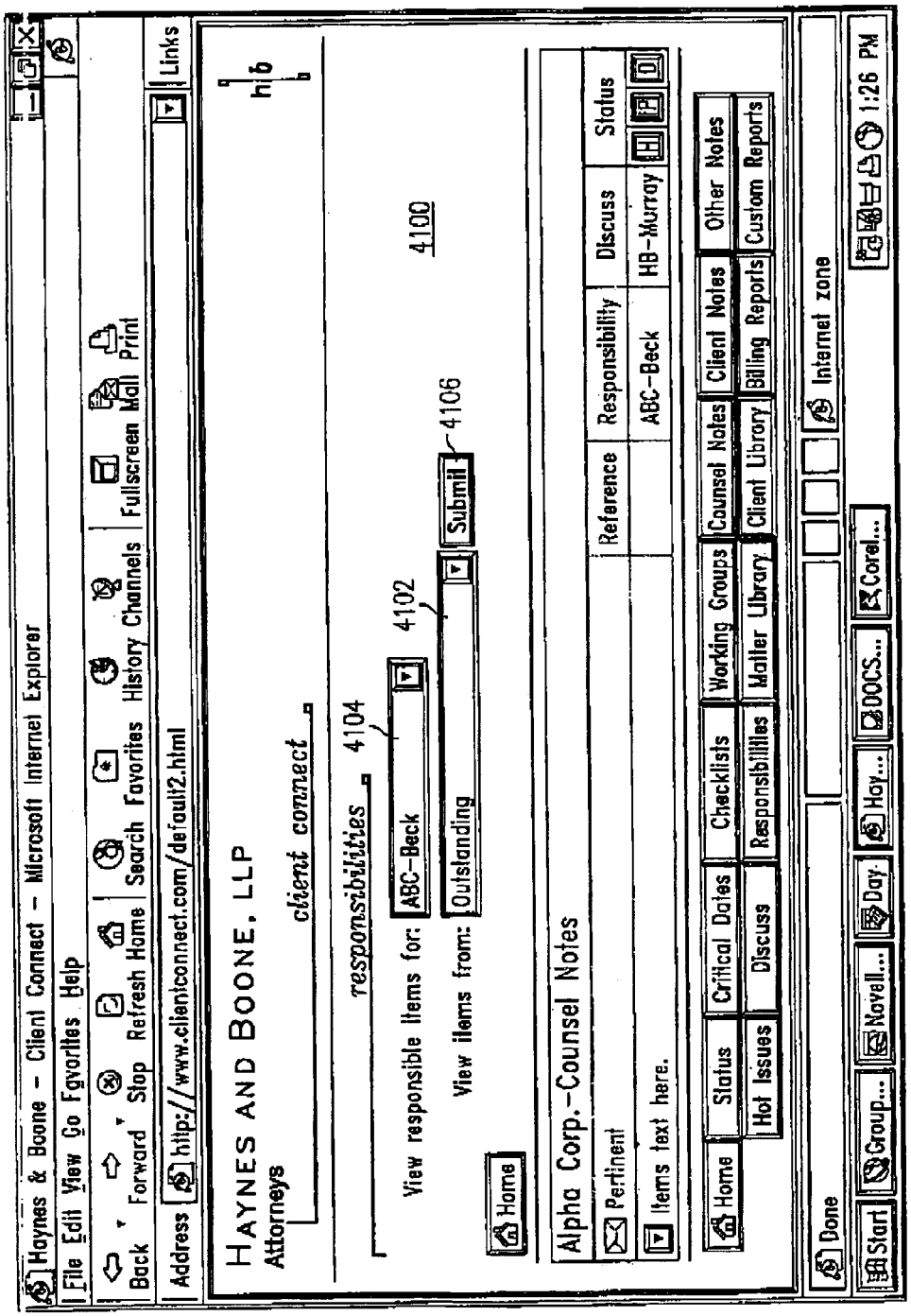
FIG. 41 illustrates a "Responsibilities" screen of the application of FIG. 1 or 2.

In particular, referring again to FIG. 32, clicking on the Responsibilities button 3216c results in the display of a quick view of all currently outstanding items or issues for which a selected user has responsibility. An exemplary "Responsibilities" screen 4100 is illustrated in FIG. 41. Again, the user is able to filter the items to be displayed using a drop-down menu 4102. Additionally, the user is able to filter the items/issues to be displayed using a drop-down menu 4104 to select a responsible party for whom items/issues are to be displayed. Once the filters are selected from the menus 4102, 4104, a "Submit" button 4106 is clicked on to activate the filters. In particular, the Responsibilities screen 4100 is designed to allow the user to view the items/issues that have been tagged as being his or her responsibility by default or by selecting another user's name from the drop-down menu 4104.

Clicking on one of the Reports buttons 3219a (FIG. 32), 3219b (FIG. 32), or 3340 (FIG. 33) results in the display of various reports, including billing reports, matter reports, and other user-definable reports.

If in step 268 it is determined that the user has not clicked on the Responsibilities button 3216c, execution proceeds to step 272, in which a determination is made whether the user has clicked on the Matter Library button 3218a. If so, execution proceeds to step 274, in which the user is able to view, add, and/or edit documents and document profiles, as described below.

Figure 42:
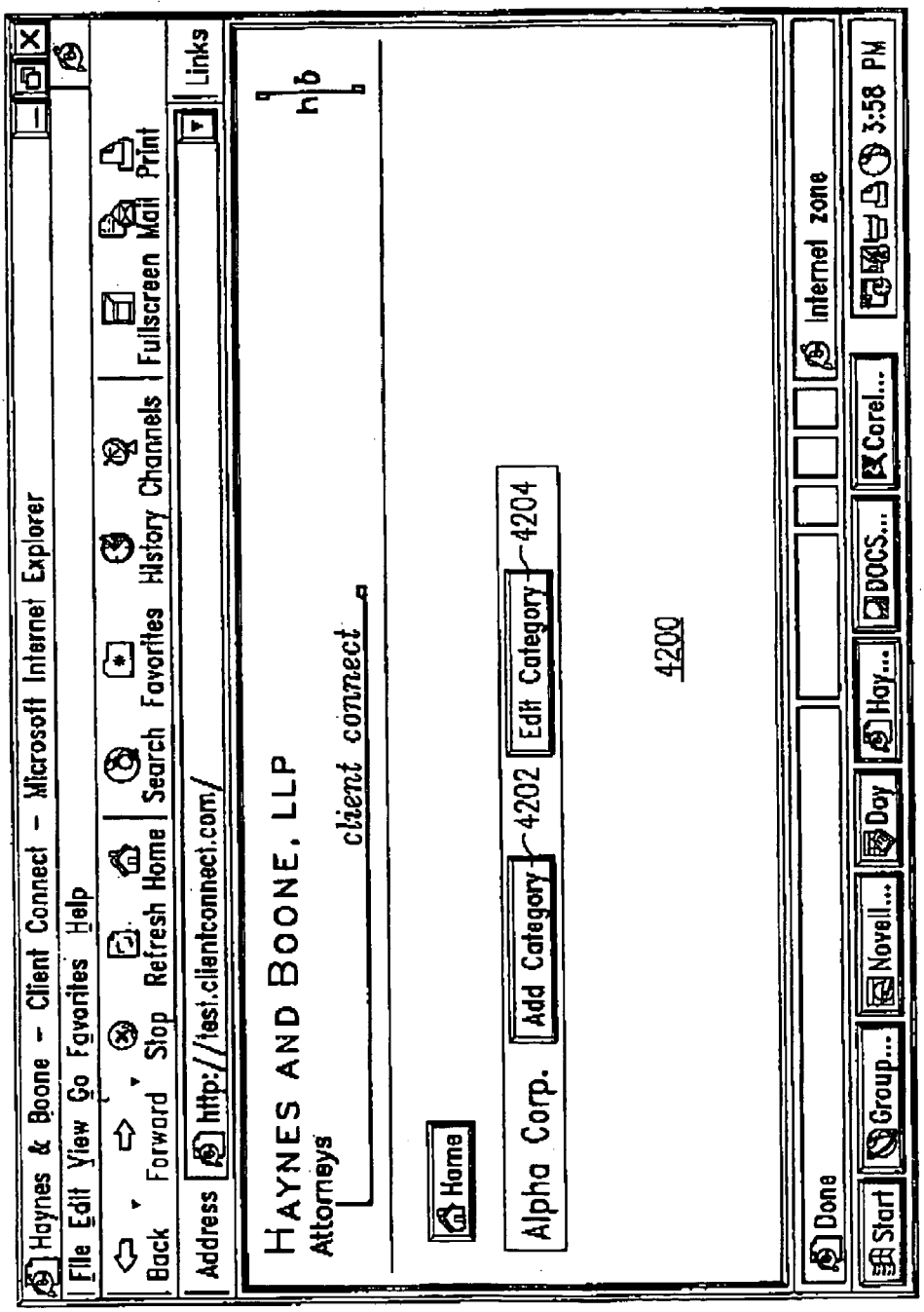
FIG. 42 illustrates a "Matter Library" screen of the application of FIG. 1 or 2.
Figure 42A:
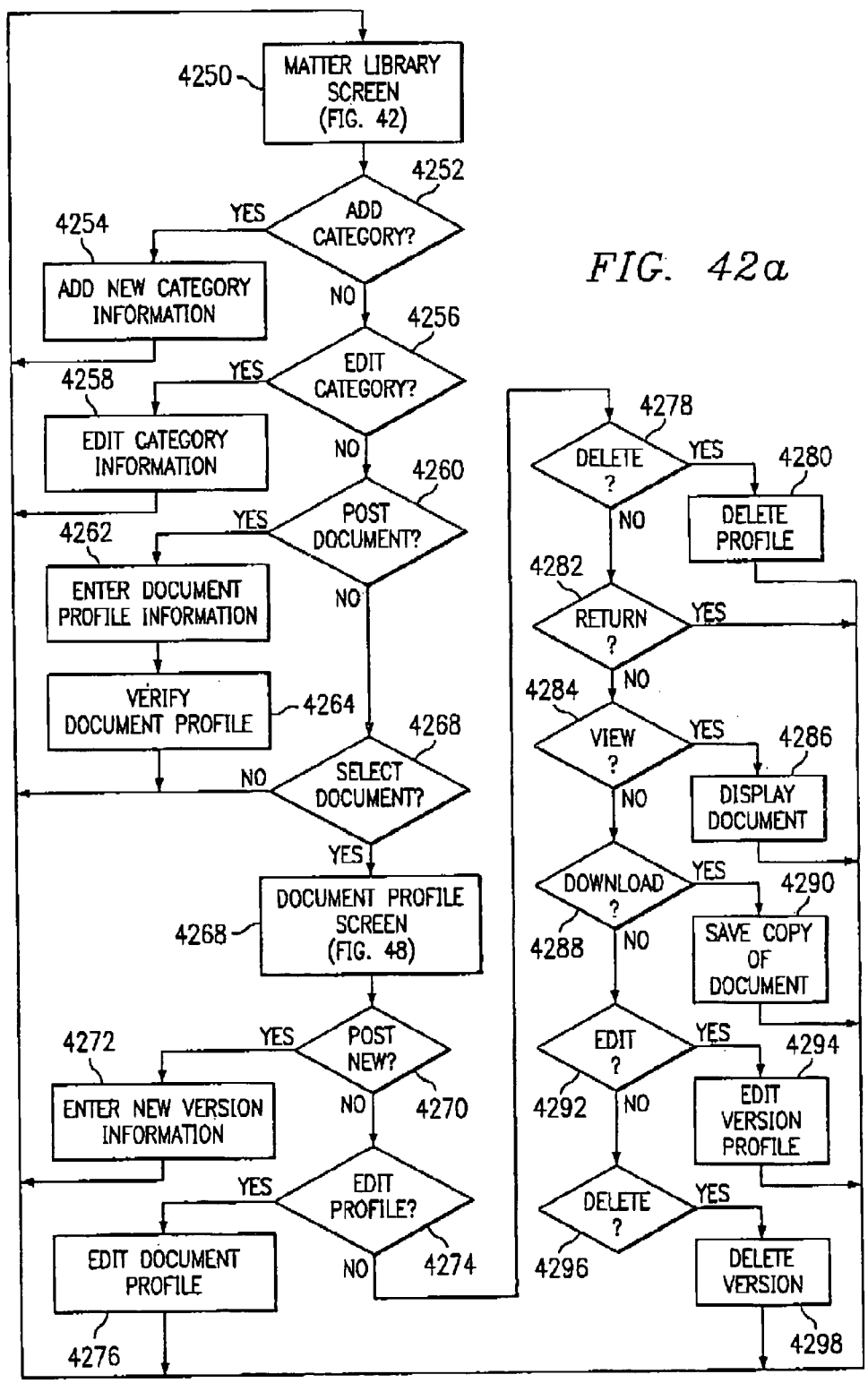

In particular, referring again to FIG. 32, clicking on the Matter Library button 3218a results in the display of a "Matter Library" screen 4200, as illustrated in FIG. 42. The Matter Library function is designed to deal with documents pertaining to a specific matter. FIG. 42a illustrates a flowchart of the operation of the Matter Library function. In step 4250, the Matter Library screen 4200 is displayed, as previously indicated. As shown in FIG. 42, the Matter Library screen 4200 indicates the matter, in this case "Alpha Corp." and enables a user to add or edit categories to the matter by clicking on an "Add Category" and "Edit Category" buttons 4202, 4204, respectively. Categories are added in the same manner as described above with reference to FIGS. 33–35 and 38. Categories enable a user to group and organize different types of documents together; exemplary categories include "Documents," "Drafts," "Correspondence," etc.

Figure 43:
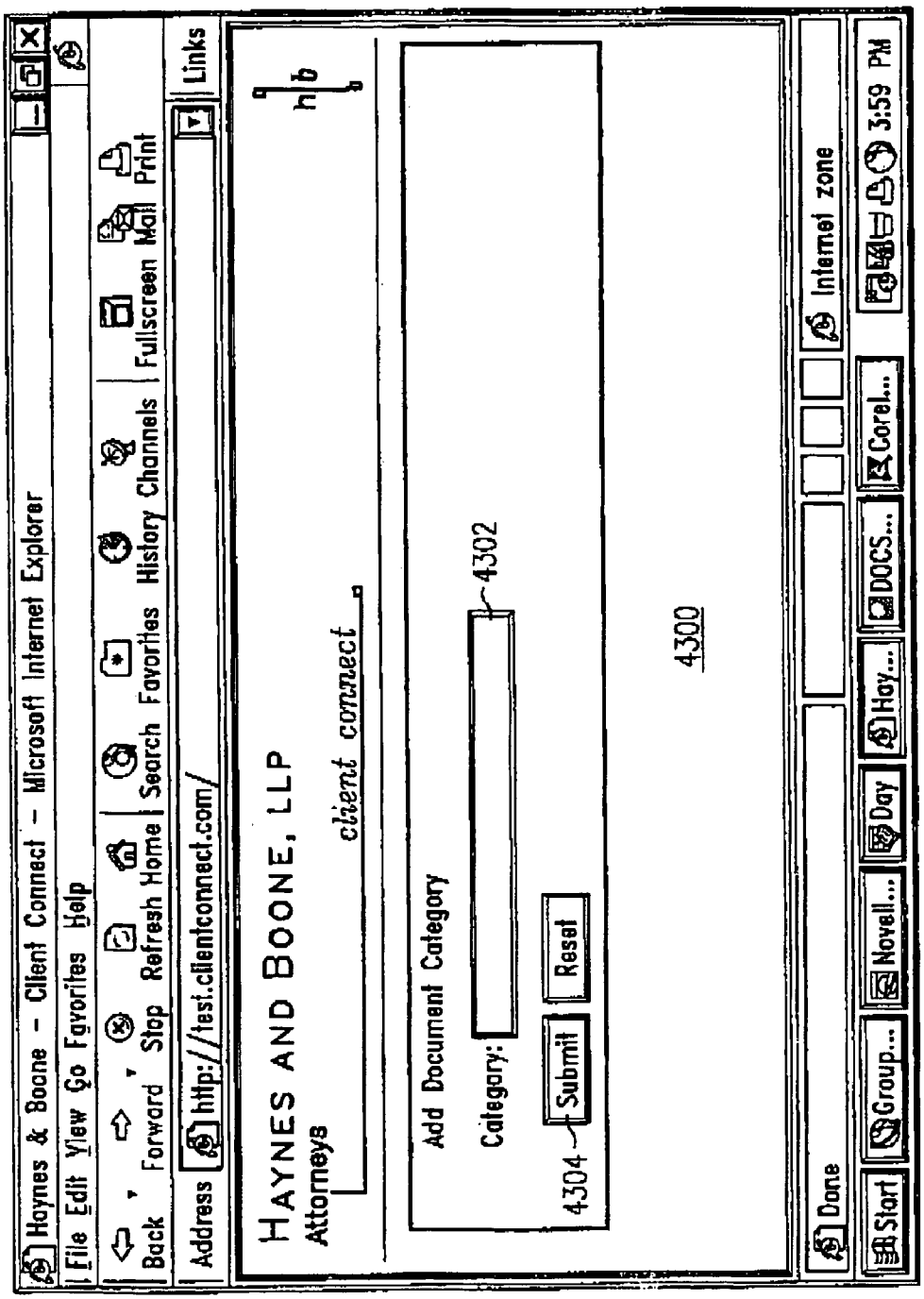
FIG. 43 illustrates a "Add Category" screen of the application of FIG. 1 or 2.

In step 4252, a determination is made whether the user has clicked on the Add Category button 4202. If so, execution proceeds to step 4254, in which an "Add Category" screen 4300, as illustrated in FIG. 43, is displayed. Categories can be named anything that is logical to the user for the specific matter. Categories are added by entering the category name in a "Category" field 4302 and then clicking on or otherwise selecting a "Submit" button 4304.

Figure 44:
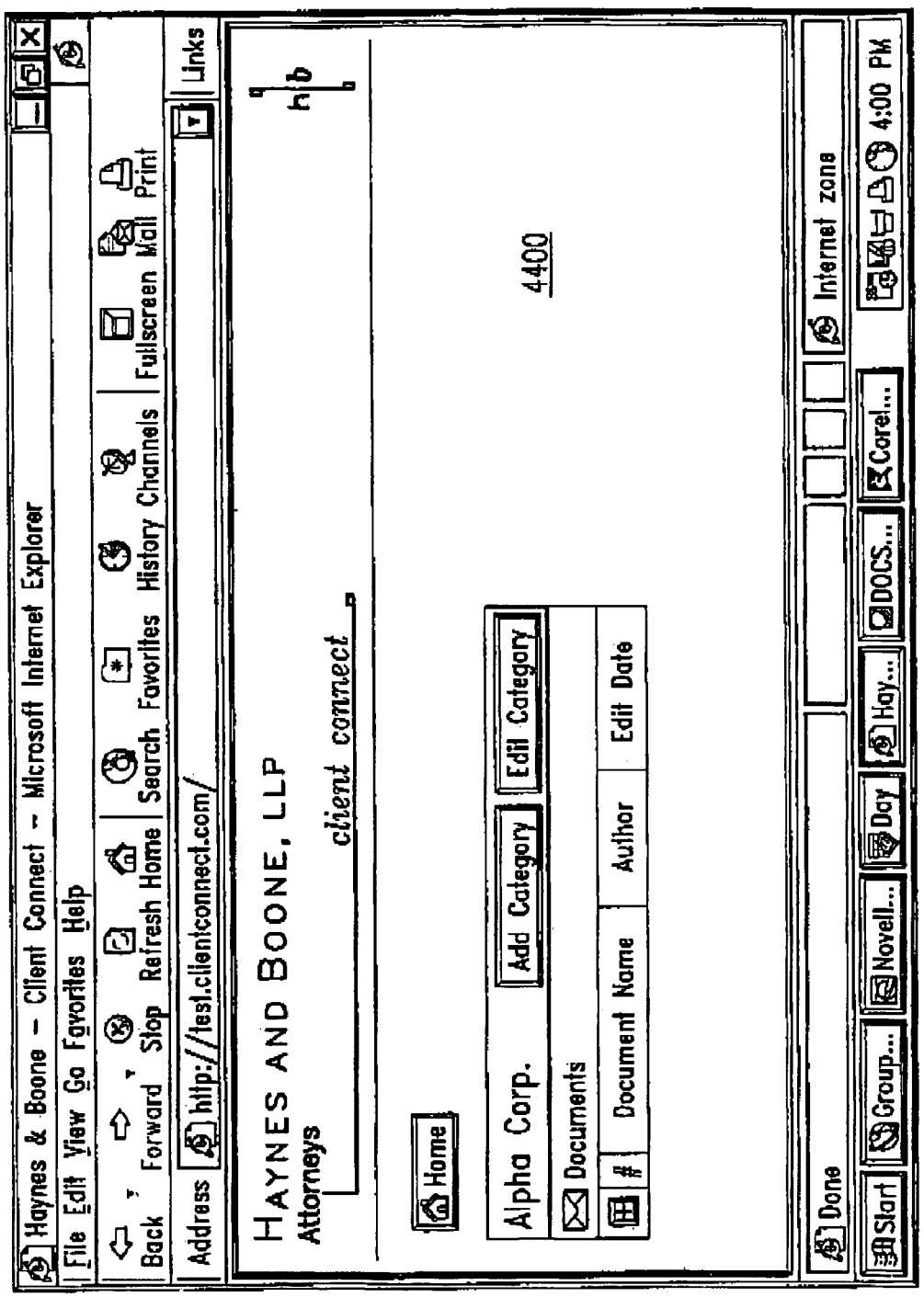
FIG. 44 illustrates the Matter Library screen of FIG. 42 after a category has been added.

FIG. 44 illustrates the Matter Library screen 4200 after a category "Documents" has been added. If in step 4252 it is determined that the user has not clicked on the Add Category button, execution proceeds to step 4256, in which a determination is made whether the user has clicked on the Edit Category button 4204 (FIG. 42). If so, execution proceeds to step 4258, in which a screen similar to the Add Category screen 4300 is displayed and the user is promoted to edit the information for the category.

Figure 45:
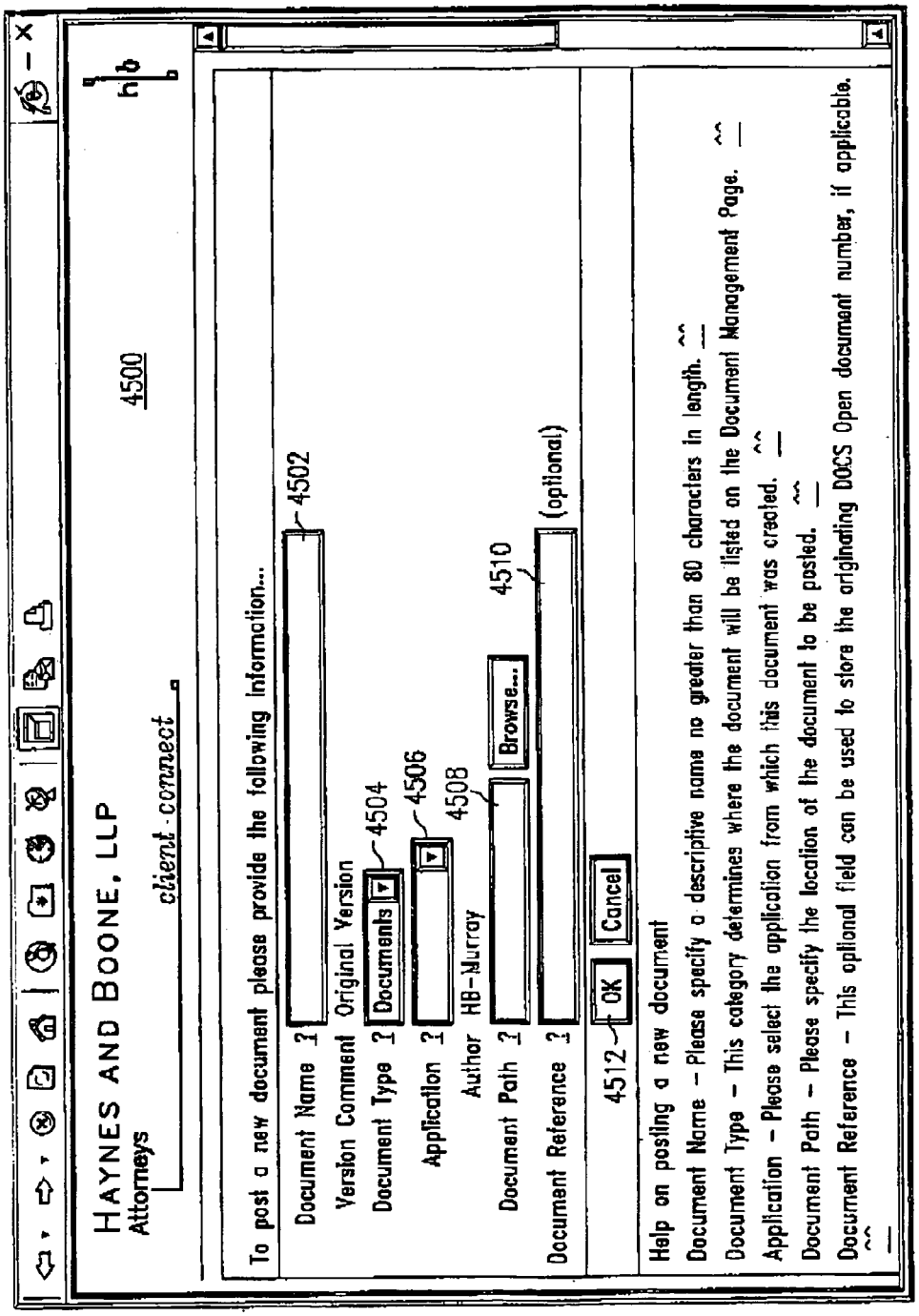
FIG. 45 illustrates a "Document Profile" screen of the application of FIG. 1 or 2.
Figure 45A:
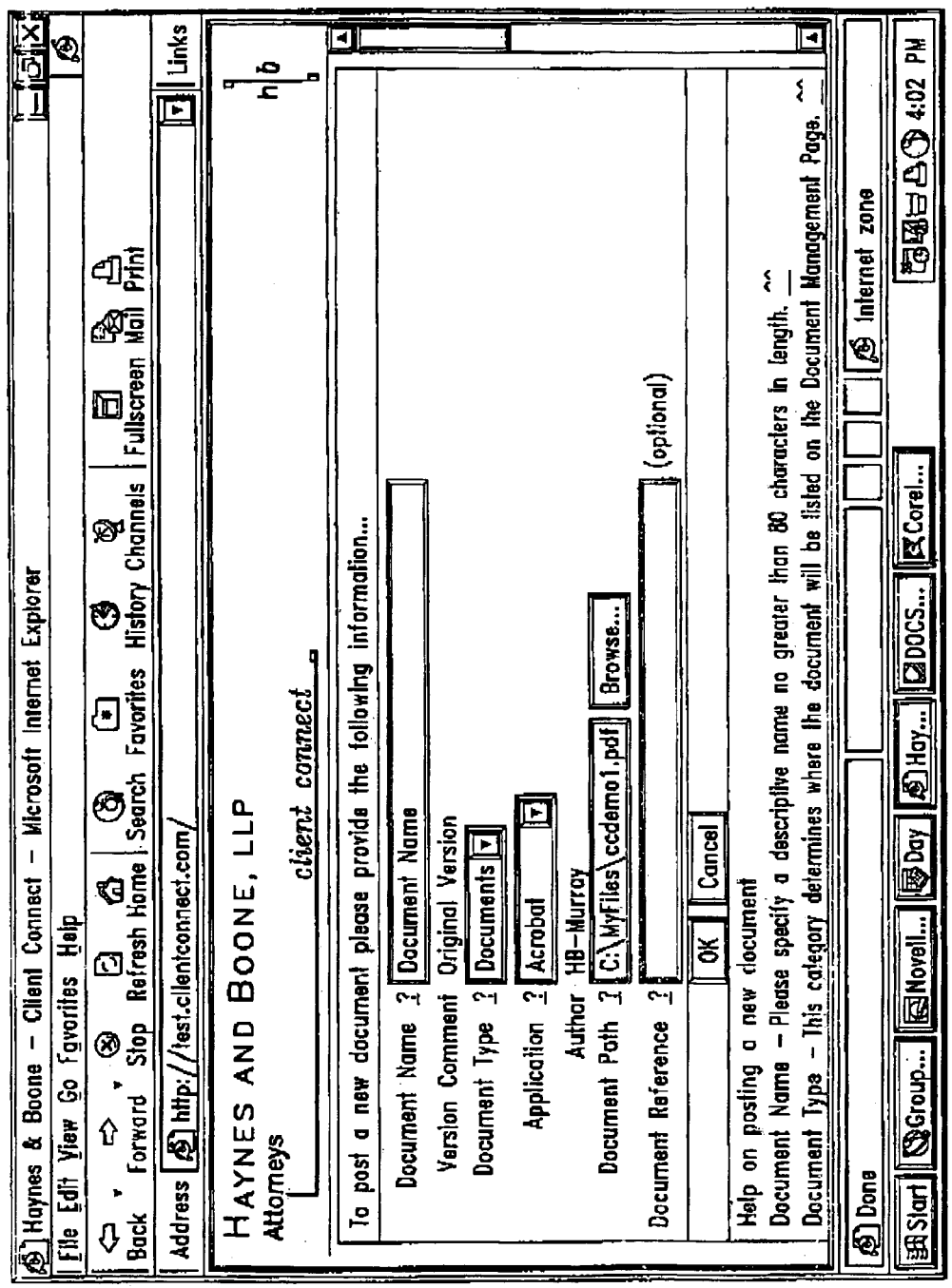
FIG. 45a illustrates the Document Profile screen of FIG. 45 after it has been completed.

If in step 4256 it is determined that the user has not clicked on the Edit Category button, execution proceeds to step 4260, in which a determination is made whether the user has clicked on a "+" icon 4400 to post a document to the associated category. If so, a "Document Profile" screen 4500, as illustrated in FIG. 45, is displayed in step 4262. Using the Document Profile screen 4500, the user specifies the name of the document in a "Document Name" field 4502, selects a document type (i.e., category) using a drop-down menu 4504, selects the application in which the document is being posted (e.g., Acrobat, Excel, PowerPoint, etc.) using a drop-down menu 4506, specifies a document path in a "Document Path" field 4508, and enters an optional document reference in a "Document Reference" field 4510. If no information is entered in the Document Reference field 4510, the information from the Document Path field 4508 will be entered in the Document Reference field 4510. Once all of the document profile information has been provided, clicking on an "OK" button 4512 submits the information. FIG. 45a illustrates a completed profile.

Figure 46:
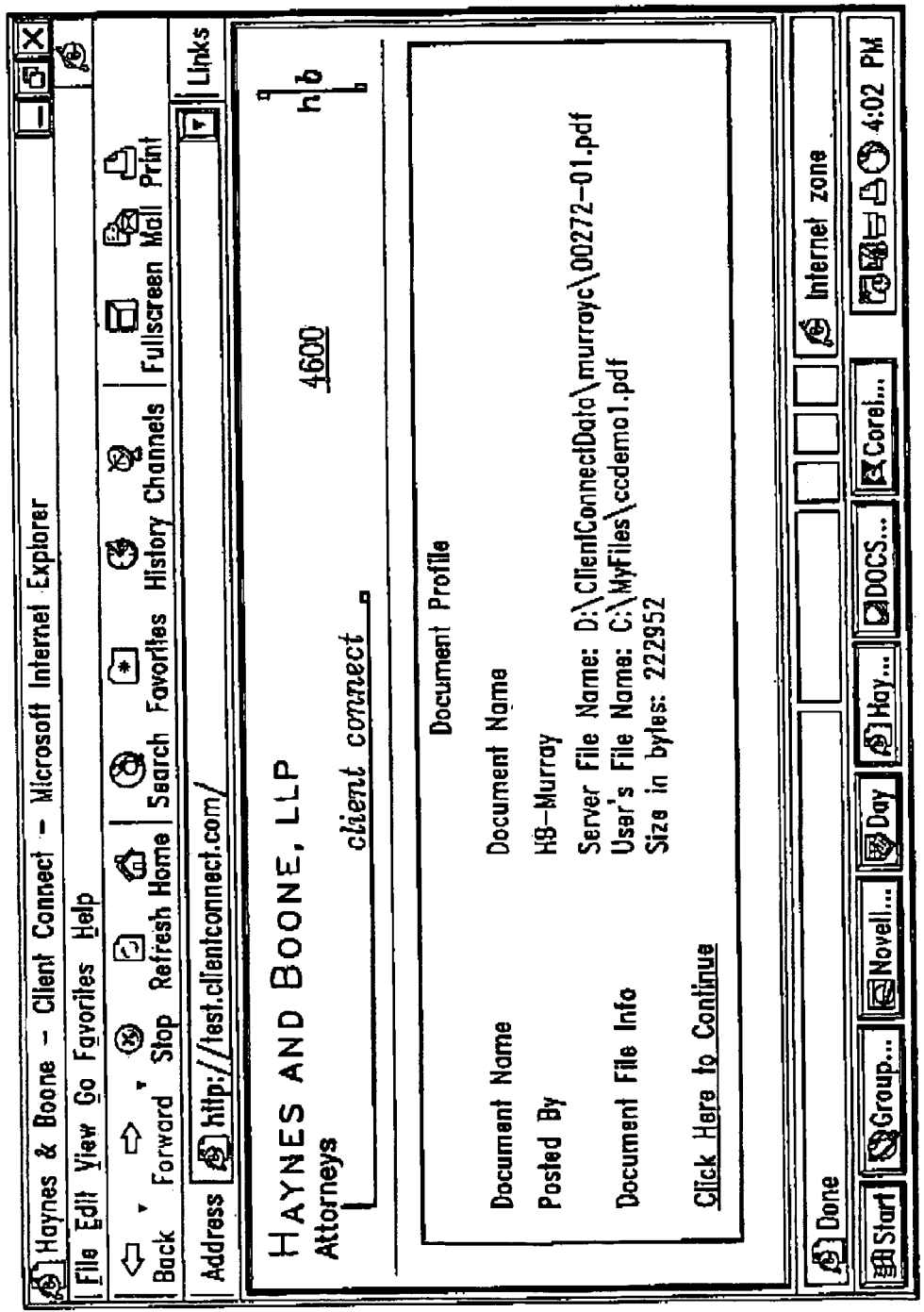
FIG. 46 illustrates a "Document Profile Verification" screen of the application of FIG. 1 or 2.
Figure 47:
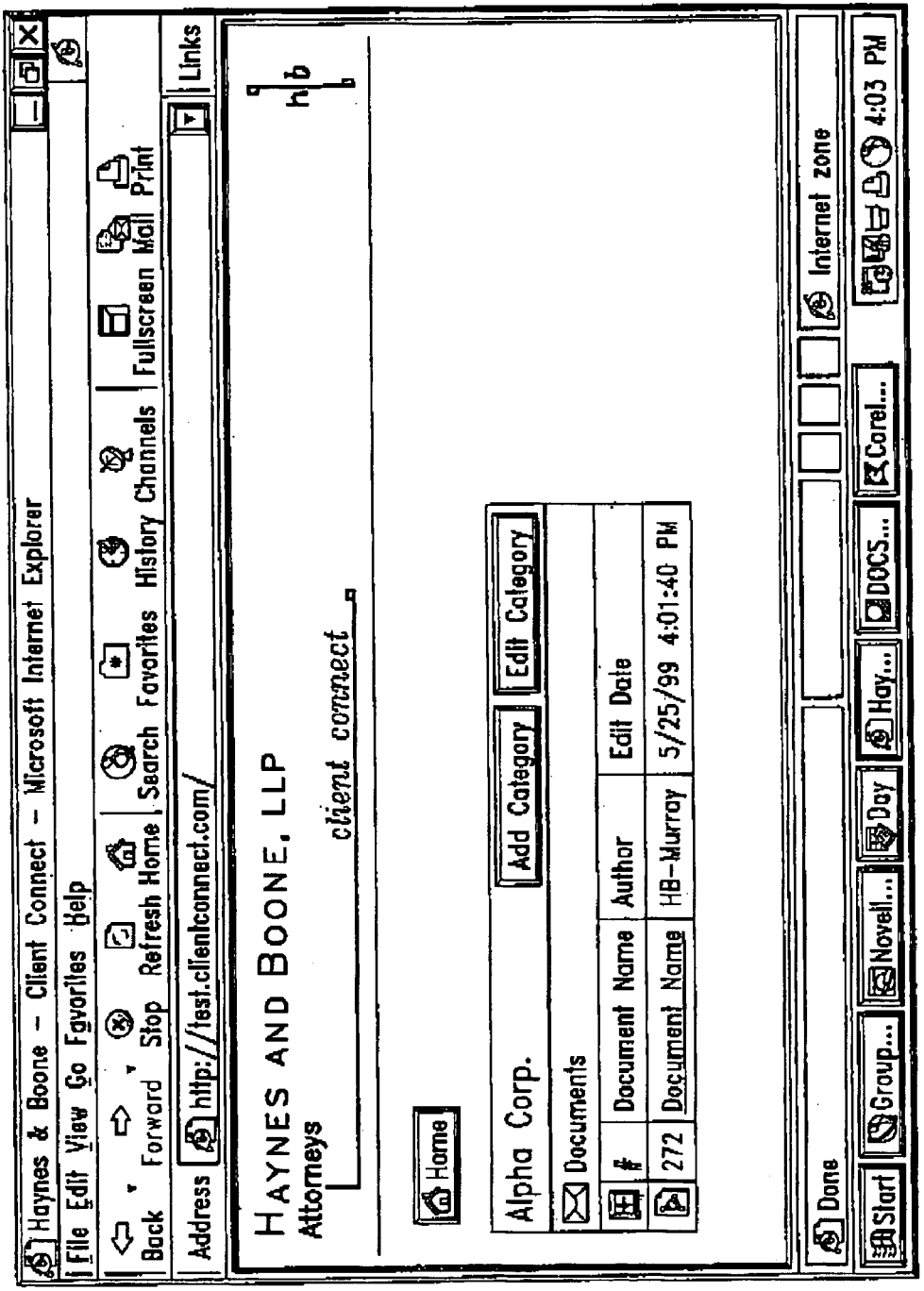
FIG. 47 illustrates the Matter Library screen after a document has been posted to a category thereof.
Figure 49:
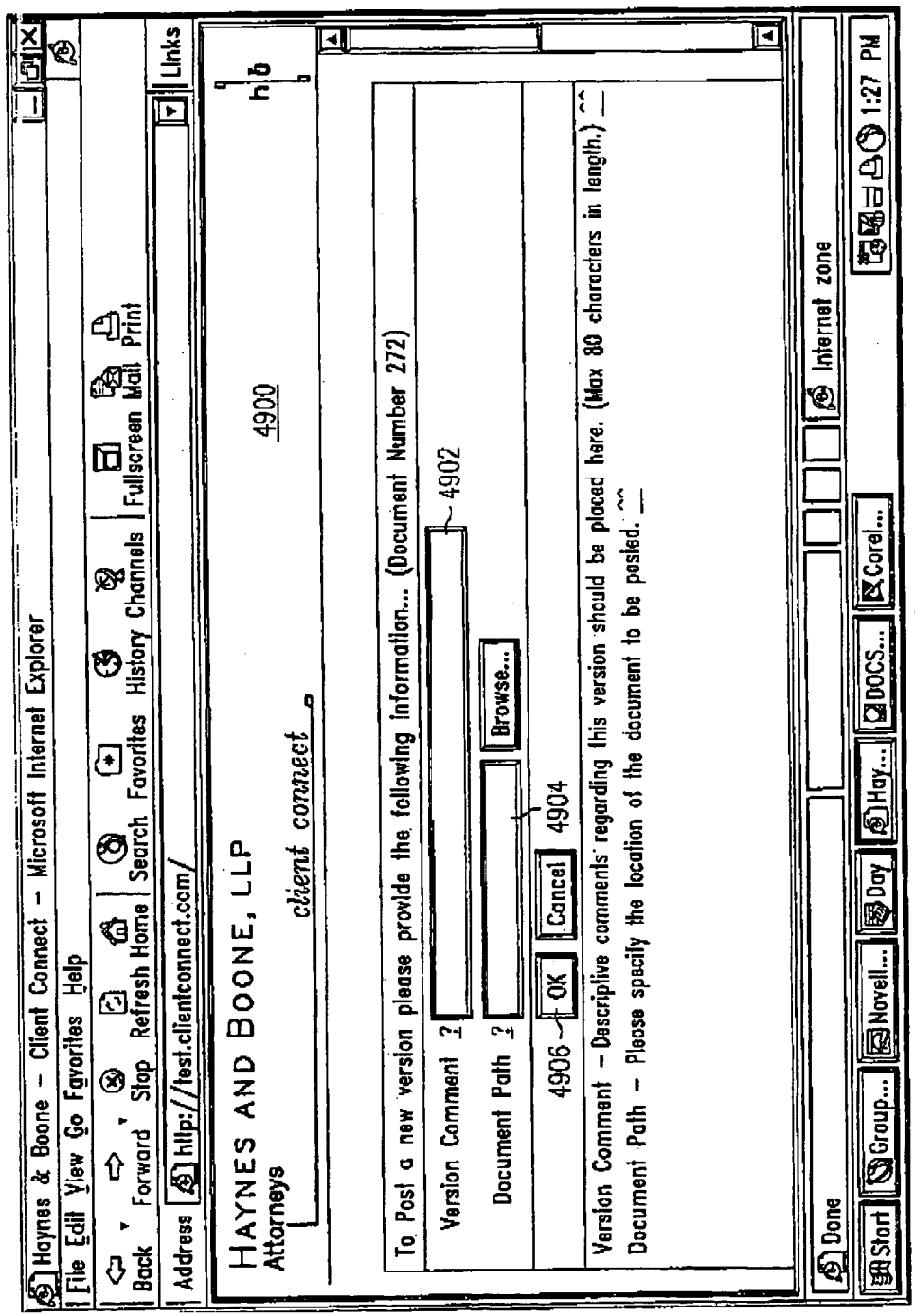
FIG. 49 illustrates a "Post New Version" screen of the application of FIG. 1 or 2.
Figure 50:
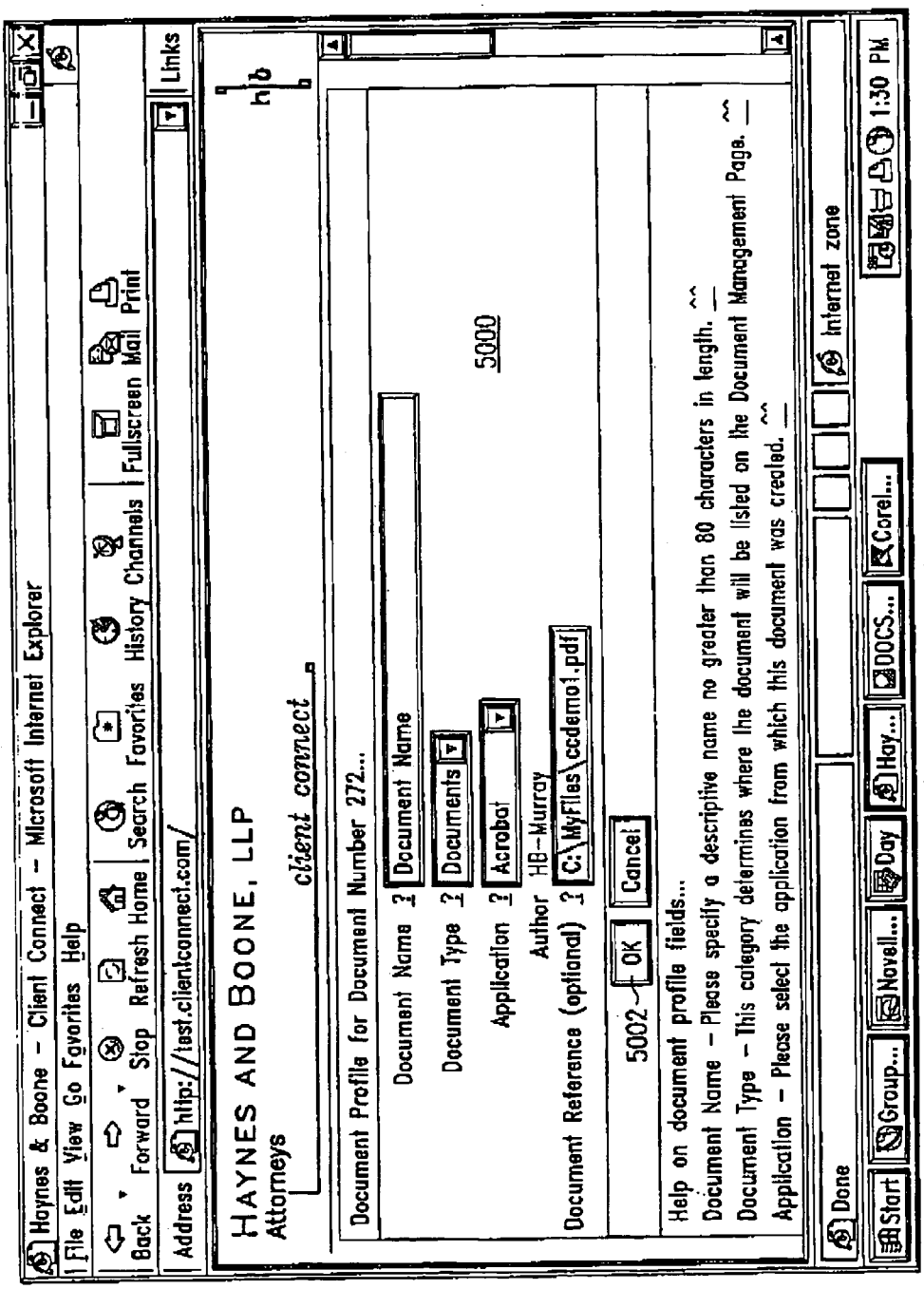
FIG. 50 illustrates a "Edit Profile" screen of the application of FIG. 1 or 2.
Figure 51:
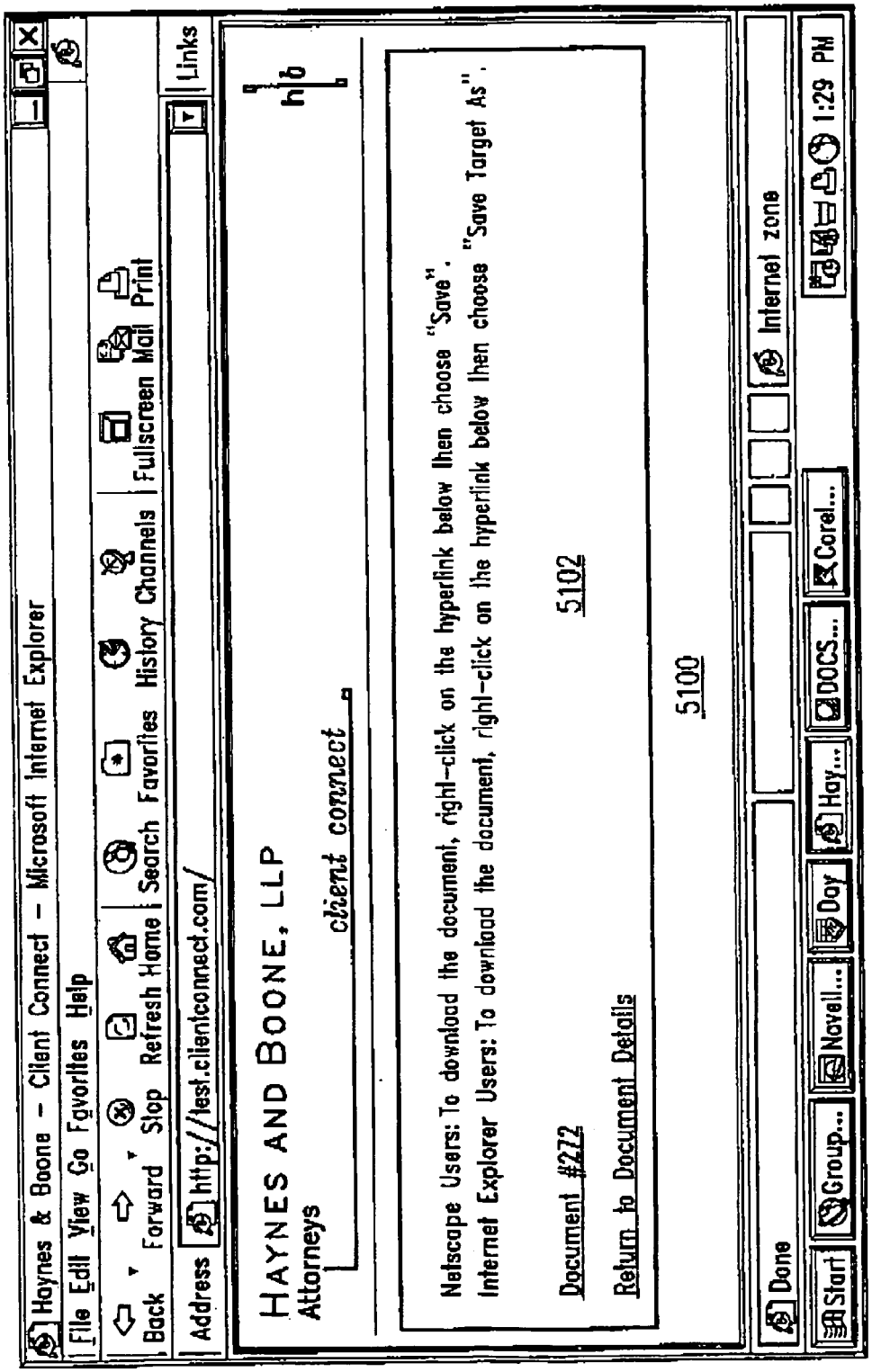
FIG. 51 illustrates a "Download" screen of the application of FIG. 1 or 2.
Figure 52:
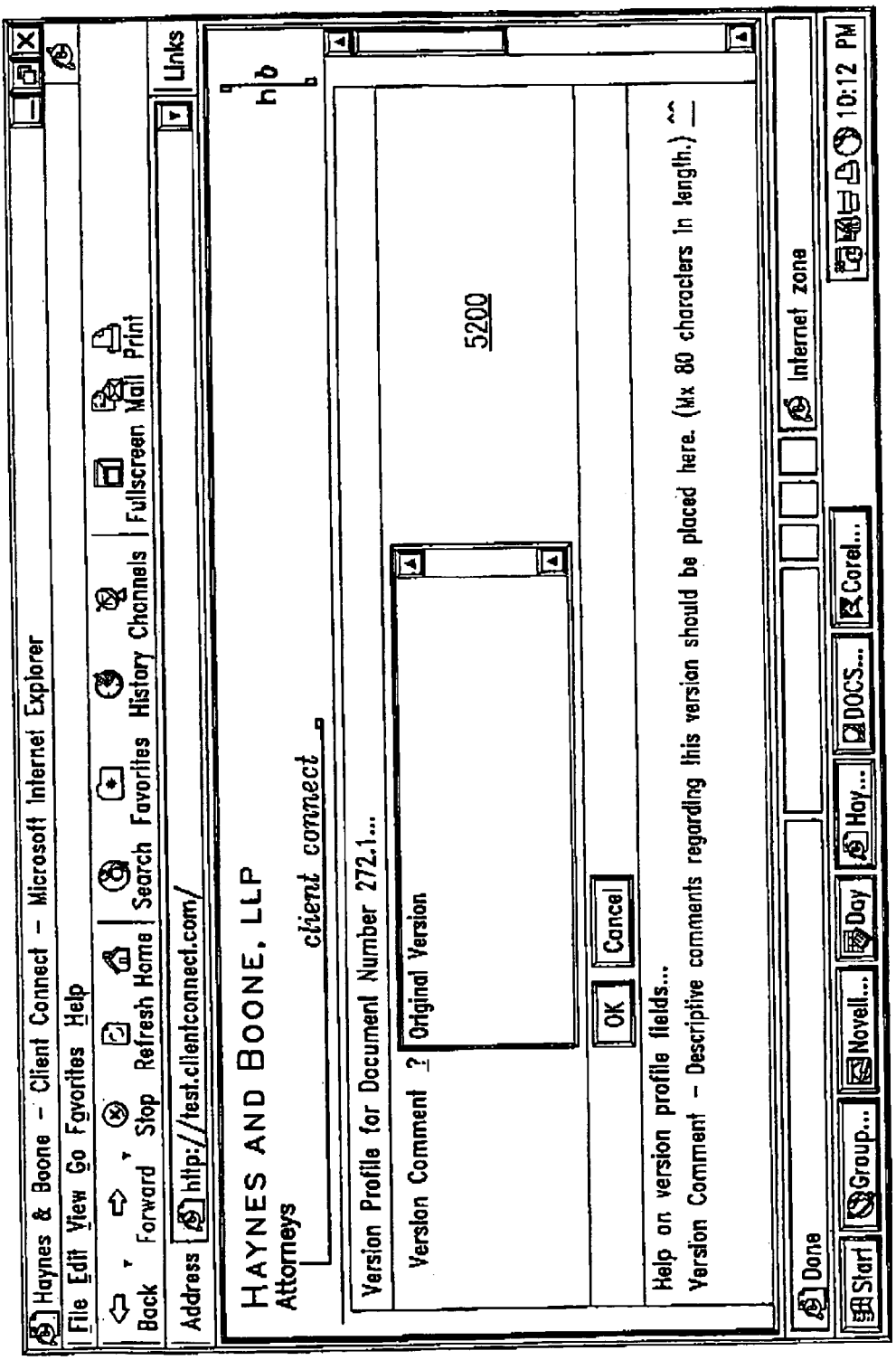
FIG. 52 illustrates a "Edit Version Profile" screen of the application of FIG. 1 or 2.

After a document has been successfully posted, as described with reference to FIG. 45, in step 4264 (FIG. 42), a "Document Profile Verification" screen 4600, as illustrated in FIG. 46, will be displayed. This screen 4600 enables the user to verify the document profile information entered using the screen 4500 (FIG. 45). Clicking on a "Click Here to Continue" link 4602 results in an E-mail to all users notifying them of the posting of a document and the matter to which it was posted. As shown in FIG. 47, the Matter Library screen now includes the posted document. In particular, the name of the document entered using the screen 4500 is displayed under a "Document Name" heading, the author is displayed under an "Author" heading, and the date the document was last posted displayed under an "Edit Date" heading. In addition, an icon 4700 indicates the application to which the document was posted (e.g., Acrobat, PowerPoint, Excel, etc.), and a number displayed under a "#" heading indicates the document number. Documents are numbered sequentially and stored by author. In this case, the document "Document Name" is document number 272.

If in step 4260 it is determined that the user has not clicked on the + icon 4400 to post a document, execution proceeds to step 4266, in which a determination is made whether the user has clicked on a document name. If so, in step 4268, a "Document Profile" screen 4800 (FIG. 48) for the document is displayed. Clicking on a "Post New Version" link 4802 (FIG. 42a, step 4270) enables any user that has rights to post a new version of a document under that matter (FIG. 42a, step 4272). Clicking on an "Edit Profile" link 4804 (FIG. 42a, step 4274) enables the author of the document to edit the document profile information for the document (FIG. 42a, step 4276). Clicking on a "Delete" link 4806 (FIG. 42a, step 4278) enables the author of the document to delete the document as posted, as well as the profile for the document (FIG. 42a, step 4280). Finally, clicking on a "Return" link 4808 (FIG. 42a, step 4282) returns the user to the Matter Library screen 4200 (FIG. 42a, step 4250).

As shown in FIG. 48, a "Document Profile" portion of the screen 4800 displays information for the document as entered by the author at the time of posting. The Document Profile information can be edited by clicking on the Edit Profile link 4804. A "Document Versions" portion of the screen 4800 displays a row of information for each document version posted. Clicking on a "View" link 4810 (FIG. 42a, step 4284) opens the appropriate application and document (FIG. 42a, step 4286). All users with rights within a matter can view a document posted under that matter. Clicking on a "Download" link 4812 (FIG. 42a, step 4288) results in the user being prompted to indicate a location to which a copy of the document should be saved (FIG. 42a, step 4290), such as the user's hard drive or a network drive. Once the document is saved, it can be opened in the appropriate application and the user can then make changes or add annotations as necessary. All users with rights within a matter can download a document posted under that matter. Clicking on an "Edit Version Profile" link 4814 (FIG. 42a, step 4292) allows the user to change version comments (FIG. 42a, step 4294). Only the author of the specific venison of the document can edit the profile thereof. Finally, clicking on a "Delete Version" link 4816 (FIG. 42a, step 4296) allows the author of the specific version to delete that version (FIG. 42a, step 4298).

A "Document History" portion of the screen 4800 reflects each and every action that has been take with respect to the subject document, such as views, download, postings of new versions, and editing of profiles.

Clicking on a "Post New Version" link 4802 results in the display of a "Post New Version" screen 4900 (FIG. 49) for the document with which the user is able to post a new version of the document. To post a new version of the document, the user enters a version comment in a "Version Comment" field 4902 and a document path in a "Document Path" field 4904 and then clicks on or otherwise selects an "OK" button 4906 to submit the information and return to the screen 4800 (FIG. 48).

Clicking on the Edit Profile link 4804 (FIG. 48) results in the display of an "Edit Profile" screen 5000 (FIG. 50), with which the user can edit the various items of information contained in the profile for the document, is displayed. Once the user is finished editing the profile information, clicking on an "OK" button 5002 submits the information and returns the user to the screen 4800 (FIG. 48)

Clicking on the Download link 4812 results in the display of a "Download" screen 5100 (FIG. 51), from which the user is able to download the current version of the document as instructed in a window 5102.

Referring again to FIG. 48, clicking on the Edit Version Profile screen 4814 results in the display of an "Edit Version Profile" screen 5200 (FIG. 52), with which the user can edit the profile of the current version of the document. Clicking on an "OK" button 5202 submits the information and returns the user to the screen 4800 (FIG. 48).

Figure 53:
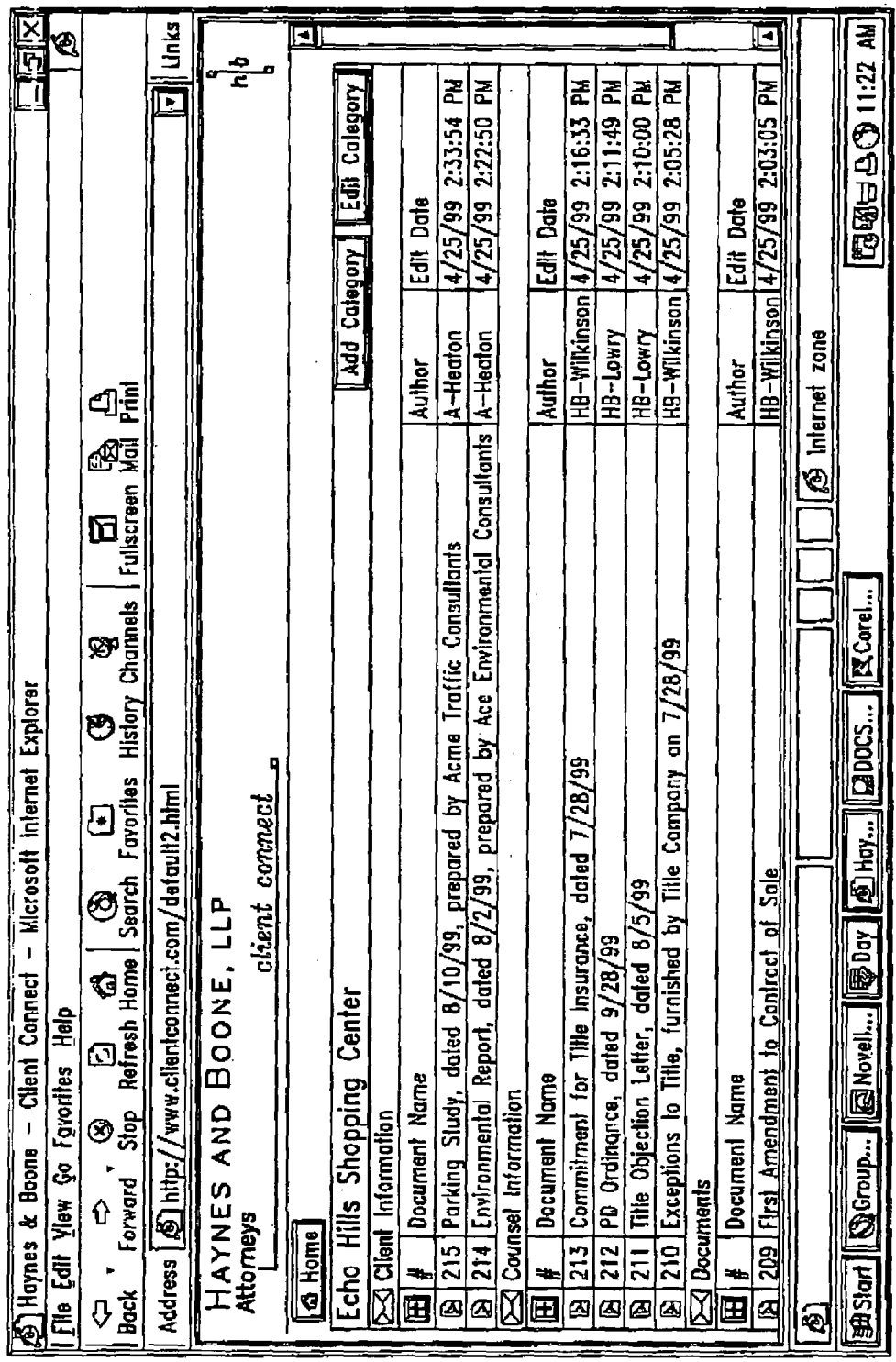
FIG. 53 illustrates the Matter Library screen of FIG. 42 after multiple documents have been posted to multiple categories thereof.

FIG. 53 illustrates a Matter Library screen to which multiple documents have been posted in multiple categories.

FIG. 54 illustrates a Document Profile screen when the user that is logged on is not the author of the subject document. As can be seen from FIG. 54, a user only has the following options with respect to documents with respect to which he or she is not the author: Post New Version, View, and Download.

As described above, the document management features of the application 12 are designed such that relevant drafts, documents, or other information generated by counsel or client users is easily posted within the application for convenient access when needed by client users or counsel users. A flexible annotating tool enables highlighting of key information to draw the attention of users to specific issues and questions demanding their attention. As a result, the document management features encourage interactive collaboration among client and counsel users. In particular, client or counsel users can use the document management features to post drafts, documents, and/or other information generated by clients or counsel users, which are accessible to any authorized user from an computer having an Internet connection. In addition, the application 12 includes extensive annotating features, including text highlighting and text and voice annotations designed to direct the attention of a client user to the specific relevant portion(s) of a draft or document that requires their attention.

The following are some examples of how specific types of users might advantageously use the application 12:

Senior Managers and General Counsel
1. View "Hot Issues" identified by client users and counsel users, sorted by project.
2. View issues tagged "Discuss With" by client users and counsel users to be discussed with specific senior manager/general counsel and respond by E-mail directly from the application 12.
3. View relevant portions of drafts of key documents annotated with voice and text comments and return voice or text comments.

Business People
1. Enter "Client Notes" identifying important business points for other client users and counsel users to be aware of.
2. View "Status," "Client Notes," "Client Issues," and/or "Critical Dates," as identified by client users and counsel users, sorted by project.
3. View issues tagged "Hot Issues" or "Discuss With" the particular deal person.
4. Respond to items or issues noted in any view by E-mail directly from the application 12.
5. View relevant portions of drafts of key documents annotated with voice and text comments and return voice or text comments.

Support Staff
1. Enter updates in client-specific checklists for all projects.
2. View "Status," "Client Notes," "Client Issues," and/or "Critical Dates" as identified by client users and counsel users, sorted by project.
3. Respond to items or issues noted in any view by E-mail directly from the application 12.
4. View relevant portions of drafts of key documents annotated with voice and text comments and return voice or text comments.

Password-Authorized Personnel
1. View "Status," "Client Notes," "Client Issues," and/or "Critical Dates" as identified by client users and counsel users, sorted by project.
2. Tag issue or note in any view "Hot Issue".
3. Tag issue or note in any view "Discuss With" and identify specific client user or counsel user with whom issue or note is to be discussed.
4. Respond to items or issues noted in any view by E-mail directly from application.

At this point, several unique features of the application of the present invention will be reiterated. First, a unique, convenient E-mail feature enables users to respond quickly to any note or issue without leaving the application 12. The E-mail feature automatically generates the context, or subject, of the response, embedding the project or matter name and category of note or issue to instantly inform the recipient of the context of the response.

In addition, information categories and some column headings in each view for each project or matter are customizable to permit the application 12 to be adapted to any particular client's needs. Moreover, special, easy-to-use filters, such as "New/Edited Issues-Last Week" or "New/Edited Issues-Last Two Weeks," are available for each view to permit client user to view only certain information, such as information added or edited during the specified time period. Another filter, "Since Last Viewed," allows the user to view only those items that have been added since the user last viewed information in connection with the matter. Convenient "tags" may be used to more precisely communicate status or urgency of any note, issue, or action item. Examples of such tags include "In Progress" or "Done" to indicate status; "Hot Issue" to indicate importance and/or urgency; "Discussion Party" to indicate who specifically issue or note needs to be discussed with; and "Responsible Party" to indicate who specifically is responsible for the particular issue or action required. Finally, a special tool, in the form of a colored icon 3337, is used to alert users to "drill down" for more detailed information.

Although illustrative embodiments have been shown and described, other modifications, changes, and substitutions are intended in the foregoing disclosure. For example, some operations described above may be performed by different computers working together or independently. Also, as technology progresses, some operations may be performed by a single computer. For another example, the computers 14a and/or 16a of FIG. 1 may merely be terminals to the client server 18. In addition, as previously indicated, the invention may be used in connection with any type of outside service provider, including, for example, law firms, accounting firms, advertising agencies, etc. The specific example of a law firm is used herein to facilitate a complete understanding of the invention and should not be construed to limit application of the invention in connection with other outside service providers. Accordingly, it is appropriate that the appended claims be construed broadly and in a manner consistent with the scope of the disclosure.

What is claimed is:
1. A method of implementing a collaborative management application, the method comprising:
   logging on to the collaborative management application;
   configuring an appearance of the collaborative management application; and
   viewing, adding, or modifying items of information pertaining to one or more clients;
   wherein said configuring further comprises;
      specifying identifying information for a client;
      specifying information for at least one matter of the client, wherein the at least one matter conceptually links a plurality of related items and the specified information is applicable to each of the plurality of items;
      selecting a component in connection with all matters of the client;
      specifying at least one category for the component;
      identifying a user group for the client, the user group comprising a set of users having some level of authorization with respect to matters of the client;
   wherein said viewing, adding, or modifying further comprises:
      selecting a client;

selecting one or more matters in connection with the selected client, wherein the one or more matters comprise a group of matters;

selecting a component in connection with the selected group of matters;

selecting a filter for filtering items for the selected client, matters and component;

displaying the filtered items to a user;

selecting a user;

displaying only items for which the selected user has been designated; and wherein said configuring and said viewing, adding, or modifying are performed via an Internet web site.

2. The method of claim 1 further comprising:
adding an item to a component; and
specifying a status of said added item.

3. The method of claim 2 further comprising changing a status of said added item.

4. The method of claim 3 wherein said changing a status of said added item comprises selecting an icon associated with said item status.

5. The method of claim 2 further comprising:
selecting an item status; and
displaying only items having a status corresponding to the selected item status.

6. The method of claim 1 wherein the component is selected from a group consisting of a status component, an outside service provider notes component, a client notes component, a checklist component, and a critical dates component and wherein only users identified as outside service provider users can modify outside service provider notes items and only users identified as client users can modify client notes items.

7. The method of claim 1 wherein said configuring further comprises assigning an authorization level to each user of the user group.

8. The method of claim 7 wherein said configuring further comprises modifying the authorization level of a user of the user group in connection with at least one matter of the client.

9. The method of claim 1 wherein the Internet web site is maintained by a party selected from the group consisting of the client and an outside service provider of the client.

10. The method of claim 1 wherein the filter corresponds to a time period and wherein the filtered items comprise items edited during the time period corresponding to the filter.

11. The method of claim 10 wherein the filtered items comprise all items added to the component since the items were last viewed.

12. The method of claim 2 wherein the item status is selected from a group consisting of hot issue, in progress and done.

13. The method of claim 1 further comprising:
adding an item to a component;
designating a user in connection with the added item; and
responsive to said designating, automatically generating an E-mail to the designated user in connection with the item to provide the designated user with information in connection with the added item.

14. The method of claim 1 further comprising:
responsive to user selection of an E-mail icon associated with one of the displayed items, displaying at least one E-mail group for the selected client, the at least one E-mail group comprising a list of users for receiving E-mail messages regarding the selected client and form which the user can select users to receive an E-mail message in connection with the associated item; and sending the E-mail message to the selected users, wherein the collaborative management application automatically filling in a subject field of the E-mail message with a description of the associated item.

15. A software program embodied in a storage medium for implementing a website by which documents can be shared between a service provider and a client, the software program comprising:

instructions for accessing a repository, the repository for storing a plurality of documents;

a first graphical interface by which a first user associated with the service provider can log into the network application, can add one or more documents to the repository, and can assign a category, an authorization, and a matter for each document, wherein the matter conceptually links a plurality of related documents and information associated with the matter is applicable to each of the plurality of documents;

instructions for identifying one or more clients, each client comprising one or more users having a level of authorization with respect to matters of the client;

an email interface linked to the first graphical interface, the email interface including a list of potential email recipients selected according to at least one client, the category and the matter;

a second graphical interface by which a second user associated with a client can log into the network application and can access one or more of the documents in the repository, based on the category, authorization, and matter for the one or more documents; and instructions for allowing the second user to view, add, or modify any one of the documents in the repository according to the authorization of the second user with respect to a particular matter.

16. The software program of claim 15 further wherein the second graphical interface includes instructions for allowing the second user to view, add, or modify any one of the documents in the repository by:

using a first filter for filtering items for the client and the matter; and using a second filter for filtering items for which the second user has authorization.

17. The software program of claim 15 wherein the list of potential email recipients is selected according to the client, the category and the matter.

18. The software program of claim 15 wherein the service provider is a law firm.

* * * * *